United States Patent [19]

Taniguchi et al.

[11] Patent Number: 4,550,996
[45] Date of Patent: Nov. 5, 1985

[54] FLASH PHOTOGRAPHY SYSTEM

[75] Inventors: Nobuyuki Taniguchi, Tondabayashi; Masaaki Nakai, Nara; Takanobu Omaki, Sennan; Hiroshi Hosomizu, Nara; Masatake Niwa, Sakai; Toru Inoue, Toyonaka; Minoru Sekida, Sakai, all of Japan

[73] Assignee: Minolta Camera Kabushiki Kaisha, Osaka, Japan

[21] Appl. No.: 544,871

[22] Filed: Oct. 24, 1983

[30] Foreign Application Priority Data

| Oct. 22, 1982 | [JP] | Japan | 57-186640 |
| Oct. 29, 1982 | [JP] | Japan | 57-190996 |
| Nov. 16, 1982 | [JP] | Japan | 57-201382 |
| Nov. 29, 1982 | [JP] | Japan | 57-209844 |
| Dec. 16, 1982 | [JP] | Japan | 57-221510 |

[51] Int. Cl.⁴ .................... G03B 7/00; G03B 15/03
[52] U.S. Cl. .................... 354/416; 354/422
[58] Field of Search .............. 354/413, 414, 416, 417, 354/423, 422, 420

[56] References Cited

U.S. PATENT DOCUMENTS

| 4,079,385 | 3/1978 | Nattamura et al. | 354/423 |
| 4,187,019 | 2/1980 | Uchiyama et al. | 354/423 |
| 4,188,104 | 2/1980 | Uchiyama et al. | 354/414 |
| 4,319,814 | 3/1982 | Iura et al. | 354/423 |

Primary Examiner—Russell E. Adams
Attorney, Agent, or Firm—Watson Cole Grindle & Watson

[57] ABSTRACT

A flash photography system using a first aperture value output calculated from a desired diaphragm aperture value for flash light photographing with data obtained from ambient light, film sensitivity and the exposure data, a second aperture value output independent of the light value of the ambient light, data selecting circuitry for outputting any one of the first aperture value output and the second aperture value output, an aperture controller for controlling the actual diaphragm aperture size from the output of the data selecting circuitry, and means for producing a stopping signal to stop the emission of the flash light when the flash light emission reaches a predetermined value.

27 Claims, 33 Drawing Figures

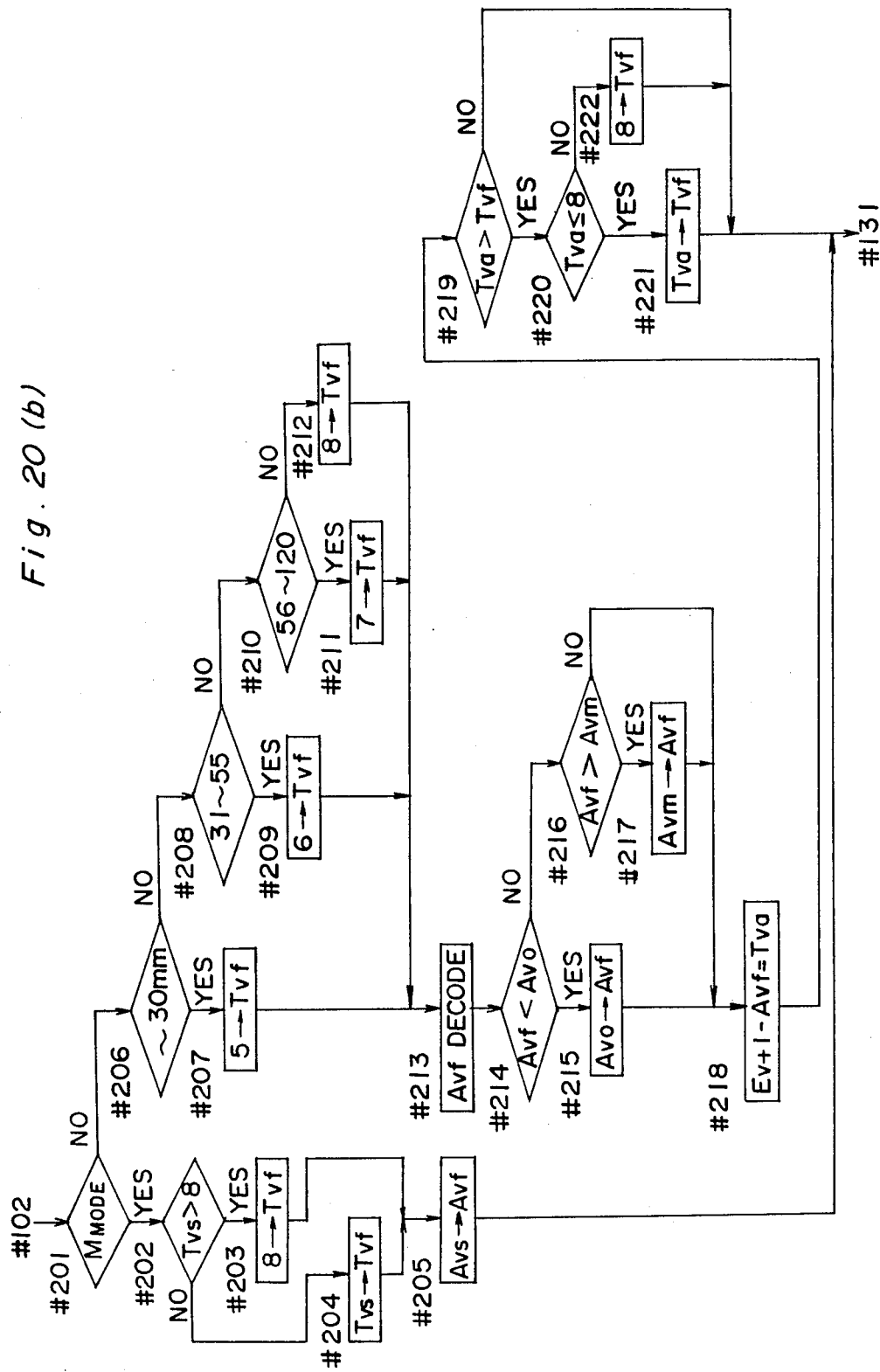

FLASH PHOTOGRAPHY SYSTEM

FIELD OF THE INVENTION

The present invention relates to a flash photograpy system, and more particularly to a photographing system having a control system for controlling exposure time and/or diaphragm aperture size in accordance with the brightness of the photographic subject being illuminated by the flash device

BACKGROUND OF THE INVENTION

U.S. Pat. No. 4,291,959 discloses a photographic apparatus which is provided with two photocells, one for measuring ambient light and the other for measuring flash light, and further provided with two ND filters disposed respectively in front of the photocells to restrict the amount of light incident on the photocells. The ratio of the densities of the ND filters is changed in accordance with a diaphragm aperture size which, in turn, is determined in accordance with the measurement of the ambient light. The exposure time is determined in accordance with the integration of the output of the ambient light measuring photocell while the amount of light to be emitted from the flash device is determined in accordance with the integration of the output of the flash light measuring photocell. Thus, the ratio of exposures by the flash light and the ambient light is changed in dependence upon the ambient light level since the ratio of the densities of the ND filters is determined in dependence upon the ambient light level.

U.S. Pat. No. 4,317,620 discloses a photographic exposure and flash control system wherein an analog output of a photo sensor for detecting the light having passed through a camera diaphragm and incident on the sensor aperture is first converted into a digital signal. The value of the digitized data is limited to a minimum value if the brightness of the photographic object exceeds a predetermined first value and is limited to a maximum value if the brightness of the photographic object is below a predetermined second value lower than the first value. The output of the photo sensor begins, to be integrated upon commencement of the exposure of a photographic film, until the integrated value reaches a value corresponding to an exposure level less than, and having a given relationship with, the correct exposure level when the diaphragm aperture begins to close. When the actual aperture size reaches a desired value corresponding to the set or measured photographing distance, the flash device emits flash light corresponding to the digitized value.

U.S. Pat. No. 4,297,016 discloses an exposure control system, wherein the output of a photo sensor receiving and measuring the ambient light is integrated and the flash device emits flash light when the integrated value reaches a predetermined first value. The output of the photo sensor receiving the light reflected from the photographic object illuminated by the flash light as well as the ambient light is further integrated. When the integrated value reaches a second predetermined level, the shutter begin to close. The flash light emission is stopped when the integrated value reaches a third predetermined value. If the value, of the first integration of the ambient light does not reach the first level even after a lapse of a given period of time, the flash device starts after the predetermined time has passed. In this system, if the brightness of the ambient light exceeds a given value, the ratio of the amount of the flash light to that of ambient light that contributes to the exposure is fixed, but if the brightness of the ambient light is lower than the given value, the ratio of the amount of the flash light changes in accordance with the brightness of the ambient light from the fixed value up to 100%.

All of the prior art systems described above can only be used in such type of photographic cameras having a diaphragm aperture for the photo sensor besides the camera diaphragm aperture so that the photo sensor receives the light from the photographic object passed through the sensor-assigned aperture during the photographic film exposure.

Therefore, the prior art systems described above cannot be used in the lens interchangeable photographic camera such as the single lens reflex cameras, wherein the exposure time and actual aperture size are determined before the commencement of the exposure operation on the basis of the output of the photo sensor which is adapted to receive the light from the photographic subject having passed through the photographing aperture.

Another disadvantage of the prior art systems is in that exposure information to be used in the camera can not be displayed before the photography begins.

Furthermore, the prior art systems described above are directed to be applied to the lens shutter type camera with which flash photography can be effected at any exposure time. In other words the prior art systems described above are not suitable for a focal plane shutter camera, since the exposure time for the flash photography must be lower than a predetermined range to avoid a slit exposure.

The photographic apparatus shown in U.S. Pat. No. 4,291,959 has a disadvantage that it requires two photo sensors and two kinds of ND filters.

The exposure control system shown in U.S. Pat. No. 4,297,016 requires two kinds of filters for the ambient light and the flash light and an interchange mechanism for interchanging the filters.

U.S. Pat. No. 4,188,104 discloses an automatic control device for electronic flash which enables the correct exposure for either the main photographic object and the sub photographic object. In this device, the exposure time and the desired aperture value are calculated by a photographing distance data of the main object, a photographic distance data of the sub photographing object, the brightness data of both of the photographic subjects and the amount of the flash light emitted by the flash device, so that the exposure control is performed by the calculated exposure time value and the desired aperture value.

In this device, many kinds of data must be inputted, in other words, many sensors to obtain the input data must be provided. Furthermore, this device is composed of analog circuits with linear characteristics, requiring a wide information dynamic range so that this device is not suitable for a photographic camera system. Another problem in this device is in that where the brightness of the ambient light is relatively low, the actual aperture size must be large, so that the depth of focus becomes small causing a difficulty in the focus adjustment, thereby resulting in increasing the possibility of out-of-focus photographs.

Furthermore in a case where the brightness of the ambient light is relatively low, the fill-in flash mode is seldom used, so that the device shown in U.S. Pat. No.

4,188,104 is not so effective in spite of the complicated circuit arrangement.

Besides the prior art systems described above, in many conventional photographic cameras, the actual aperture size can be set to a predetermined value independent of the brightness of the photographic object. In using such a conventional photographic camera, even if the scene is suitable for fill-in flash photographing, only a simple flash light photographing is available, thereby causing the sub photographic object to be overexposed.

SUMMARY OF THE INVENTION

An essential object of the present invention is to provide a flash photography system which enables readily to take correct photographs whenever a flash light source is used as a main light source or an auxiliary light source.

Another object of the present invention is to provide a flash photography system which reduces the possibility of out-of-focus photographs by automatically setting the actual diaphragm aperture size to a value smaller than the correct or ambient light dependent aperture value so that a deep depth of focus is obtained in the flash photography mode.

A still further object of the present invention is to provide a flash photography system which automatically provides correct exposure not only for the main photographic object but also for the sub photographic object normally located in the peripheral part of the picture scene.

A still further object of the present invention is to provide a flash photography system which can provide a correct exposure for a wide range of the brightness of a sub photographic object with flash light photographing.

DETAILED DESCRIPTION OF THE PREFERRED EMBODIMENTS

Before the description proceeds, the meaning of the specific terms used herein is defined below;

A mode; an aperture priority exposure control mode wherein the diaphragm aperture is manually selected and the exposure time is automatically controlled;

P mode; the exposure control mode wherein both the diaphragm aperture and exposure time are automatically controlled in accordance with a predetermined program S mode; an exposure time priority mode, wherein the exposure time is manually selected with the diaphragm aperture being automatically controlled; and M mode; a manual mode wherein both the exposure time and diaphragm aperture are manually determined.

Figure 1:
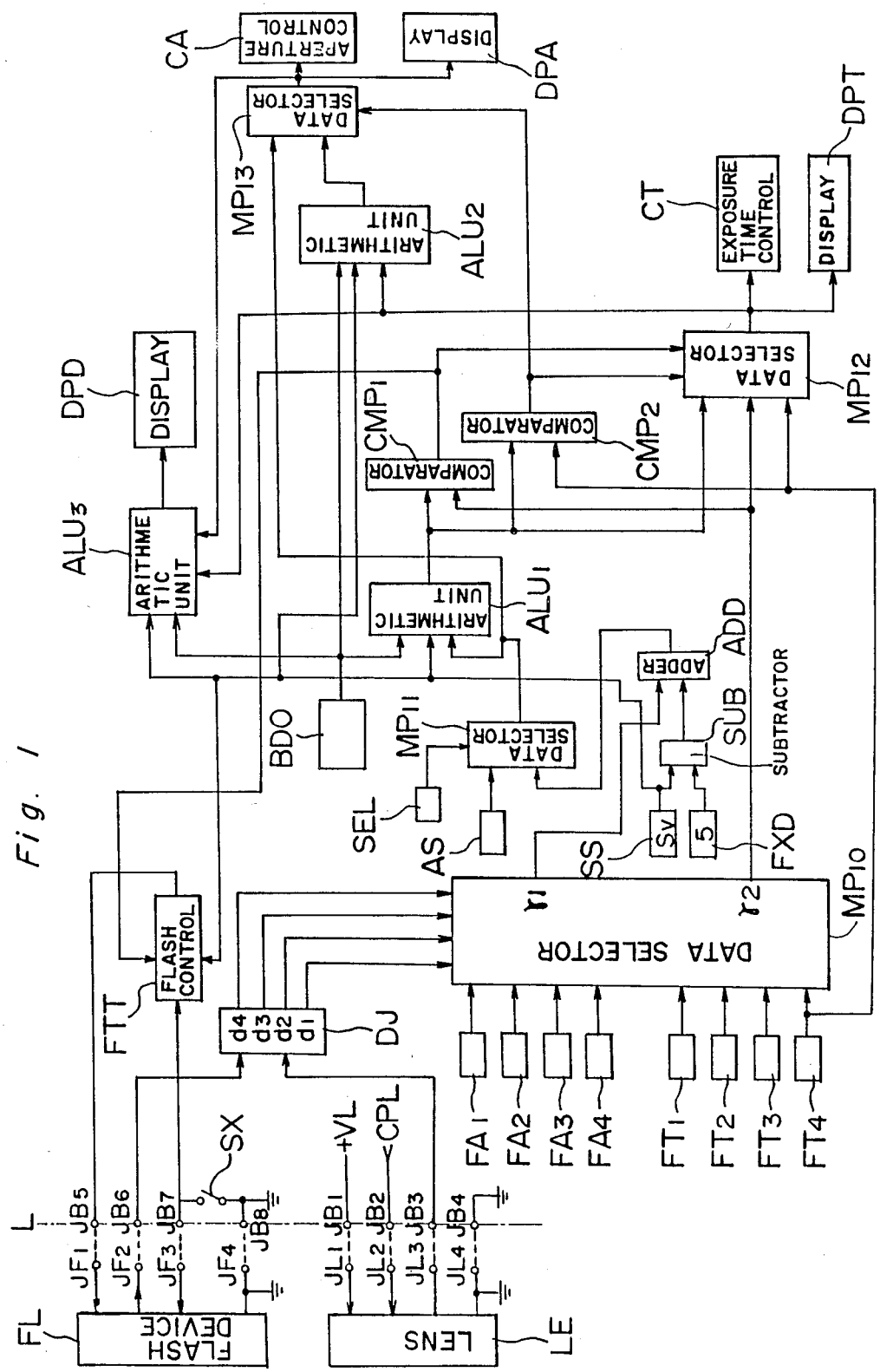
FIG. 1 is a block diagram showing one embodiment of the flash photography system according to the present invention.

Referring to FIG. 1, an interchangeable lens LE has four connection terminals JL1 through JL4, each of which can be connected with connecting terminals JB1 through JB4 provided on a camera body. Upon assembling the interchangeable lens LE on the camera body the terminal JL1 is connected with the terminal JB1 of the camera body so that the interchangeable lens LE can be fed with a DC power VL from the camera body. The terminal JL2 is connected with the terminal JB2 for receiving a clock pulse train CPL from the camera for synchronizing operation with the camera. The terminal JL3 is connected with the terminal JB3 for transferring focal length information from the interchangeable lens LE to the camera body. The focal length information is applied to a determining circuit DJ. The terminal JL4 and JB4 are grounded.

An electronic flash device FL has four terminals JF1 through JF4. The terminal JF3 is connected with the terminal JB7 of the camera body so as to apply a signal for starting emission of flash light (referred to as flash start signal) to the flash device FL upon closure of a X-contact or camera synchro-switch SX provided in the camera. The terminal JF2 is connected with the terminal JB6 of the camera for applying a flash light photographing mode signal to the determining circuit DJ from the flash device FL. The flash light photographing mode signal may be produced upon closure of a power switch of the flash device or when a voltage charged in a main capacitor in the flash device FL reaches the predetermined value. The terminal JF1 is connected with the terminal JB5 of the camera so as to apply a signal for indicating to stop the emission of the flash light (referred to as flash stop signal) to the flash device FL from a light emission control circuit FTT in the camera. The flash stop signal can be produced when the amount of light incident on a film surface reaches a predetermined value. The terminals JF4 and JB8 are grounded.

Figure 2:
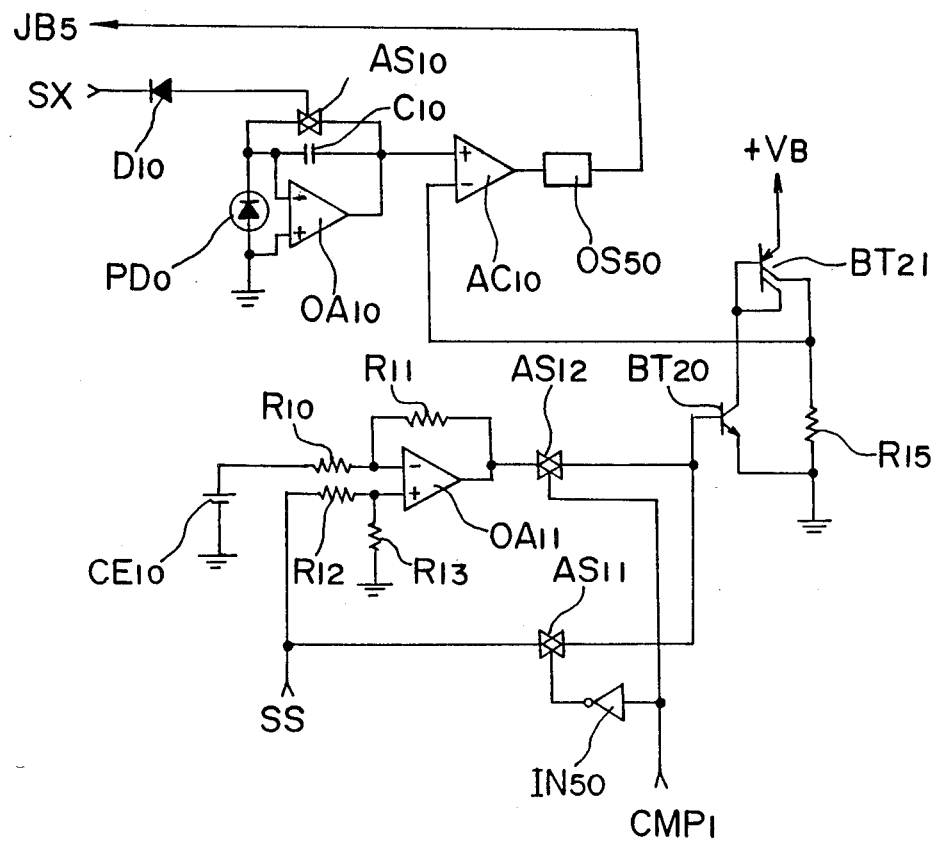
FIG. 2 is a detailed circuit arrangement of a flash control circuit used in the embodiment shown in FIG. 1.

The light emission control circuit FTT is shown in FIG. 2, wherein a photo diode PD0 for receiving light reflected from a photographic film mounted in the camera is connected with an operational amplifier OA10 having an integration circuit with a capacitor C10. An analog switch AS10 connected across the capacitor C10 is switched OFF upon closure of the X contact or camera synchro-switch SX to start the integration of the output current of the photo diode PD10 by the capacitor C10. A diode D10 acts to prevent application of an undesired high voltage to the circuit arrangement in the camera. The analog switch AS10 is switched ON upon opening of the X-contact SX.

An operational amplifier OA11 operates to produce an output having a value $$Sv - k1\, Ev$$

from input signals of k1 Ev applied from a constant voltage source CE10 and a film sensitivity signal Sv from a film sensitivity circuit SS described hereinafter. The output terminal of the operational amplifier OA11 is connected with the base of a transistor BT20 through an analog switch AS12 which is switched ON by a high level signal fed from a comparator CMP1 shown in FIG. 1.

The comparator CMP1 produces a high level output when the camera is set to a fill-in-flash mode and a low level output when the camera is set to a normal flash light mode. In the fill-in-flash mode, a photograph is taken for an object scene mainly illuminated by ambient light with the flash light used as an auxiliary light source to compensate the ambient light. In the normal flash phototgraph mode a photograph is taken with the flash light used as a main light source. The base of the transistor BT20 is connected with the film sensitivity circuit SS through an analog switch AS11 which is operated by an output of an inverter IN50 receiving the output of the comparator CMP1. With the circuit arrangement described above, the transistor BT20 receives the signal showing Sv−k1 Ev when the camera is set to the fill-in-flash mode and the signal Sv from the film sensitivity circuit SS when the camera is set in the flash light mode.

The collector of the transistor BT20 is connected with the base of a transistor BT21, the collector of which is grounded through a resistor R15 so that the transistor BT21 produces output of $2^{Sv}$ upon receipt of the signal Sv at the base of the transistor BT20 and $2^{Sv}-k1$ upon receipt of the signal of Sv−k1. The output of the transistor BT21 is applied to an inverting input terminal of a comparator AC10, the non-inverting input terminal of the comparator AC10 is connected with the output of the operational amplifier OA10. The output of the comparator AC10 is connected with the connection terminal JB5 through a one shot circuit OS50.

With the circuit arrangement described above, when the X-contact SX is ON, the flash light device FL emits flash light toward a photographic to be photographed and the analog switch AS10 is switched OFF. The light reflected from the object impinges on the photographic film in the camera through the diaphragm aperture, and then is reflected to the photo diode PD0, which produces photoelectric current representing the intensity of the reflected light. The output current of the photo diode PD0 is integrated by the capacitor C10. When the output voltage of the operational amplifier OA10 reaches the voltage across the resistor R15 which is representative of the film sensitivity, the output of the comparator AC10 is inverted to a high level, thereby causing the one shot circuit OS50 to produce a high level pulse. The output of the one shot circuit OS50 is transferred to the flash device FL through the terminals JB5 and JF1 as a flash stop signal. Then the flash device FL stops flash light emission. As a result of the control as described above, when the camera is set to the fill-in-flash mode, the total amount of the light emitted from the flash device FL is limited to be lower by k1Ev than the amount for providing a correct exposure value. On the other hand, when the camera is set to the normal flash photograph mode, the total amount of light emitted from the flash device FL is controlled to provide a correct exposure value.

It is noted that in the fill-in-flash mode, before the flash device emits flash light, the camera receives a predetermined amount of light from the main object due to ambient light, therefore the amount of the flash light from the flash device FL is reduced in terms of that ambient light. The value k1 is set in a range of $0 \leq k1 \leq 1.5$. This value k1 may be changed depending on the sensitivity map of the photo diode PD0, ratio of the area of the main object in the picture plane to the total area of the picture plane and the light emission characteristics of the flash device. The value k1 can be experimentally selected such that the number of the unfavourable photographs can be minimized by taking many photographs under the various conditions. The value k1 can be set in the camera manufacturing process.

In FIG. 1, the determination circuit DJ produces a high level output at one of the output terminals d1 through d4 upon receipt of the focal length information applied from the interchangeable lens LE through the terminals JL3 and JB3 and the flash light mode signal applied from the flash device FL through the terminals JF2 and JB6. For example, when the focal length of the lens set in the camera is less than 30 mm the output terminal d1 is high, the focal length is 31 mm through 55 m, d2 is high, 56 mm through 120 mm d3 is high, and for a value more than 121 mm, d4 is high.

The circuits FA1 through FA4 produce aperture value signals for the flash light photographing mode. The circuit FA1 produces the signal representing Av=6 for F8, FA2 produces Av=5 for F5.6 and FA3 Av=4 for F4, respectively.

The circuits FT1 through FT4 produce a signal of critical shutter speed value that can avoid a blurred picture due to shaking or wobbling of a hand held camera (referred to as blur avoiding critical exposure time). The circuit FT1 produces the information of Tv=5 for 1/30 sec, FT2 Tv=6 for 1/60 sec, FT3 Tv=7 for 1/125 sec and FT4 Tv=8 for 1/250 sec of shutter speed. The information Tv=8 of the circuit FT4 corresponds to the critical value of flash synchronizable exposure time.

A data selector MP10 transfers the outputs of the circuits FA1 and FT1 to the terminals r1 and r2 when the output terminal d1 of the determination circuit DJ is high. When the output terminal d2 is high, the outputs of FA2 and FT2 are transferred to the terminals r1 and r2. When the terminal d3 is high, the outputs of FA3 and FT3 are transferred to the output terminals r1 and r2. When the terminal d4 is high, the outputs of FA4 and FT4 are transferred to the terminals r1 and r2, respectively. Accordingly, in a case where the focal length of the lens is less than 30 mm the aperture value F8 and the exposure time 1/30 sec appear at the terminals r1 and r2. Similarly, for 31 mm through 55 mm F5.6 and 1/60 sec, for 56 mm through 120 mm F4 and 1/125 sec and for more than 121 mm F2.8 and 1/250 sec appear on the terminals r1 and r2, respectively.

Table 1 (at the end of the specification) shows the various output information of the data selector MP10 corresponding to the focal length information of the various interchangeable lenses.

A data selector MP11 transfers the set aperture value signal of a circuit AS upon receipt of a high level signal from a mode signal circuit SEL under A mode. The data selector MP11 transfers the output of an adder ADD representing a desired aperture value corresponding to the film sensitivity for the flash light photography to the output terminal upon receipt of a low level signal from the mode signal circuit SEL under P mode.

A circuit SS produces set film sensitivity information and a circuit FXD produces information showing Sv=5 (ISO 100). A subtract circuit SUB calculates $$Sv - 5 = \Delta Sv$$

to produce information representing the difference between the set film sensitivity and the sensitivity ISO 100 of the photographic film of.

The adder ADD calculates $$Avfs + \Delta Sv = A'vf$$

from the output of the subtract circuit SUB and the output of the terminal r1 of the data selector MP10.

The value Avfs shows the aperture value for the normally used photographic film of sensitivity ISO 100 and the value A'vfs shows the aperture value corresponding to the set film sensitivity.

The output A'vfs of the data selector MP11 is applied to an arithmetic circuit ALU1 which receives information of the brightness of the object (referred to as object brightness information Bv hereinafter) fed from a light measurement circuit BDO and the set film sensitivity Sv from the circuit SS to calculate an exposure time Tva $$Bv + Sv + k_2 Ev - A'vfs = Tva.$$

The constant $k_2$ Ev is obtained by the arithmetic circuit ALU1.

As a result of the calculation, the exposure value is $k_2$ Ev less than the desired exposure value for the normal ambient light.

The reason why the calculated exposure value is under the normal exposure value is explained hereinafter.

A fill-in flash photograph is usually performed with rear light, so that the brightness of the main object existing in the central portion of the picture plane is lower than the brightness of the edge of the picture field. On the other hand, a photo detector provided in a camera measures substantial average light on the central portion of the picture plane. Therefore in the fill-in flash mode, the photo detector produces an output voltage representing a brightness of the main object which is lower than the brightness of the sub object. Thus by calculating with the formula described above, the data selector MP11 produces an output of the exposure time Tva which is suitable for the sub object corresponding to the aperture value A'vf. When a picture is taken by a camera with a shutter speed Tva, emitting flash light from the flash device controlled by a TTL mode, the brightness of the main object is set to a suitable value by the flash light, while the sub object can be exposed with a suitable exposure value since the sub object is further than the main object from the camera so that the sub object does not receive the flash light and appears in the edge portion of the picture plane.

In order to avoid failure of photographing in the fill-in flash mode, a lot of experimental data are to be memorized in the camera in the manufacturing process by collecting various data which represent the difference between the average light measurement value of the photo detector and the brightness of the sub object in the fill-in flash mode.

A comparator CMP1 compares the exposure time value Tva from the arithmetic circuit ALU1 and the blur avoiding critical exposure time Tvh corresponding to the focal length information of the lens coming from the output terminal r2 of the data selector MP10 to produce a "Low" output when Tva<Tvh and a "High" output when Tva≧Tvh. A comparator CMP2 compares the exposure time Tva and the critical synchronizing exposure time Tvx from the circuit FT4 to produce a "High" output when Tva≧Tvx and a "Low" output when Tva<Tvx.

A data selector MP12 transfers the critical wobbling exposure time data Tvh applied at the terminal r2 from the data selector MP10 if Tva<Tvh, then the output of the comparator CMP1 is "Low" and the output of the comparator CMP2 is "High". If Tvh≦Tva≦Tvx, the data selector MP12 transfers the exposure time data Tva applied from the arithmetic circuit ALU1 for a correct exposure of the sub object by the "High" signals of the comparators CMP1 and CMP2. If Tvx<Tva, the data selector MP12 transfers the critical synchronizing exposure time data Tvx from the circuit FT4 by the "High" output of the comparator CMP1 and the "Low" output of the comparator CMP2.

An arithmetic circuit ALU2 receives a brightness Bv of the object from a light measurement output circuit BDO, set film sensitivity from the film sensitivity circuit SS and the exposure time Tvf from the data selector MP12 so as to calculate an aperture value Ava which is suitable for the sub object by the following equation $$Bv + Sv + K2 - Tvf = Ava.$$

The value Ava is applied to an input terminal of a data selector MP13 the other input terminal of which receives the exposure value A'vf.

A data selector MP13 produces the aperture value A'vf corresponding to the focal length and the film sensitivity as a control value of Avf when Tva≦Tvx, therefore the output of the comparator CMP2 is "High". However if Tva>Tvx, MP13 produces the aperture value Ava obtained by the arithmetic circuit ALU2 for the fill-in flash mode as a control signal Avf by the "Low" output of the comparator CMP2. It is noted that the aperture value Ava is produced from the data selector MP13 when the critical synchronizing exposure value Tvx is output as the control exposure value Tvf, therefore the aperture value Ava derived from the arithmetic circuit ALU2 is $$Bv + Sv + K2 - Tvx = Ava.$$

The methods of calculating the aperture value for control Avf and the exposure time value Tvf are summarized as follows;

The aperture value A'vf is output as a control value when the exposure time value Tva which is the result of the calculation by the formula $$Bv+Sv+k2-A'vf=Tva$$

is smaller than Tvh i.e., $$Bv+Sv+K2<Tvh+A'vf$$

The exposure time Tva and the aperture value A'vf can be output when Tvh≦Tva≦Tvx i.e., $$Tvh+A'vf\le Bv+Sv+k2\le Tvx+A'vf.$$

The aperture value Ava which is the result of the calculation by $$Bv+Sv+k2-Tvx=Ava$$

is output when Tva is larger than Tvx i.e., $$Tvx+A'vf<Bv+Sv+k2.$$

When Tvh≦Tva i.e., $$Tvh+A'vf\le Bv+Sv+k2,$$

either the exposure time Tva obtained by the value A'vf and the aperture value Ava obtained by the value Tvx can be output so that the fill-in flash mode is set thereby causing the flash device to be operated as an auxiliary light source for lighting the sub object under a desired exposure.

On the other hand, when the value Tvh is larger than the value Tva, i.e., $$Tvh+A'vf>Bv+Sv+K2$$

the values Tvf and A'vf can be outputted so that the normal mode is set thereby causing the flash device to be operated as a main light source.

The exposure time value Tvf obtained by the data selector MP12 is fed to a shutter control circuit CT for controlling the exposure time of the camera. Also the exposure time value Tvf is fed to a display device DPT for displaying the exposure time in digital form.

The aperture value Avf from the data selector MP13 is fed to an aperture control circuit CA for setting the actual aperture size of the camera. The value Avf is fed to a display device DPA for displaying the aperture value in digital form.

An arithmetic circuit ALU3 calculates $$Bv+Sv+K2-(Tvf+Avf)=\Delta Ev$$

on the basis of the brightness BV of the main object fed from the light measurement output circuit BDO, set film sensitivity Sv fed from the film sensitivity circuit SS, the exposure time Tvf fed from the data selector MP12 and the aperture value Avf fed from the data selector MP13. The value ΔEv is applied to a display device DPD. The value ΔEv becomes zero when the value Tva or Tvx are output i.e., when the camera system is set in the fill-in flash mode and the value ΔEv represents the degree of the underexposure of the sub object when the camera system is set in a normal photographing mode, i.e., when the value Tvh is output. By this arrangement an operator can notice that the camera system is set in the fill-in flash mode or the normal photographing mode by whether or not the display device DPD displays zero.

Figure 3:
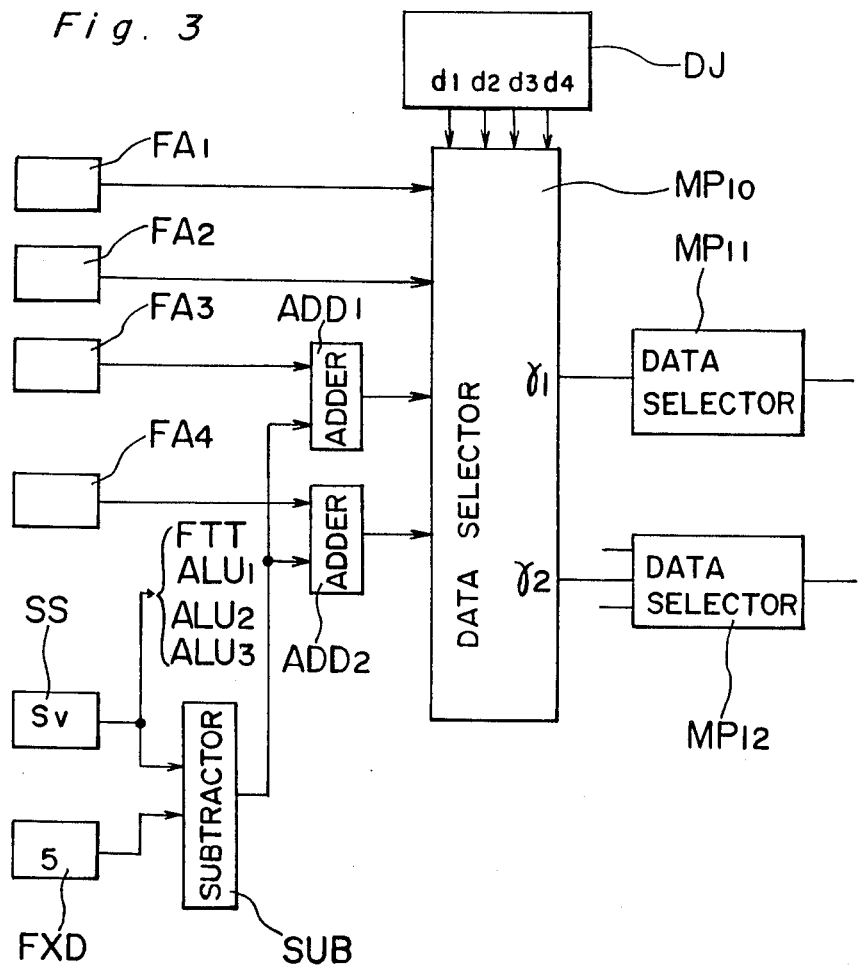
FIG. 3 is a circuit diagram showing a modification of the part of the circuit shown in FIG. 1.

FIG. 3 is a modification of the embodiment shown in FIG. 2, wherein the circuits SS, FXD, SUB and ADD are provided in the front stage of the data selector MP10 so that the aperture value such as Av=3 or 4 which corresponds to a shallow focus depth is applied to the data selector MP10 by compensating the aperture value by ΔSv.

For this purpose, the subtractor SUB is provided for calculating the following equation $$Sv-5=\Delta Sv$$

by the output data of the film sensitivity circuit SS and the fixed film data circuit FXD with the result of the calculation applied to adders ADD1 and ADD2, each of which adds the value ΔSv to the aperture value applied from the aperture data circuits FA3 and FA4. The result of the calculation in the adders are input in the data selector MP10.

The output signals of the adders ADD1 and ADD2 are output from the terminal r1 according to the content of the output of the judge circuit DJ and the output is applied to the data selector MP11.

With the circuit arrangement in FIG. 3, the aperture value 6 or 5 which requires a relatively deep focus depth is applied to the data selector MP10 directly without modification, on the other hand, the aperture value such as 4 or 3 which requires a shallow focus depth is applied to the data selector MP10 with a modification of the value Sv.

Figure 4:
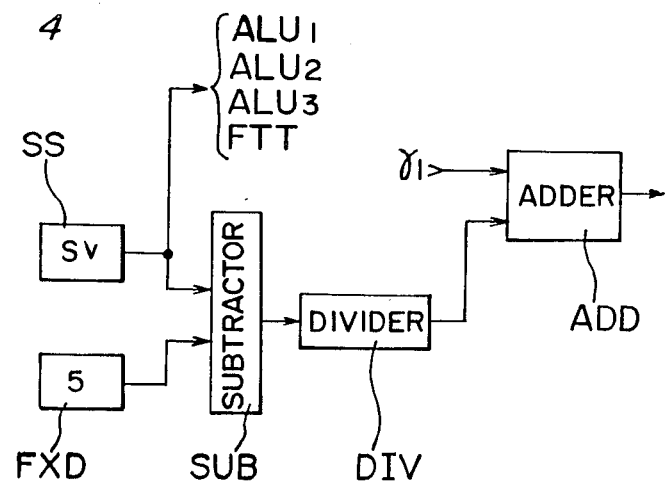
FIG. 4 is a circuit diagram showing a modification of the circuit arrangement shown in FIG. 3.

FIG. 4 is a further modification of the embodiment of FIG. 2 wherein a divider DIV is disposed between the subtractor SUB and the Adder ADD so that the aperture value modified by ΔSv/2 is applied to the adder ADD.

With this circuit arrangement, the actual aperture size is set to a slightly decreased value relative to the correct aperture value against the higher film sensitivity so that the focus depth of the lens can be increased, thereby extending the flash available distance range for the flash light photographing. The flash available distance range means that camera-to-object distance range which can be covered by the maximum light quantity of the flash device for effecting a correct exposure on the photographic object.

Figure 5:
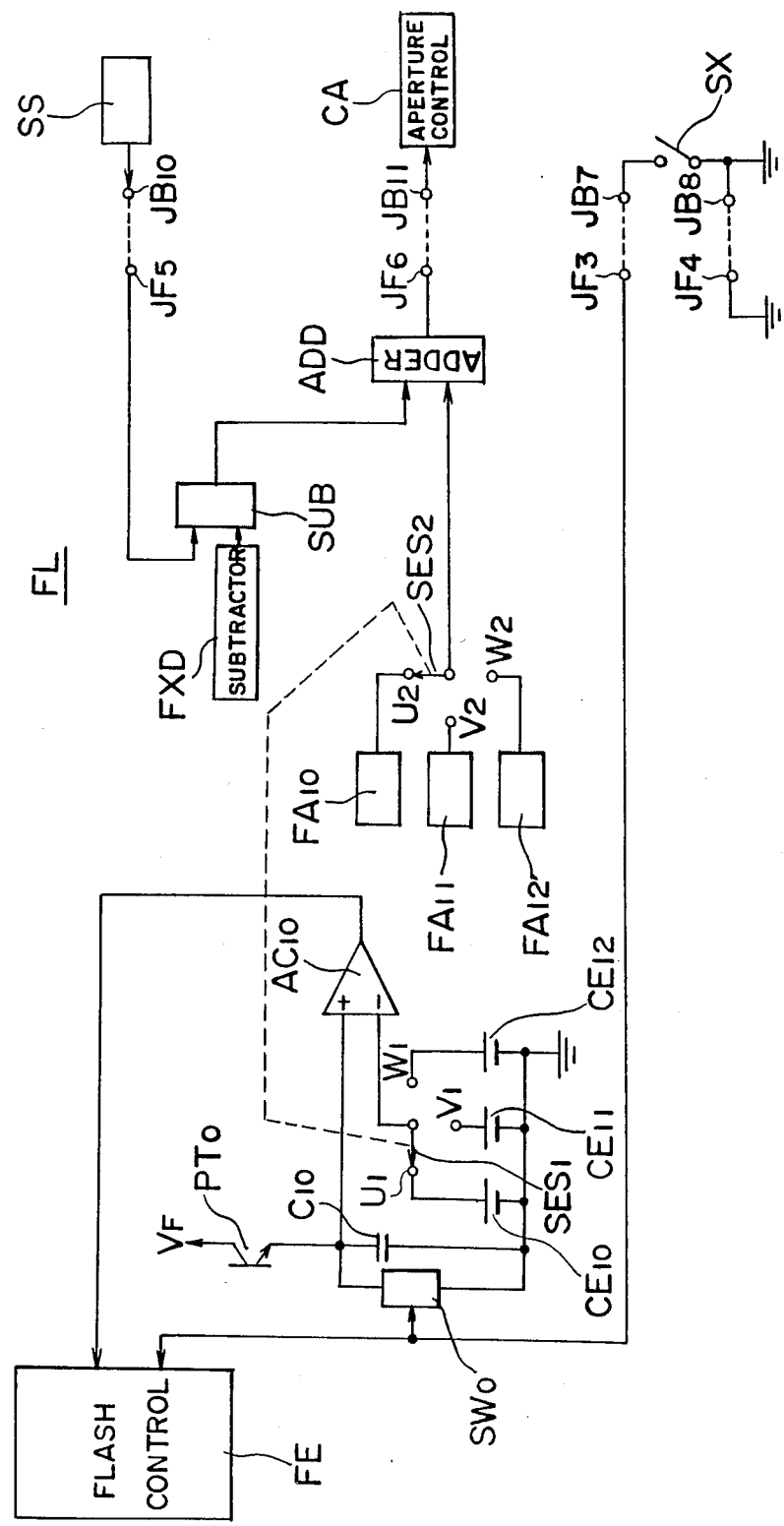
FIG. 5 is a circuit arrangement of another embodiment of the present invention.

In the embodiments shown in FIGS. 1, 2 and 3, the flash light value is controlled by the TTL light measurement which is based on the light measurement on the film plane in the camera, whereas the embodiment shown in FIG. 5 is an arrangement for controlling the flash light value under the external light measurement which is based on the light measurement by a photo sensor provided on the flash device.

It is noted that the circuits FL and FE are provided in the flash device and the remaining circuitry is provided in the camera.

Referring to FIG. 5, respective constant voltage sources CE10, CE11 and CE12 supply suitable voltages determined corresponding to the aperture value set in the flash device FL. For example, the voltage of the source CE11 is twice the voltage of the source CE10 and the voltage of the source CE12 is quadruple the voltage of the source CE10. Any one of these voltages is applied to the one input terminal of the comparator AC10 as a reference voltage through the switch SES1. The aperture signal circuits FA10 through FA12 produce signals with the aperture values of F2.8, F4 and F5.6, respectively. One of the aperture values is applied to the adder ADD through a switch SES2 coupled to operate with the switch SSE1.

The film sensitivity set in the lens is applied to the flash device FL through the terminals JB10 and JF5. The subtractor SUB calculates the equation $$Sv - 5 = \Delta Sv.$$

The aperture value calculated in the adder add corresponding to the set film sensitivity is input to the aperture control device CA through the terminals JF6 and JB11, whereby the actual aperture size is controlled by the aperture value signal. When the X contact SX is closed, the flash light unit FE starts to emit the flash light with a switch SW0 opened to commence the integration of the current flowing through photo transistor PT0 by a capacitor C10. The photo transistor PT0 is provided in the flash device for receiving the light of the photographic object. When the integrated voltage of the capacitor C10 reaches the reference voltage set by any one of the sources SES10 through SES12, the comparator AC10 outputs a "High" signal so that the flash light unit stops the light emission.

Although the aperture value with the modification by $\Delta Sv$ is calculated in the flash device in this embodiment, this calculation may be performed in the camera side in such a manner that a signal representative of the present set position of the switch SES1 is transferred to the camera whereby the aperture value is obtained corresponding to the signal of the position of the switch SES1 with the modification by Sv in the camera for controlling the actual aperture size. The film sensitivity may be produced in the flash device. The reference voltage of the comparator AC10 may be $2^5 \times \sqrt{2} \Delta Sv$. The aperture value for transferring to the lens from the flash device may be the sum of Avf5 and $\Delta Sv/2$.

Figure 6A:
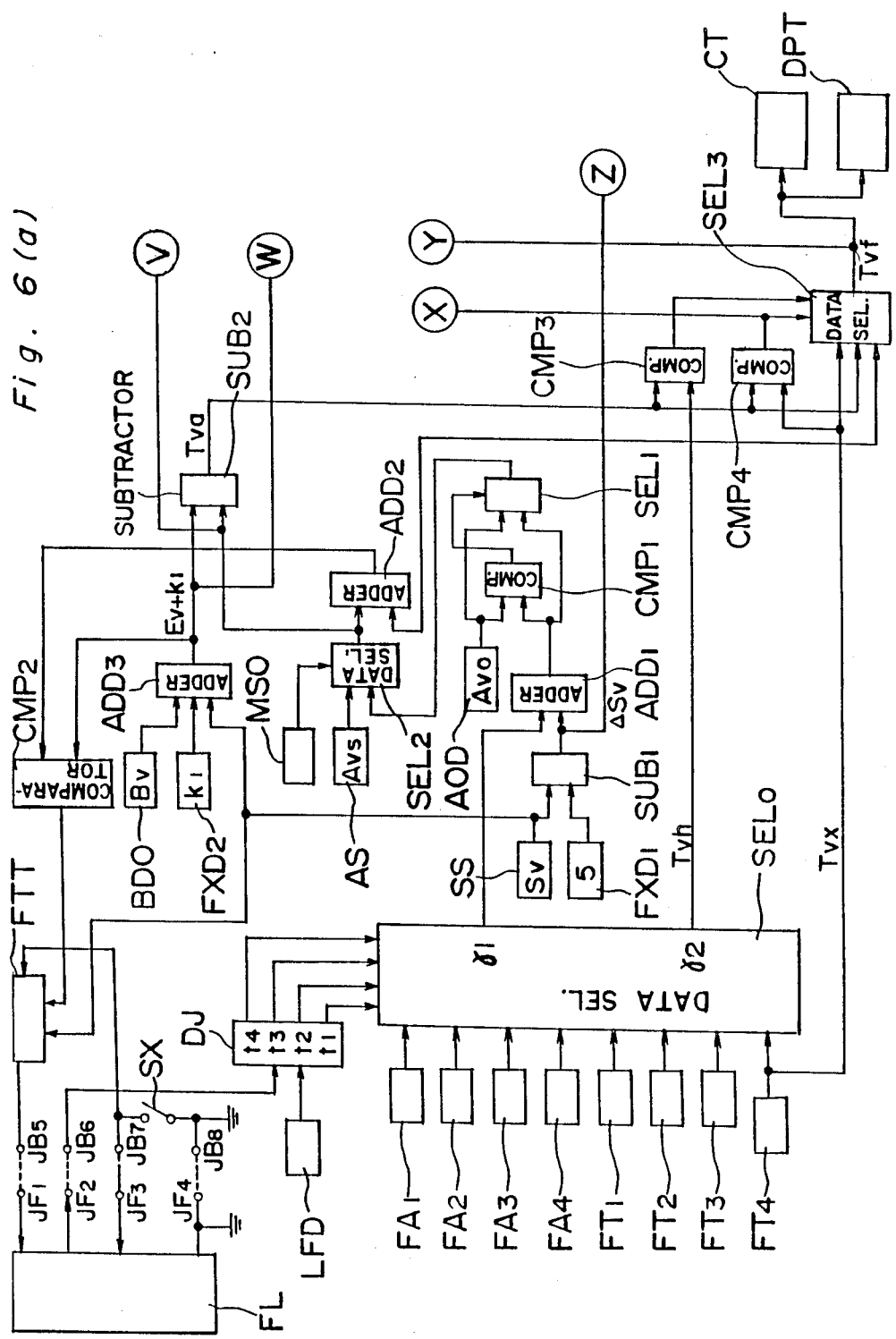
FIG. 6 is a block diagram of a further embodiment of the present invention.
Figure 6B:
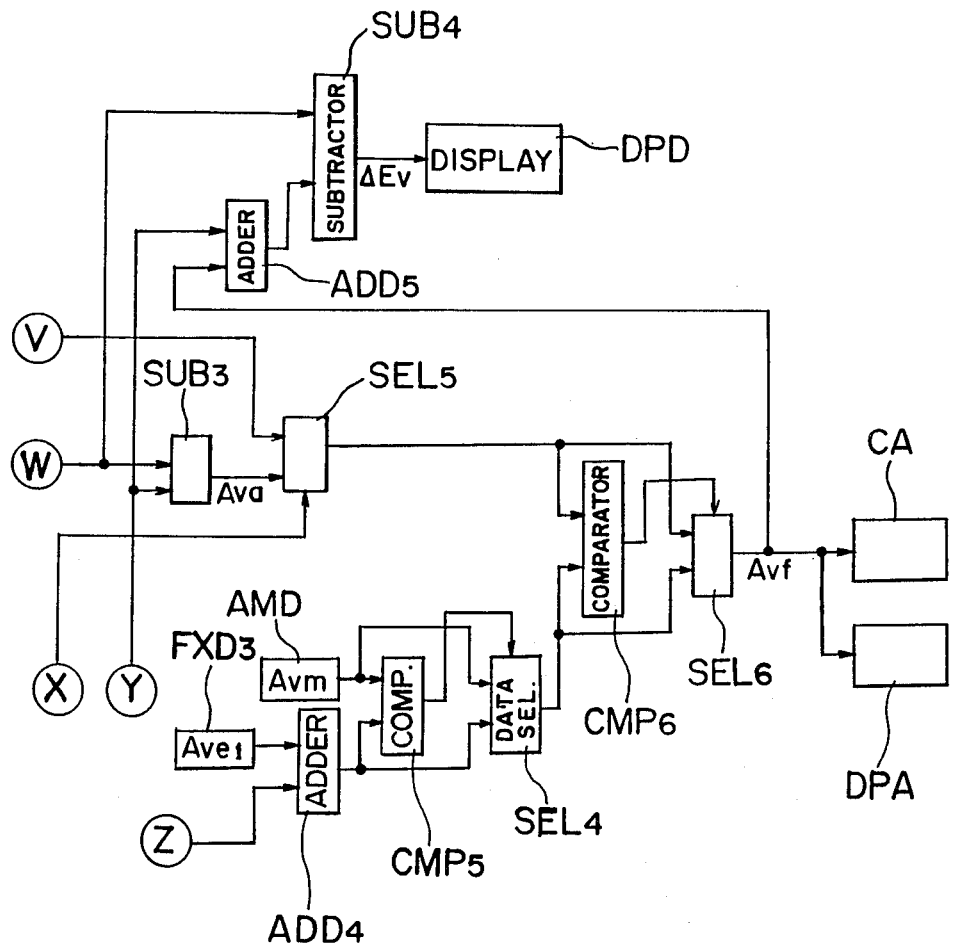

FIG. 6 shows a further embodiment of the present invention, wherein a focal length information unit LFD provides the focal length information of the interchangeable lens attached to the camera and the focal length information is applied to the determination circuit DJ.

An adder ADD3 produces the result of sum of the equation $$Avf_5 + \Delta Sv = A'vf$$

in a similar manner as described in the above mentioned embodiments

An opened aperture information unit AOD produces a data Avo showing an opened aperture value of the camera used. A comparator CMP1 compares the opened aperture data Avo and the aperture value A'vf, and if $Avo \leq A'vf$, the comparator CMP1 produces a "High" signal and if $Avo > A'vf$, the comparator CMP1 produces a "Low" signal. The data selector SEL1 transfers the aperture value A'vf to data selector SEL2 in response to reception of the "High" signal of the comparator CMP1, on the other hand, the data selector SEL1 transfers the opened aperture data Avo in response to reception of the "Low" signal of the, comparator CMP1.

An adder ADD3 is input with the output of the average light value from the average light measuring circuit BDO, fixed film data from the circuit FXD2 and the film sensitivity circuit SS to calculate the following equation $$Bv + Sv + k1 = Ev + k1.$$

An adder ADD2 is input with the aperture value Avf1 from the data selector SEL2 and the critical wobbling exposure time data Tvh from the output r2 of the data selector MP10 whereby both data are added. The comparator CMP2 compares the result of the sum of the adder ADD2 and the result of the sum of the adder ADD3. If $$Ev + k1 \geq Avf1 + Tvh \tag{01}$$

output of the comparator CMP2 is "High". If $$Ev + k1 < Avf1 + Tvh \tag{02}$$

the output of the comparator CMP2 is "Low". The state of equation (01) shows the fill-in flash mode and the state of equation (02) shows the full flash photographing mode which means the flash light is used as a main light source. Thus, the output of the comparator CMP2 is fed to the flash light control circuit FTT to set the control mode of the flash device FL.

A substractor SUB2 calculates $$Ev + k1 - Avf1 = Tva$$

to provide the exposure time Tva by the data $Ev + k1$ from adder ADD3 and the output of the data selector SEL2.

This calculation is made for the fill-in flash mode so that the exposure valve is underexposure by k1Ev against the correct time determined by the aperture value for the flash light photographing and the brightness of the photographic object for the the ambient light photographing.

A comparator CMP3 compares the exposure time Tva from the subtractor SUB2 and the blur avoiding critical exposure time Tvh which corresponds to the set focal length and obtained from the data selector SEL0.

The comparator CMP3 produces either a "Low" output if $Tva < Tvh$ or a "High" output if $Tva \geq Tvh$. A comparator CMP4 compares the exposure time Tva and the critical synchronizing exposure time from the circuit FT4 to produce either a "High" output if $Tva \leq Tvx$ or a "Low" output if $Tva > Tvx$.

A data selector SEL3 outputs any one of the data Tva, Tvh and Tvx corresponding to the outputs of the comparators CMP3 and CMP4.

Specifically, if $Tva < Tvh$ and $Tva \leq Tvx$, and the output of the comparator CMP3 is "Low" and the output of the comparator CMP4 is "High", the data selector SEL3 outputs the blur avoiding critical exposure time Tvh fed from the terminal r2 of the data selector SEL0.

If $Tvh \leq Tva < Tvx$, the comparators CMP3 and CMP4 produce "High" signals so that the data selector SEL3 outputs the exposure time data Tva for the correct exposure of the sub photographic object. If $Tvx < Tva$, the output of the comparator CMP3 is "High" and the output of the comparator CMP4 is "Low" so that the data selector SEL3 outputs the critical synchronizing exposure time Tvx from the circuit FT4.

The output data Ava of the subtractor SUB3 is applied to a data selector SEL5 which receives the aperture value Avf from the data selector SEL2. If $Tv \leq Tvx$, the data selector SEL5 outputs the aperture value Avf1 for the full-flash mode as the aperture control data Avf2 upon receipt of "High" signal from the comparator CMP4. If $Tva > Tvx$, the data selector SEL5 outputs the aperture value Ava from the subtractor SUB2 for the fill-in flash mode as the aperture control data Avf2 upon receipt of the "Low" signal from the comparator CMP4.

As the aperture value Ava is output when the critical synchronizing exposure time Tvx is output as the exposure time control data Tvf, the subtractor SUB3 calculates the aperture value Ava by the following equation $$Bv + Sv + k1 - Tvx = Ava.$$

If the actual aperture size is decreased too much compared to the desired aperture value, there may occur a light shortage even if the flash device FL emits a full light value. In order to prevent the light shortage, a fixed data output circuit FXD3 produces a fixed aperture value $Av_L1$, which corresponds to the aperture value F8 relative to the standard film sensitivity of ISO 100 (Sv=5).

An adder ADD4 calculates $$Av_L1 + \Delta Sv = A'v_L2$$

from the data of the fixed data output circuit FXD3 and the difference $\Delta Sv$ calculated by the subtractor SUB1 from the set film sensitivity and the data ISO 100.

The value $A'v_L2$ shows the critical aperture value.

Under such condition that F8 is determined as the critical aperture value for the film sensitivity ISO 100, if one kind of the film having ISO 200 is used the actual aperture size can be decreased up to F11. However, if the other type of film having ISO 50 is used, the actual aperture size can be decreased up to F5.6. Therefore by determining the critical aperture value as F8 for the film sensitivity ISO 100, the photographing system can be used for the both kinds of films of ISO 200 AND ISO 50.

A comparator CMP5 compares the aperture value Avm from the circuit AMD and the critical aperture value $Av_L2$ from the adder ADD4 to produce either a "Low" signal if $Avm < Av_L2$ or a "High" signal if $Avm > Av_L2$. A data selector SEL4 outputs either the minimum aperture value Avm upon receipt of the "Low" signal representing $Avm < Av_L2$ or the critical aperture value $Av_L2$ as the aperture control value $Av_L$ upon receipt of the "High" signal representing $Avm \geq Av_L2$.

A comparator CMP6 compares the aperture control value Avf2 for the flash light photographing and the critical aperture value $Av_L$ to produce a "High" signal if $Av_L \geq Avf2$ or a "Low" signal if $Av_L \leq Avf2$. A data selector SEL6 outputs either the critical aperture value $Av_L$ as the aperture control value Avf upon receipt of the "High" signal representing $AV_L \geq AVf2$ or the value Avf2 for the flash light photographing as the aperture control value Avf upon receipt of the "Low" signal representing $AvL \leq Avf2$.

Figure 7:
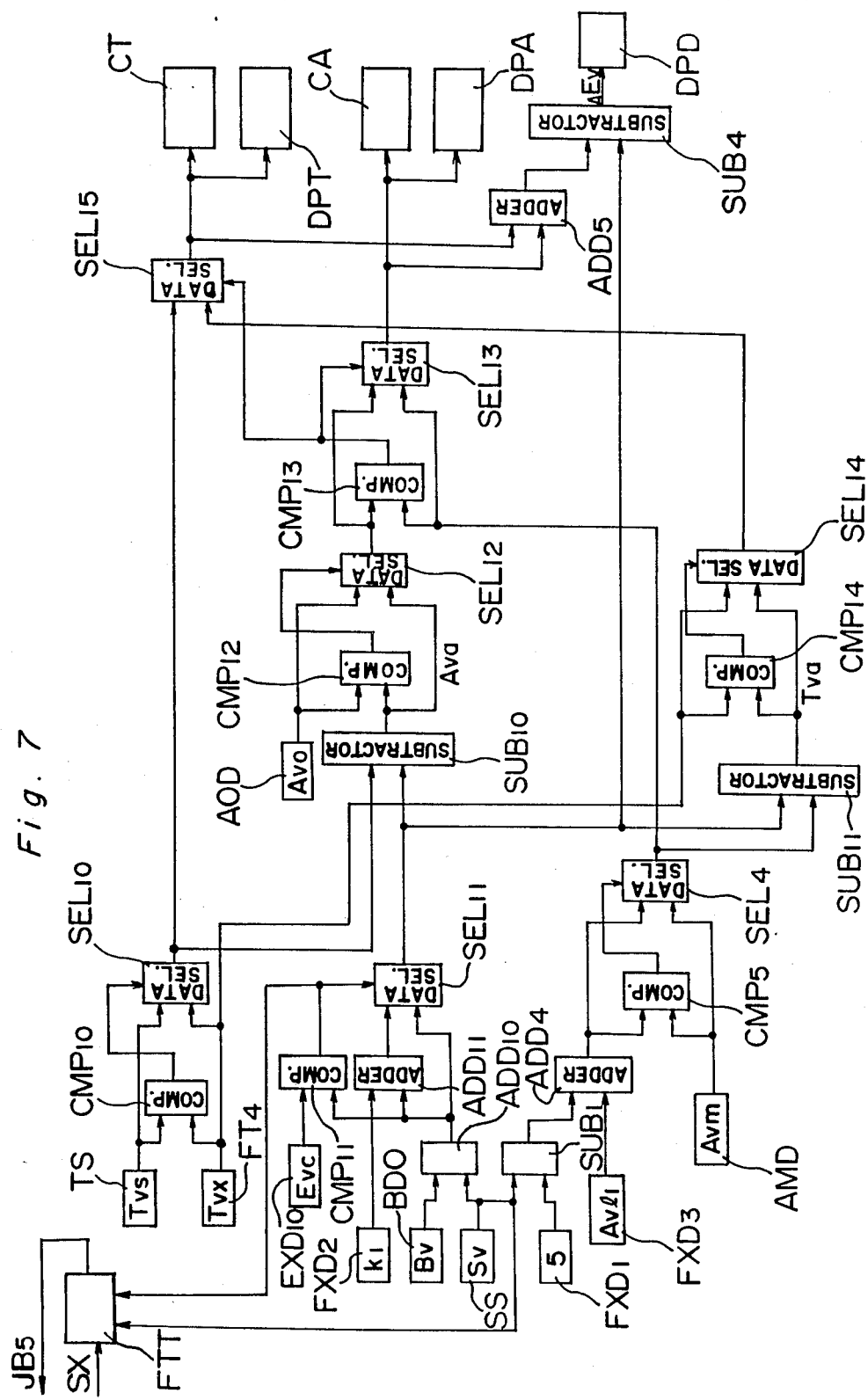
FIG. 7 is a circuit diagram showing a still further embodiment of the present invention.

FIG. 7 shows yet a further embodiment of the present invention.

A set exposure time unit TS produces an exposure time data Tvs set by a setting member in the camera by an operator and a critical synchronizing exposure time unit FT4 produces a critical synchronizing exposure time data Tvx for the focal plane shutter. A comparator CMP10 produces a "High" output if $Tvs \leq Tvx$ and "Low" output if $Tvs > Tvx$. A data selector SEL10 outputs the data Tvs upon receipt of the "High" signal of the comparator CMP10 and outputs the data Tvs upon receipt of the "Low" signal.

An adder ADD10 calculates the following equation $$Bv + Sv = Ev$$

from the output Bv of the average light measurement circuit BDO and the set film sensitivity Sv of the circuit SS. An adder ADD11 calculates $Ev + k1$ by the data $k1$ of the data output unit FXD2 and the output of the adder ADD10.

A comparator CMP11 compares a constant exposure data Evc from a circuit FXD10 and the output EV of the adder ADD10 thereby producing a "Low" output if $EV < Evc$ and a "High" output if $Ev \geq Evc$. The data selector SEL11 outputs the data Ev from the adder ADD10 upon receipt of "Low" signal from the comparator CMP11 or outputs the data $Ev + k1$ from the adder ADD11 upon receipt of the "High" output from the comparator CMP11. In other words, if $Ev \geq Evc$, as the brightness of the photographic object is relatively high, the data $Ev + k1$ is output for effecting the fill-in flash mode. If $Ev < Evc$, the brightness of the photographic object is relatively low, the data Ev is output for effecting the full flash mode. In a case where the brightness of the photographic object is low, it is considered that the main photographic object is in the front light, therefore the correct exposure is obtained by the exposure value Ev.

The outputs of the data selectors SEL10 and SEL11 are input to the subtractor SUB10 to calculate any one of the equations $$Ev - Tvs = Ava$$

$$Ev + k1 - Tva = Ava$$

$$Ev - Tvx = Ava$$

$$Ev + k1 - Tvx = Ava.$$

The comparator CMP12 compares the data Ava from the subtractor SUB10 and the opened aperture value Avo from the circuit AOD. If $Ava \geq Avo$, the comparator CMP11 produces a "High" output and if $Ava < Avo$, the comparator produces a "Low" output. A data selector SEL12 outputs the data Ava upon receipt of the "High" signal from the comparator CMP12, outputting the data Avo upon receipt of the "Low" signal.

A selector SEL4 produces the critical aperture value Av1 and a comparator CMP13 compares the data Av1, so that a data selector SEL13 provides at its output either the critical aperture value Av1 or the output of the data selector SEL12 as the aperture control data Avf.

A subtract circuit SUB11 is input with the exposure value from the data selector SEL11 and the critical exposure value from the data selector SEL4 so as to calculate the exposure data by any one of the equations $$Ev - Av11 = Tva$$

$$Ev - Avm = Tva$$

$$Ev + k1 - Av11 = Tva$$

$$Ev + k1 - Avm = Tva.$$

A comparator CMP14 produces either a "High" output if $Tvx \geq Tva$, or a "Low" output if $Tvx < Tva$. A data selector SEL14 produces either the exposure time data Tva for the correct exposure of the sub object upon receipt of the "High" signal representing the condition $Tvx \geq Tva$ or the critical synchronizing exposure time data Tvx upon receipt of the "Low" signal representing the condition $Tvx < Tva$.

A data selector SEL15 outputs the data Tvs or Tvx by the output of the comparator CMP13 when the aperture control data Ava or Avo is output from the data selector SEL13 as the aperture control data. The data selector SEL15 outputs the exposure time data Tva or Tvx from the data selector SEL14 as the exposure time control data Tvf when the data Avm or Avl is output from the data selector SEL13 as the aperture control data Avf.

Figure 8:
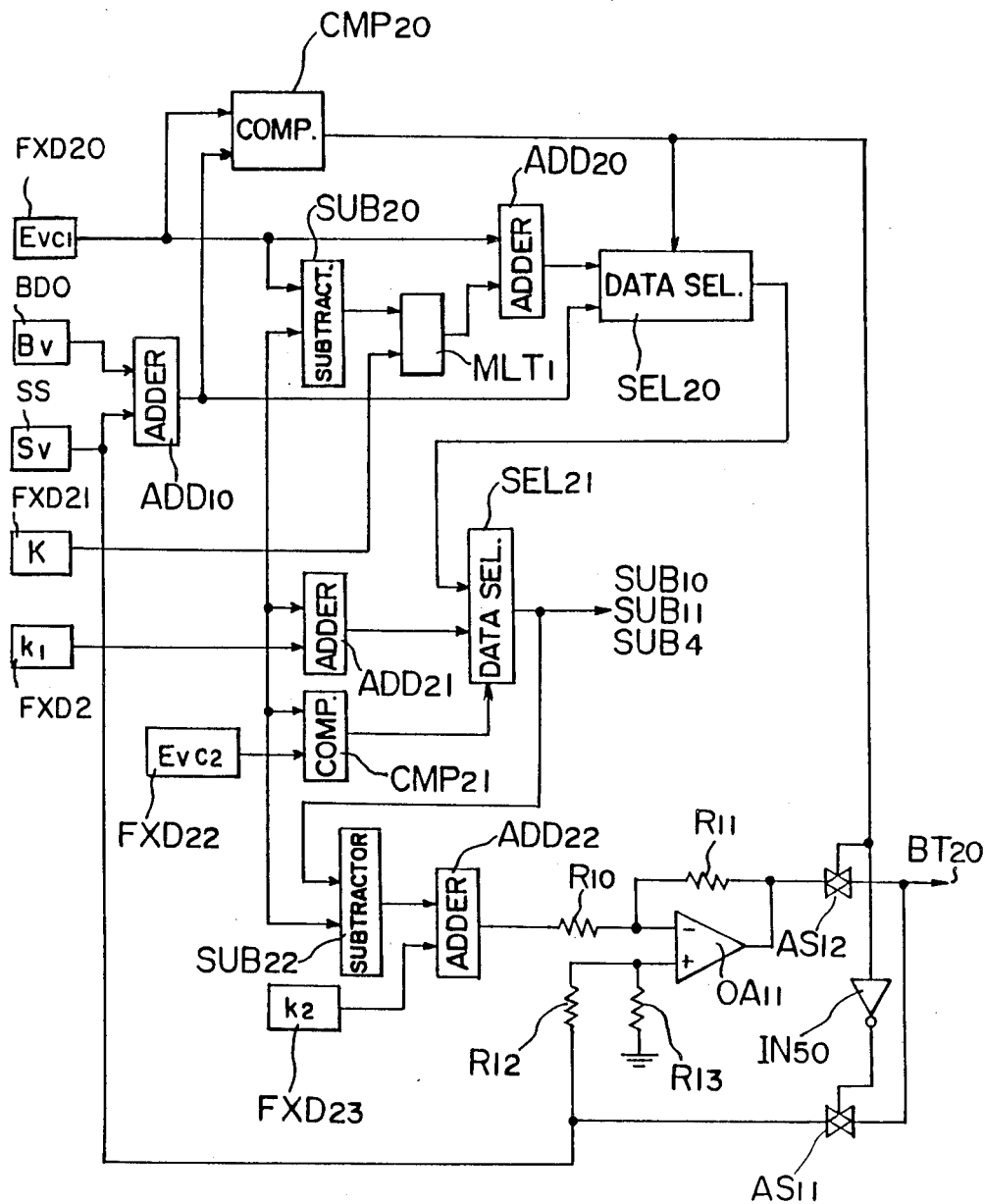
FIG. 8 is a circuit diagram showing a still further embodiment of the present invention.

FIG. 7 shows a modification of the embodiment shown in FIG. 8, wherein the exposure time is calculated on the basis of the data $Ev + k1$ or $Ev$ depending on whether $Ev \geq Evc$ or $Ev < Evc$. In this modification, the exposure time is calculated on the basis of the values $Ev$, $k(Ev - Evc1) + Evc1$ or $Ev + k1$ depending on whether $Ev < Evc1$, $Evc1 \leq Ev \leq Evc2$ or $Ev > Evc2$, wherein $$k = \frac{Evc2 + k1 - Evc1}{Evc2 - Evc1}$$

Evc1 and Evc2 are constants.

Accordingly if $Evc1 \leq Evc2 \leq Evc2$, the exposure time is controlled by the value varying from the value Evc1 to the Evc2+k1, thereby preventing a stepwise change of the exposure time of k1Ev.

A subtractor SUB20 calculates $Ev - Evc1$ and a multiplier MLT1 calculates $k(Ev - Evc1)$ from a constant value k from a circuit FXD21 and the signal of a subtractor SUB20. The multiplier MLT1 is an amplifier with the amplification factor of k. An adder ADD20 calculates $$k(Ev - Evc1) + Evc1$$

from a constant value Evc1 from a circuit FXD20 and the output of the multiplier MLT1.

A comparator CMP20 produces either a "Low" output if $Ev > Evc1$ or a "High" output if $Ev > Evc1$.

A data selector SEL20 outputs the data Ev coming from the adder ADD10 upon receipt of the "Low" signal from the comparator CMP20 representing $Ev < Evc1$, while the data selector SEL20 outputs the data $k(Ev-Evc1)+Evc1$ coming from the adder ADD20 upon receipt of the "High" signal from the comparator CMP20 representing $Ev \geq Evc1$. A data selector SEL21 outputs the output data of the data selector SEL20 upon receipt of the "Low" signal representing $Ev \leq Evc2$ from a comparator CMP21 and output the data $Ev + k1$ coming from an adder ADD21 upon receipt of the "High" signal representing $Ev > Evc2$.

The output data of the data selector SEL21 is transferred to the subtractors SUB10, SUB11 and of FIG. 7 for the exposure time calculation.

A subtractor SUB22 calculates any one of the following equations according to the data from the data selector SEL21 and the adder ADD10.

$$Ev - Ev = 0$$

$$k(Ev - Evc1) + Evc1 = k1 \frac{Ev - Evc}{Evc2 - Ec1}$$

$$(Ev + k1) - Ev = k1$$

An adder ADD22 calculates any one of the following equations according to the output data of the subtractor SUB22 and a data k2 of a constant data output unit FXD23

$$0 + k2$$

$$k1 \frac{Ev - Evc1}{Evc2 - Evc1} + k2$$

$$k1 + k2.$$

The calculation output of adder ADD22 is input to a subtract unit SUB30 composed of resistors R10, R11, R12 and R13 and an operational amplifier OA11, which produces data calculated from any one of the following equations $$Sv - k2$$

$$Sv - \left(k1 \frac{Ev - Evc1}{Evc2 - Evc1} + k2\right)$$

$$Sv - (k1 + k2)$$

Thus, if the output of the comparator CMP20 is "High" representing $Ev > Evc1$, an analog switch AS12 is switched ON for the fill-in flash mode, whereby the result of the calculation from any one of the equations $$Sv - \left(k1 \frac{Ev - Evc1}{Evc2 - Evc1} + k2\right)$$

$$Sv - (k1 + k2)$$

is applied to the base of the transistor BT20.

On the other hand, if the output of the comparator CMP20 is "Low" representing $Ev < Evc1$, the output of an inverter IN50 becomes "High" to make an analog switch AS11 ON, so that the signal SV is applied to the base of the transistor of FIG. 2.

Figure 9:
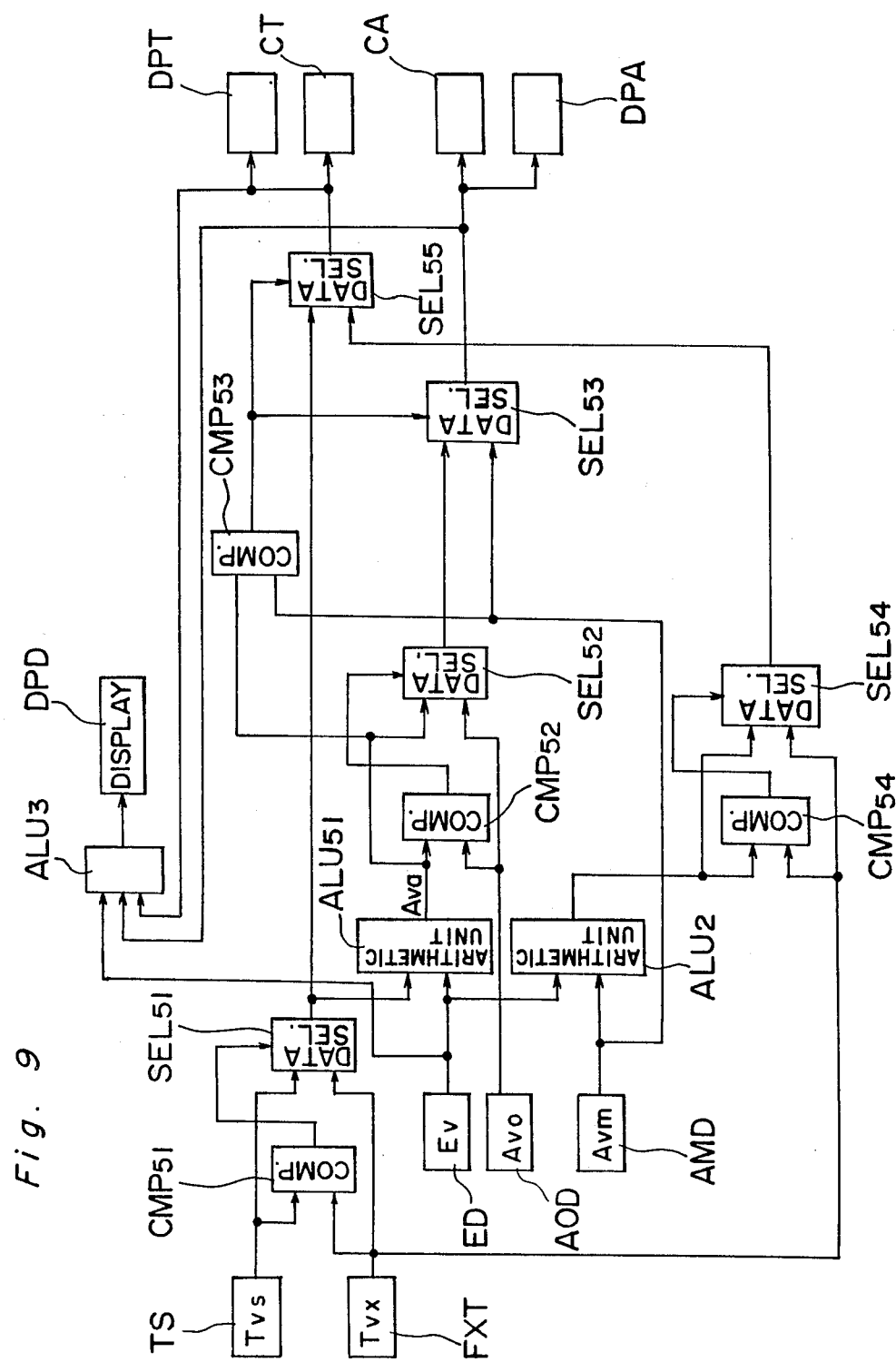
FIG. 9 is a circuit diagram showing a still further embodiment of the present invention.

Referring to FIG. 9 showing yet another embodiment of the present invention, there are provided an exposure time setting unit TS for manually setting an exposure time Tvs and a critical exposure time data unit FXT for generation of a critical synchronizing exposure time data Tvx for synchronizing the flash light emission with the movement of the focal plane shutter.

A comparator CMP51 is provided for comparing the data Tvs and Tvx to produce a "Low" output if $Tvs \leq Tvx$ and a "High" output if $Tvs > Tvx$.

A data selector SEL51 outputs either the set exposure time Tvs if $Tvs \leq Tvx$, therefore the output of the comparator CMP51 is "low" or the critical synchronizing exposure time data Tvx if $Tvs > Tvx$, therefore the output of the comparator CMP51 is "High".

An arithmetic unit ALU51 receives the exposure value Ev fed from an exposure data unit ED and the output data of the data selector SEL51 to calculate the aperture value Ava by;

$$Ev - Tvs \text{ (or } Tvx) = Ava$$

to decide the correct exposure value for the sub photographic object.

A comparator CMP52 compares the exposure value Ava from the arithmetic unit ALU51 and the opened aperture value Avo of the camera fed from the circuit AOD to output either a "High" signal if Ava≧Avo or a "Low" signal if Ava<Avo.

A data selector SEL52 output either the aperture value Ava if the output of the comparator CMP52 is "High" or the opened aperture value Avo if the output of the comparator CMP52 is "Low".

A comparator CMP53 compares a minimum aperture value Avm fed from a minimum aperture value setting unit AMD and the aperture value Ava fed from the arithmetic unit ALU51 to produce either a "High" signal if Avm≧Ava or a "Low" signal if Avm<Ava.

A data selector SEL53 outputs either the data Ava or Avo if the output of the comparator CMP53 is "High" or the data Avm if the output of the comparator CMP52 is "High".

The arithmetic circuit ALU52 calculates $$Ev - Avm = Tva$$

and the value Tva is applied to one input terminal of a comparator CMP54, which compares the exposure time value Tva and the critical synchronizing exposure time Tvx and produces either a "High" signal if Tva≦Tvx or a "Low" signal if Tva>Tvx. A data selector SEL54 outputs either the data Tva for the "High" signal of the comparator, or the data Tvx for the "Low" signal of the comparator CMP54.

In other words, the data selector SEL54 produces the data Tva if Tva<Tvx or the data Tvx if Tva>Tvx.

A data selector SEL55 outputs either the data Tvs or Tvx from the data selector SEL51 if the output of the comparator CMP53 is "High", or Tva or Tvx from the data selector SEL54 if the output of the comparator is "Low". The table 01 (at the end of the specification) shows the relationship between the value Ev and the output data of the data selectors SEL53 and SEL55.

The output data Avo, Ava or Avm of the data selector SEL53 is applied to the aperture control unit CA to control the actual aperture size of the camera and is also applied to the display unit DPA.

The output data Tvs, Tva or Tvx of the data selector SEL55 is applied to the shutter control unit CT to control the exposure time and is applied to the display device DPT for displaying the exposure time.

The arithmetic unit ALU3 calculates $$Ev - Avf - Tvf = \Delta Ev$$

from the data Avf, Tvf applied from the data selectors SEL53 and SEL55 and the data Ev from the exposure data output circuit ED.

The calculated data ΔEv is transferred to the display device DPD for displaying the degree of the over exposure or under exposure.

Figure 10:
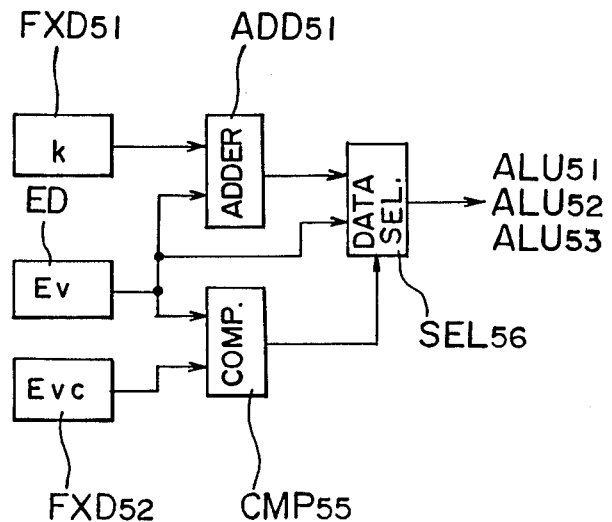
FIGS. 10 and 11 are circuit diagrams showing modifications of the embodiment shown in FIG. 9.

FIG. 10 shows a modification of the exposure data output circuit ED shown in FIG. 9.

A fixed data output circuit FXD52 outputs data Evc corresponding to Ev=10 which is compared with the data Ev from the circuit ED by a comparator CMP55. The comparator CMP55 outputs either a "High" signal if Ev≧Evc or a "Low" signal if EV<Evc.

An adder ADD51 calculates $$Ev + K$$

from the data Ev from the exposure data output circuit ED and ΔEv=K from a fixed data output circuit FXD51.

A data selector SEL56 outputs either the data Ev if the output of the comparator CMP55 is "High" or the data Ev+K from the adder ADD51 if the output of the comparator CMP55 is "Low".

Therefore, if Ev≧Evc, the data Ev+K is applied to the arithmetic units ALU51, ALU52 and ALU53 so that an underexposure value lower by KEv than the correct exposure value for the measured light value is obtained. If Ev<Evc, the correct exposure value for the measured light value is obtained.

Figure 11:
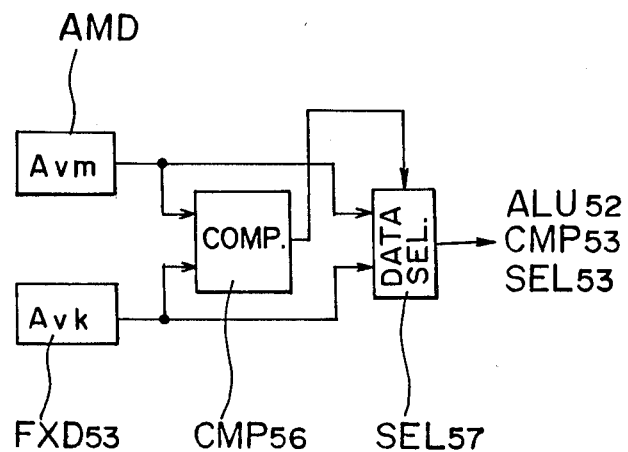

The advantage of the modification of FIG. 11 is described hereinafter.

Usually, a fill-in flash mode is used for rear light photographing, where the brightness of the main photographic object in the central portion of the picture plane is lower than the brightness of the sub photographic object existing in the peripheral portion of the picture plane. On the other hand, the photo sensor is provided for measuring essentially an average light in the central portion of the picture plane. Therefore, in case of a fill-in flash mode, the output of the photo sensor is lower than the brightness of the sub photographic object.

Therefore by calculating the exposure value by compensating with the value KEv corresponding to the measured value of the photometry of the photo sensor, the desired exposure value for the sub photographic object can be obtained.

FIG. 11 shows a modification of the minimum aperture value output circuit AMD.

A critical aperture value Avk is produced from a circuit FXD53. The value Avk is 6, for example. A comparator CMP56 compares the value Avk and a constant minimum aperture value Avm to output a "High" signal if Avk>Avm or a "Low" signal if Avk≦Avm.

A data selector SEL57 outputs the minimum aperture value Avm upon receipt of the "High" signal from the comparator CMP56 i.e., in case of Avm<Avk or the critical aperture value Avk (=6) upon receipt of the "Low" signal from the comparator CMP56 i.e., in case of Avm≧Avk.

The output of the data selection SEL57 is transferred to the arithmetic circuit ALU52, the comparator CMP53 and the data selector SEL53.

According to the arrangement shown in FIG. 11, if the critical aperture value is larger than the minimum aperture value Avm, the minimum coupled aperture range is limited to the critical aperture value Avk. Therefore, in a case where the brightness of the photographic object is high, a correct exposure to the main object can be assured by preventing a excessive decrease of the actual aperture size.

Figure 12:
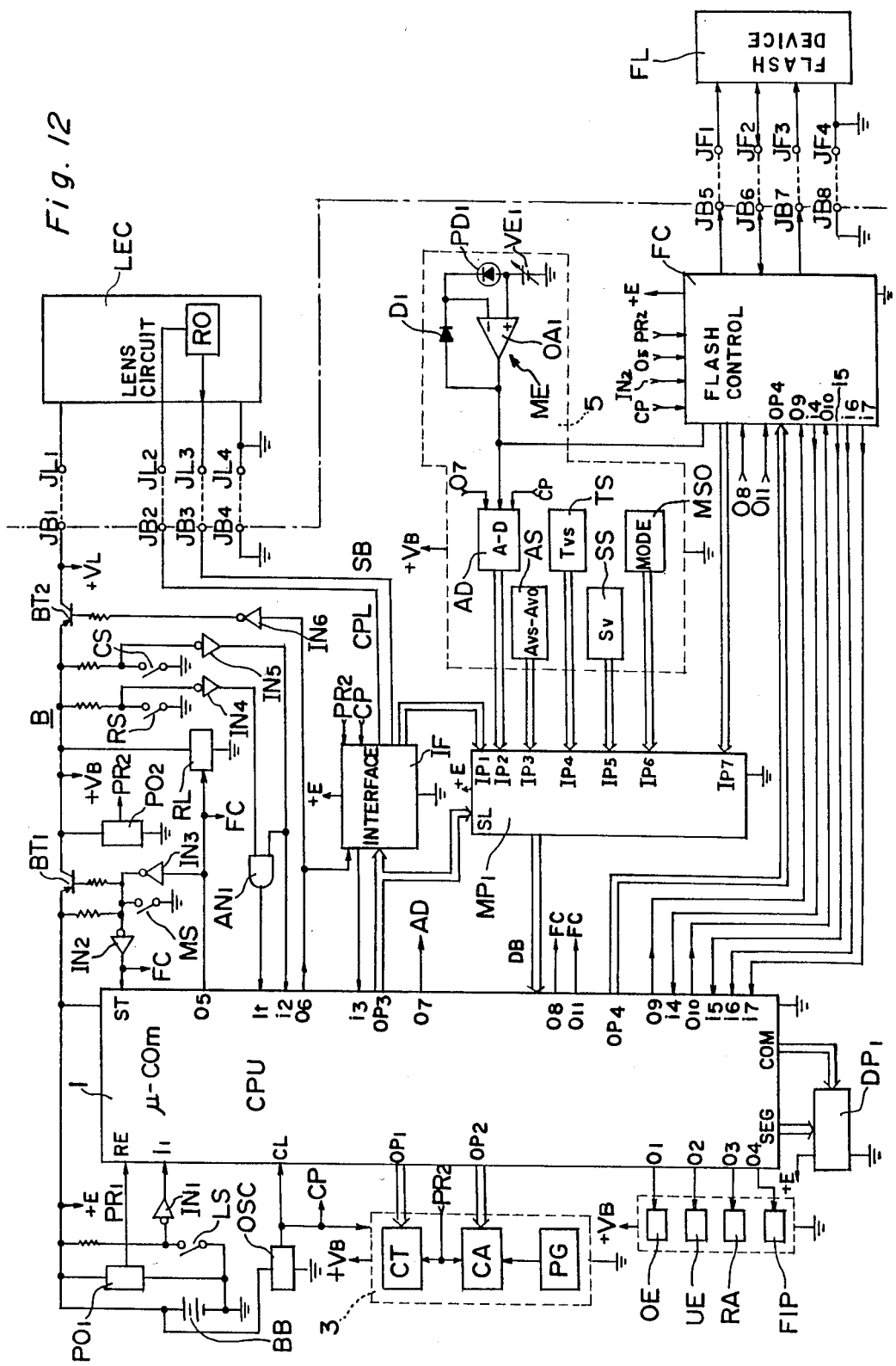
FIG. 12 is a circuit diagram showing a still further embodiment of the present invention.

In FIG. 12, a central processing unit 1 (referred to as CPU hereinafter) composed of a microprocessor is provided for controlling the various control sequences of the circuit arrangement shown in FIG. 13. From battery BB power on reset circuit PO1 produces a power ON reset signal PR1, which is sent to the reset input terminal RE of the CPU 1 for initialization of the CPU 1. An oscillator OSC produces a clock pulse train CP which is supplied to the CPU 1 and the essential parts of the circuits of FIG. 12 for controlling them in synchronism with the clock pulse.

A display device DP1 includes a liquid crystal display device having eight segments for each digit and receives the signals fed from the terminals SEG and common terminal COM of the CPU 1 for displaying the exposure control values and various exposure control modes used in the camera system. The battery BB supplies the DC power to the CPU 1, the oscillator OSC, the display device DP1, an interface circuit IF, a flash control device FC, a data selector MP1, inverters IN1 through IN6, and an AND gate AN1 through a line +E.

When a light measurement switch MS is closed to be ON for a light measurement operation, a "High" level signal is applied to the input terminal ST of the CPU 1 to start reading the data for the exposure control. Simultaneously, analog-to-digital conversion of the result of the light measurement and the calculation and display of the exposure value are started. Also when the light measurement switch MS is closed, a transistor BT1 conducts so that the DC power is supplied to the circuit arrangement through the line +VB. When the DC power is supplied from the line +VB, a power ON reset circuit PO2 generates a power ON reset signal PR2, which is supplied to an exposure time control circuit CT and the aperture control circuit CA to reset them.

An exposure control unit 3 surrounded by a dotted line is composed of the exposure time control circuit CT, the aperture control circuit CA and a pulse generator PG. The exposure time control circuit CT receives the exposure time data Tv from the output terminal OP1 of the CPU 1 to produce a time interval signal representing a time interval $2^{-Tv}$ between the beginning of shutter release and the ending of shutter closure on the basis of the clock pulses CP. The exposure time can be controlled by the time interval signal.

The pulse generator PG generates a pulse train the number of pulses of which corresponds to the amount of rotation angle of an aperture ring (not shown) provided in the lens LE for changing the actual diaphragm aperture size. The aperture control circuit CA is supplied with the data Av representing a number of steps for the aperture size to be reduced from its full aperture condition, the data Av being fed from the output terminal OP2 of the CPU 1 and the pulse train from the pulse generator PG.

Aperture control circuit CA counts the number of the pulses fed from the pulse generator PG and compares the number of pulses thus counted and the data Av representing the calculated aperture value fed from the CPU 1 to produce an output signal when the counted number of the pulses coincides with the data Av for stopping the rotation of the aperture ring.

A switch LS is provided for detecting the lens LE attached to the camera. The switch LS is closed upon mounting of the lens to the camera and opened upon removal of the lens from the camera. When the switch LS is closed a high signal is supplied to the input terminal i1 of the CPU 1 through the inverter IN1 to cause the CPU1 to read-in the data of the lens LE to calculate the exposure time. When the switch LS is opened, the input terminal i1 of the CPU 1 is low so that the CPU 1 performs other calculations as hereinafter described.

Figure 13:
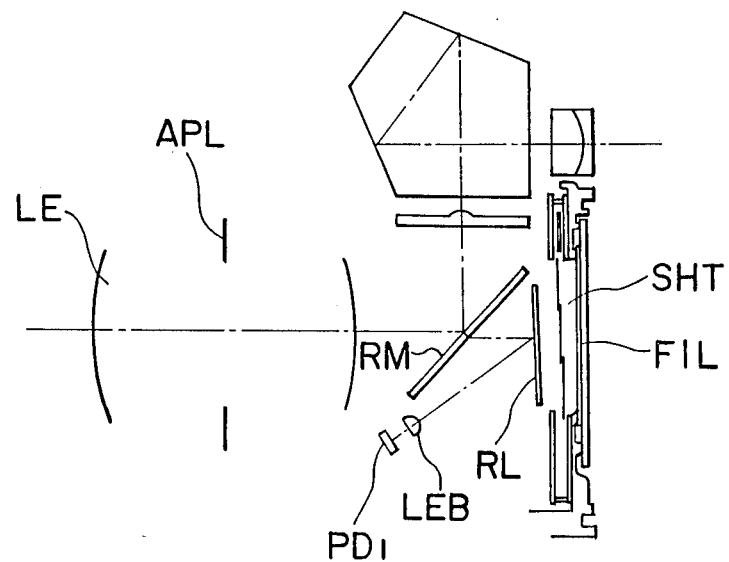
FIGS. 13 and 14 are schematic diagrams showing the lens arrangement of a camera used in the present invention.
Figure 14:
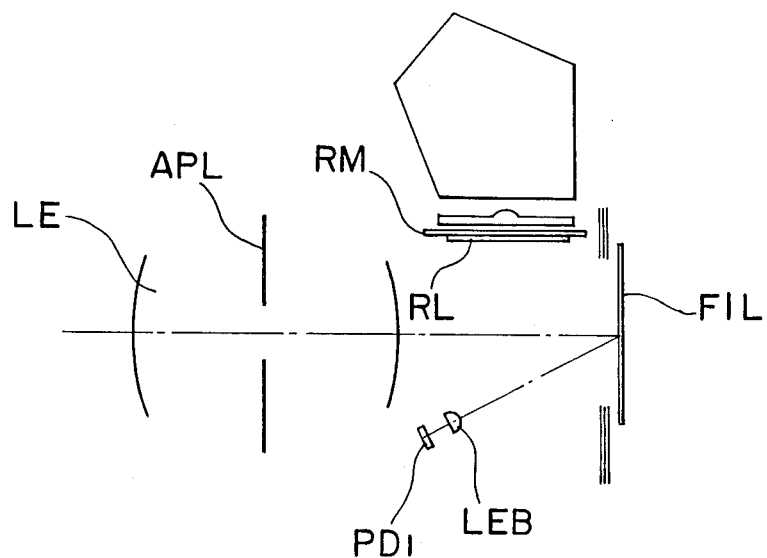

A block 5 shows an exposure data output unit, wherein PD1 is a photo sensor mounted in a single lens reflex camera as shown in FIGS. 13 and 14. In FIG. 13 showing an initial stage of the camera, the diaphragm aperture APL is fully opened and a reflection mirror RM is in the dropped position so as to introduce lays of light from the photographic object to the view finder optical system. The rays of light of the photographic object passes a half mirror formed in the central portion of the reflection mirror RM, and is reflected by a reflection plane RL, and subsequently impinges on the photo sensor PD1 through a condenser lens LEB. Under such a state, the operational amplifier OA1 in FIG. 12 generates a light measurement output of Bv+Sv−Avo, wherein Bv is the brightness of the photographic object, Avo is the full open aperture value, Sv is an apex value corresponding to the film sensitivity.

In FIG. 14 showing the exposuring condition of the camera, the diaphragm aperture APL has been stopped down to a size corresponding to the calculated or set aperture value Av, while the reflection mirror RM and the reflection plane RL have been raised to allow the passage of the rays of light from the photographic object. The shutter SHT has been released and is open, so that the rays of light having passed the lens LE and the diaphragm aperture APL are reflected by the photographic film FIL and in turn, the rays of light of the object enter the photo sensor PD1. Under such a state, the operational amplifier OA1 generates an output of Bv+Sv−Av. As hereinafter described the amount of light of the flash device FL is controlled by the output of the operational amplifier OA1.

The analog-to-digital converter (referred to as AD converter hereinafter) AD operates to convert the light measurement data of Bv+Sv−Avo fed in an analog form from the operational amplifier OA1, to digital data when the CPU 1 produces a "High" level output pulse from the output terminal O6. The digital data is fed to the input terminal IP2 of a data selector MP1.

An aperture setting circuit AS supplies data Avs−−Avo representing the position of the aperture control ring of the interchangeable lens LE, to the input terminal IP3 of the data selector MP1.

An exposure time setting circuit TS generates exposure time data which corresponds to the exposure time manually set by an exposure time setting member provided in the camera. The output terminal of the exposure time setting circuit TS is connected with the input terminal IP4 of the data selector MP1.

A film sensitivity setting circuit SS generates digital data corresponding to the film sensitivity manually set by a film sensitivity setting member (not shown) provided on the camera. The output terminal of the film sensitivity setting circuit SS is connected with the input terminal IP5 of the data selector MP1.

A mode setting circuit MSO generates signals representing one of the exposure control modes which is set by a mode setting member provided in the camera. The output terminal of the mode setting circuit MSO is connected with the input terminal IP5 of the data selector MP1.

An interface IF reads various data from the interchangeable lens circuit LEC when the output terminal O5 of the CPU 1 becomes "High". After completion of the data read-in operation, the interface IF transfers the various data to the CPU 1 through the data selector MP1 and an external data bus DB corresponding to the control data of 4 bits fed from the output terminal OP3 of the CPU 1. The detailed circuit arrangement of the interface IF will be explained with reference to FIG. 23 later.

A flash light control circuit FC transfers various data between the CPU 1 and the flash device FL in response to the signals fed from the output terminals O5, O8, O9, O10 and O11 of the CPU 1 and the inverter IN2. The detailed arrangement of the flash light control device FC will be described later.

The data selector MP1 transfers the output data on the input terminals IP1 through IP7 to the CPU 1 through the data bus DB in response to data of 4 bits applied to the selection terminal SL from the output terminal OP3 of the CPU 1.

Table 2 (at the end of the specification) shows which kinds of data can be transferred to the data bus DB through the data selector MP1 in response to the input data on the selection terminal SL. For example, when the selection terminal SL is "0000" or "$0_H$", wherein the index H means hexa decimal digit, a set exposure time data Tvs applied to the input terminal IP4 is transferred to the data bus DB from the data selector MP1.

When the selection terminal SL has one of the data of $6_H$ through $C_H$, the interface IF produces the data which are read from the lens circuit LEC as shown in the table 2, the data is fed to the input terminal IP1 of the data selector MP1 and in turn transferred to the data bus DB to input the data in the CPU 1. When the lens detection switch LS is opened, i.e., an interchangeable lens is not attached to the camera, the input terminal i1 of the CPU is kept "Low" so that the CPU 1 produces only the data of "$0_H$" through "$4_H$", therefore the various data of the lens LE can not be supplied to the CPU 1.

A release switch RS is closed in response to depression of the release button or shutter button of the camera and opened upon release of the release button.

A switch CS is closed upon completion of the film winding-up and opened upon termination of an exposure control cycle so as to prevent undesired exposure.

The closure signal of the release switch RS is applied to one input terminal of the AND gate AN1 through the inverter IN4. On the other hand, the closure signal of the switch CS is applied to the other input terminal of the AND gate AN1 through the inverter IN5 and to the input terminal i3 of the CPU 1. The output terminal of the AND gate AN1 is connected with the interrupt terminal Ib of the CPU 1.

The output terminal O5 of the CPU 1 is connected with an input terminal of the inverter IN3, the output of which is connected with the base of the transistor BT1 through a resistor so that the transistor BT1 remains ON even if the light measurement switch MS is opened during exposure control operation. The output terminal O6 of the CPU 1 is "High" while the interface IF reads in the data of the lens LE. The output terminal O6 is connected with an input terminal of an inverter IN6, the output of which is connected with the base of the transistor BT2 so that the transistor BT2 conducts to supply DC power to the lens circuit LEC through the terminals JB1 and JL1 when the output 06 is "High" and the output of the inverter IN6 is "Low". In the lens circuit LEC, ROM memorizes various lens data.

The address data and the memorized data in the ROM RO are transferred between the lens circuit LEC and the interface IF through the connection terminals JB3 and JL3 in synchronism with the clock pulse train CPL which is supplied to the lens circuit LEC from the interface IF through the connection terminals JB2 and JL2.

Figure 15A:
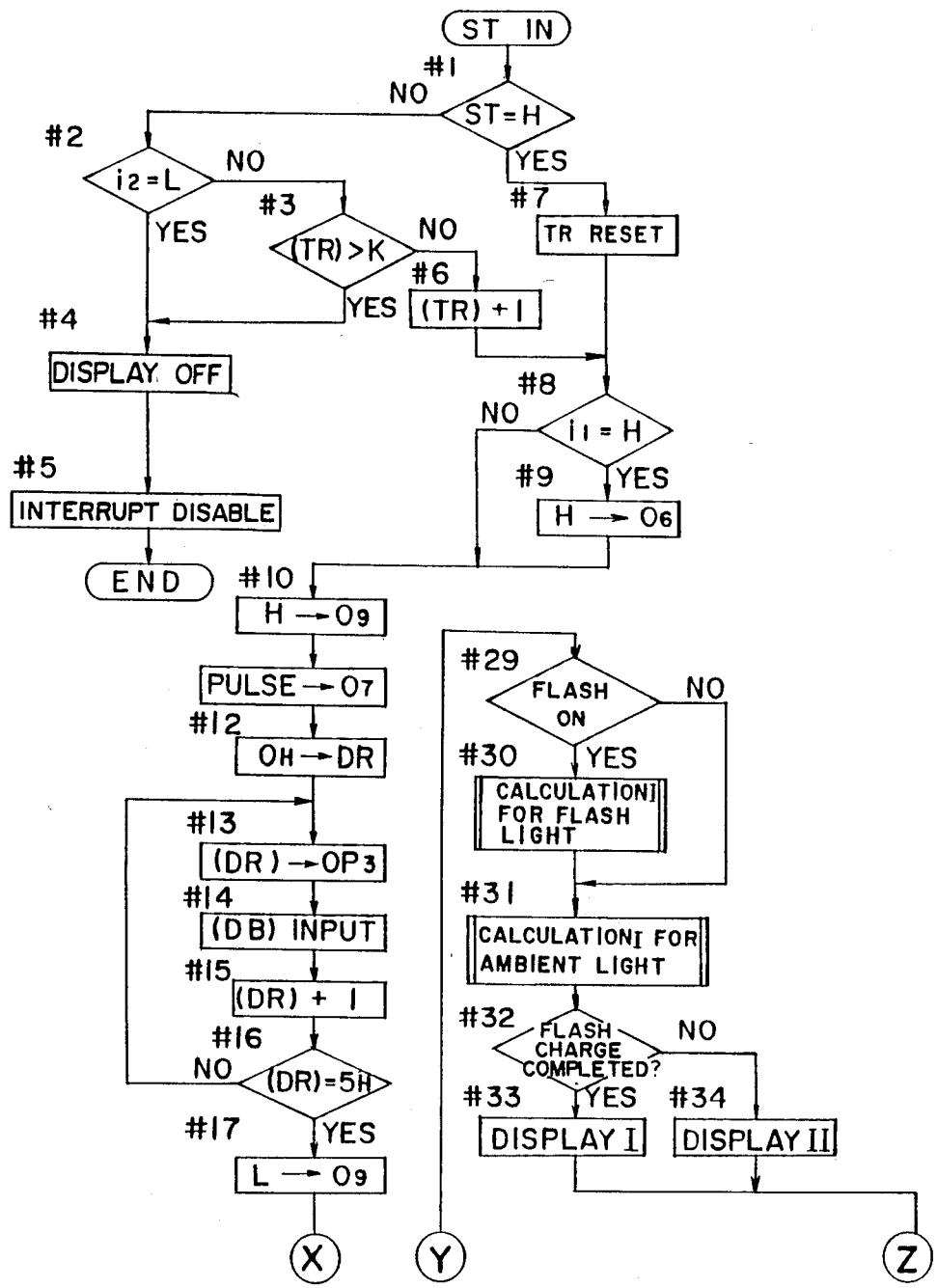
FIG. 15 is a flow chart showing the operation of the photographing system shown in FIG. 12, FIGS. 16 through 18 are characteristic curves showing the operation of the photographing system shown in FIG. 12, FIGS. 19 and 20 are flow charts showing the operation of the photographing system shown in FIG. 12.
Figure 15B:
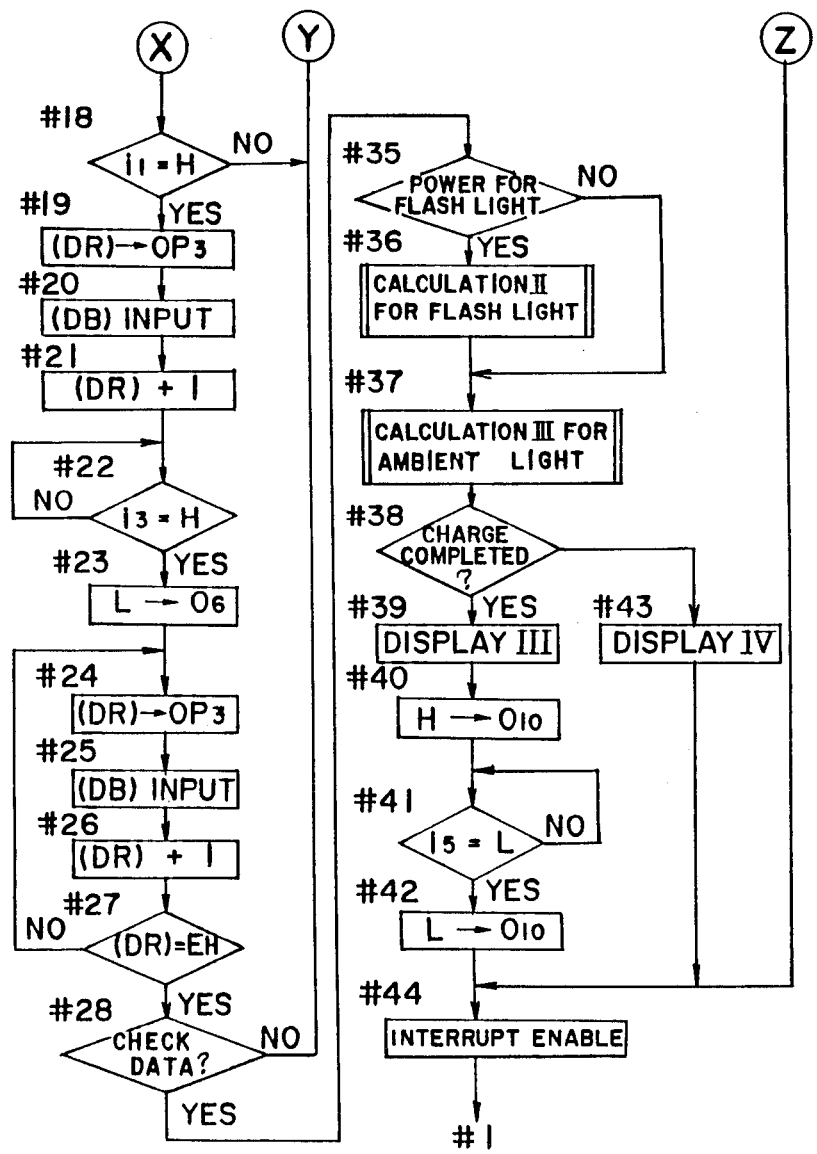
Figure 15C:
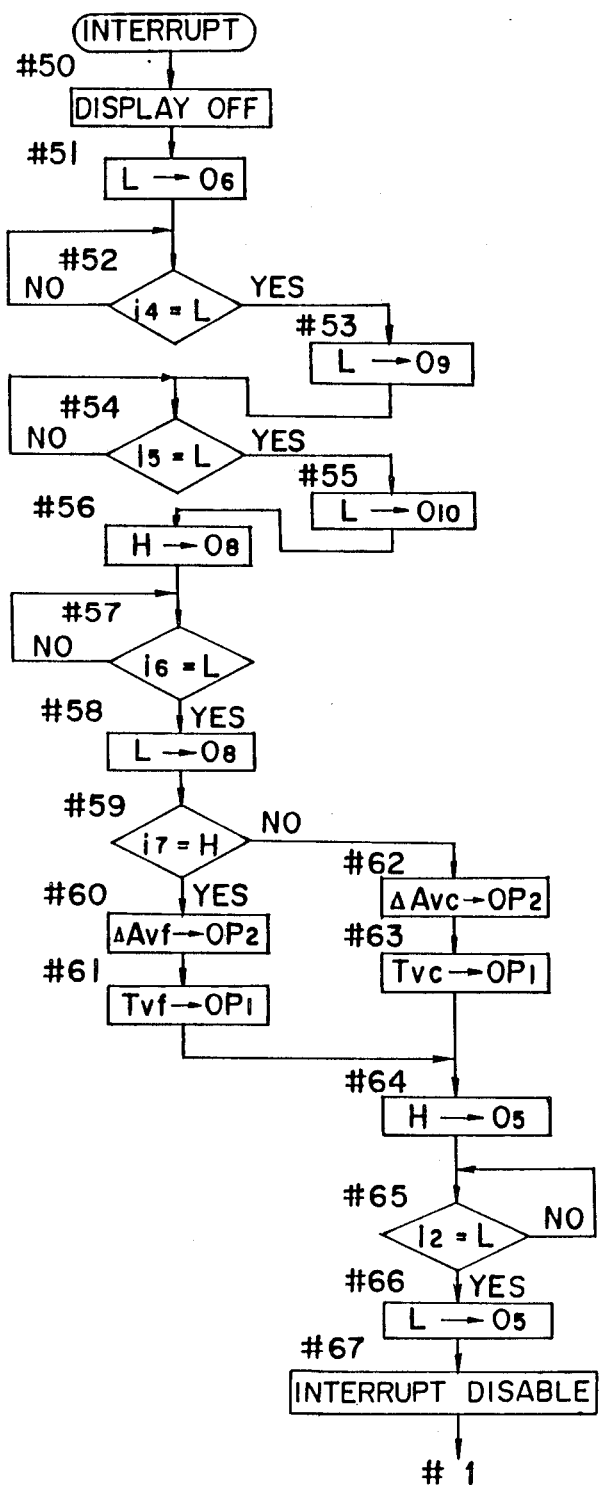

The operation of the circuit arrangement of the camera system shown in FIG. 12 is explained hereinafter with reference to FIG. 15.

When the camera system is not used, the CPU 1 is in a stand-by state and the clock pulse train CP is not supplied to the CPU 1 so as to save the DC power supply of the battery BB. When the light measurement switch MS is closed a "High" signal is fed to the CPU 1 to start it. The flash control circuit FC gives a start signal for starting a voltage booster in the flash device FL. At the step #1, the state of the terminal ST is determined. If the state of the terminal ST is "Low" the program goes to #2. If the state of the terminal ST is "High", the program goes to #7 to reset a resistor TR acting as a timer. In the program #8, whether or not the lens LE is attached to the camera is determined by the state of the input terminal i1. If the input terminal i1 is "Low", the program goes to #10. However, if the terminal i1 is "High", the program goes to #9, causing the output terminal O6 to be "High", thereby causing the transistor BT2 to be conductive to supply the DC power to the lens circuit LEC, causing the interface IF to start to read out the data of the lens LE attached to the camera. Then the program advances to #10, wherein the output terminal O9 of the CPU 1 is "High" to cause the flash control circuit FLC to read out the data of the flash device FL1 and then goes to #11 to generates a "High" pulse from the output terminal O7 of the CPU 1. By the "High" pulse on the terminal O7, the A-D converter AD starts to convert the analog information of the light measurement result fed from the operational amplifier OA1 to the digital information. In the step #12, 4 bit data $0_H$ is set in the data register DR and the 4 bit data $0_H$ appears on the output terminal OP3 of the CPU 1 such that the exposure time data Tvs is output from the data selector MP1. The data Tvs is stored in the register in the CPU 1. In the step #15, "1" is added to the content of the register DR. Subsequently, in the step #16, whether or not the data of the register is $5_H$ is determined. If the content of the register DR is not $5_H$, the program returns to #13 and repeats the sequence described above.

When the content of the register DR is $1_H$, the film sensitivity Sv is read in the CPU 1. When the content of the register DR is $2_H$, the exposure mode data is read in the CPU 1.

When the content of the register DR becomes $3_H$, the AD conversion in the AD converter AD is completed to generate data of the brightness of the main object $$Bv + Sv - Avo$$

is read in the CPU 1 to store in a suitable register.

In a similar manner as described above, when the contents of the data register DR is "$4_H$", the data selector MP1 transfers the flash control data on the input terminal IP7 fed from the flash device FL to the CPU 1. In the step #16, as the content of the data register DR is "$5_H$", the program goes to #17, whereby the output 09 becomes "Low" to disable the flash control device FC and in turn the program flow goes to #18, wherein the state of the input terminal i1 is determined. In a case where the switch LS is open, i.e., the output of the inverter IN1 is "Low", the program flow goes to #29 the detail of which will be described later. In a case where the interchangeable lens LE is attached to the camera with the switch LS closed, i.e., the input terminal i1 is "High38 , the program flow goes to #19. In the step #19, the data $5_H$ in the register DR is output on the terminal OP3 so that the data representing the aperture value Avs - Avo is transferred to the data bus DB for applying the data to the CPU 1. In the step #20, the data Avs - Avo is stored in the register (not shown) and thereafter, 1 is added to the content of the data register DR and the program flow goes to #22.

In the step #22, The CPU 1 waits for the time when the input terminal i3 becomes "High". When the read-in operation of the data of the lens circuit LEC in the interface IF is completed, the interface IF applies a "High" signal to the input terminal i3 of the CPU 1.

By the "High" signal of the interface IF, the program flow goes to #23, wherein the output terminal O6 of the CPU becomes "Low" which is reversed to "High" by the inverter IN6, thereby causing the transistor BT2 to be non-conductive, resulting in cutting off the DC power supply to the lens circuit LES.

When the input terminal i3 of the CPU 1 becomes "High", one of the data stored in the interface IF is selectively transferred to the CPU 1 depending on the contents of the data on the terminal OP3 of the CPU 1. Namely, checking data is transferred to the input terminal IP1 of the data selector MP1 corresponding to the data "$6_H$", similarly the open aperture value Avo for the data "$7_H$", the maximum aperture value Avm for the data "$8_H$", the minimum focal distance fw for "$9_H$", the maximum focal distance ft for "$A_H$", Dv (explained hereinafter) for "$B_H$", the set picture taking distance Dv for "$C_H$" and the set focal distance fs for "$D_H$" are respectively transferred to the input terminal IP1 of the data selector MP1. These data are transferred to the CPU 1. When the read-in operation of the data in the CPU 1 is completed in the step #27, the content "$E_H$" of the data register DB is detected to advance the program flow to the step #28. In the step #28, whether or not the checking data is applied to the CPU 1 is determined. The checking data shows that the interchangeable lens is attached to the camera. The checking data is the same for all kinds of the interchangeable lenses.

When the checking data is detected, the program flow goes to the step #35. However, when the checking data is not detected, the program flow goes to the step #29. The latter case occurs either when any one of the interchangeable lenses is attached to the camera or when an accessory such as an intermediate ring or a bellows is interposed between the lens and the camera.

In a case where the step #29 is selected, whether or not the flash light photographing mode signal is present is determined in the step #29 for determining whether or not the flash device FL is attached to the camera. When the flash device FL is not attached to the camera, all the data on the connecting terminal JB6 is made "Low", then the program flow goes to the step #31 so as to calculate data for ambient light photographing. When one of the aperture priority exposure mode or exposure priority aperture mode is selected by a mode selecting device, the light measurement circuit ME produces Bv−Avn, wherein Avn shows the effective aperture value. Then the exposure time Tvc is calculated by the equation $$(Bv-Avn)+Sv=Tvc.$$

The speed of the shutter SHT of the camera is controlled by the value calculated by the above equation. In this case, the decreasing value Av of the aperture is zero and therefore the diaphragm aperture APL is not drawn. In this case the exposure time is controlled by the TTL (through the lens) exposure measurement with the shooting aperture method.

If the manual aperture setting mode is selected, the exposure time is controlled by the manually set value, the decreasing value of the aperture is set to zero so that the value of the actual diaphragm aperture APL is kept unchanged.

However when the fact that the flash device is attached to the camera is detected in the step #29, the program flow goes to step #30 for calculating the control data for the photographing. In this case the aperture value Avf is made zero. The exposure time value Tvf is set by the exposure value corresponding to the critical synchronizing exposure time such as 1/250 sec when one of the automatic exposure control modes is selected. In a case where the manual exposure control mode is selected, if the set exposure time Tvs is shorter than the critical synchronizing exposure time, the data Tvf is selected for the exposure time control. If the set exposure time Tvs is longer than the critical synchronizing exposure time, the set exposure time Tvs is selected as the exposure time data Tvf for the flash control.

Subsequently, the calculation for the exposure data for the picture taking under the ambient light is performed in the step #31 as described above and then the program flow goes to the step #32, wherein whether or not the main capacitor in the flash device FL is changed up to the predetermined voltage is determined by the data sent from the flash device to the CPU 1. When the charged voltage reaches the predetermined value, the program flow goes to the step #33, whereby a display device is lit to show that flash picture taking is ready. If the voltage in the main capacitor does not reach the predetermined value, the program flow goes to the step #34, to display that the picture taking with ambient light is ready.

In the step #28 described above, when the checking data is detected, the program flow goes to the step #35, wherein upon detecting that the flash device FL is attached to the camera, the calculation of the data for the flash light photographing is made and in turn the program flow goes to the step #37. On the other hand, upon detecting that the flash device is not attached to the camera, the program flow goes to the step #37 for calculation of the following equation for photographing with ambient light.

$$(Bv+Sv-Avo)-Avo=Ev \qquad (1)$$

In addition when the program mode is set, the following equation $$p \cdot Ev = Av \ (0 < p < 1) \qquad (2)$$

is calculated. When Avo≦Avc≦Avm, (wherein Avo is the open aperture value and Avm is the maximum aperture value), the following equation $$Ev - Av = Tv \qquad (3)$$

is calculated. The calculated value Tv is used as the exposure time value for the picture taking with ambient light. When Av<Avo, the following equation $$Ev - Avo = Tv \qquad (4)$$

is calculated. In a case where the calculated exposure time Tv is smaller than $Tv_{min}$, the value $Tv_{min}$ which, is the maximum exposure time, is used as the control value Tvc with a warning lamp lit for indicating that the exposure value thus calculated is under the desired exposure value. When $Tv \geq Tv_{min}$ the value calculated by the equation (4) is used as the control value Tvc. When the aperture value Av calculated by the equation (2) is greater than Avm, the data Avm is used as a control value and the following equation $$Ev - Avm = Tv \tag{5}$$

is calculated, and if Tv is greater than $Tv_{max}$ ($Tv_{max}$ is the shortest exposure time) the value $Tv_{max}$ is used as the control value Tvc with the warning lamp lit to indicate an overexposure.

Under the aperture priority exposure mode or A mode, the set aperture value Avs is calculated by the following equation $$(Avs - Avo) + Avo = Avs \tag{6}$$

Subsequently the exposure time is calculated by the equation $$Ev - Avs = Tv \tag{7}$$

When $Tv_{min} \leq Tv \leq Tv_{max}$, the calculated exposure time Tv and the set aperture value Avs are used as the control data Avc and Tvc. When $Tv < Tv_{min}$ the data Tvmin is used as the control data Tvc and the following equation $$Ev - Tv_{min} = Av \tag{8}$$

is calculated. When $Av \geq Av_{min}$, the calculated aperture value Av is used as the control data. When $Av < Av_{min}$ the data $Av_{min}$ is used as a control data Avc with the warning lamp lit to indicate an underexposure.

When the calculated exposure time Tv is greater than the shortest exposure time $Tv_{max}$, the shortest exposure time $Tv_{max}$ is used as a control data and the following equation is calculated $$Ev - Tv_{max} = Av \tag{9}$$

When $Av < Avm$, the data Avm is used as a control data Avc with the warning lamp lit to indicate an overexposure. However, when $Av \geq Avm$, the data of the aperture value Av calculated by the equation (9) is used as the control data Avc for the aperture value.

Under the exposure time priority aperture control mode or S mode, $$Ev - Tvs = Av \tag{10}$$

is calculated. When $Avo \leq Av \leq Avm$, the set exposure time Tvs and the aperture value Av calculated by the equation (10) are used as the control data Avc and Tvc. When $Av < Avo$, the data Avo is used as the control data Avc and the following equation is calculated.

$$Ev - Avo = Tv \tag{11}$$

When $Tv \geq Tv_{min}$, the exposure time Tv calculated by the equation (11) is used as the control data Tvc. When $Tv \geq Tv_{min}$, the value $Tv_{min}$ is used as the control data Tvc with the warning lamp lit to indicate an underexposure. When the data Av calculated by the equation (10) is greater than Avm, the value Avm is used as the control data and the following equation is calculated.

$$Ev - Avm (= Avc) = Tv \tag{12}$$

When Tv calculated by the equation (12) is greater than $Tv_{max}$, the value $Tv_{max}$ is used as the control data with the warning lamp lit to indicate an overexposure. When the value Tv is smaller than $Tv_{max}$, the data Tv calculated by the equation (12) is used as the control data Tvc.

Under the manual setting mode or M mode, the set aperture value Avs and the set exposure time value Tvs are used as the control data Avs and Tvs, and the following equation is calculated.

$$Ev - (Avc + Tvc) = \Delta Ev \tag{13}$$

After the calculation as described above according to any one of the set modes is completed in the step #37, the program flow goes to the step #38.

The following description is made to explain the contents of the step #36 which is performed when the flash device FL is attached to the camera.

Figure 19A:
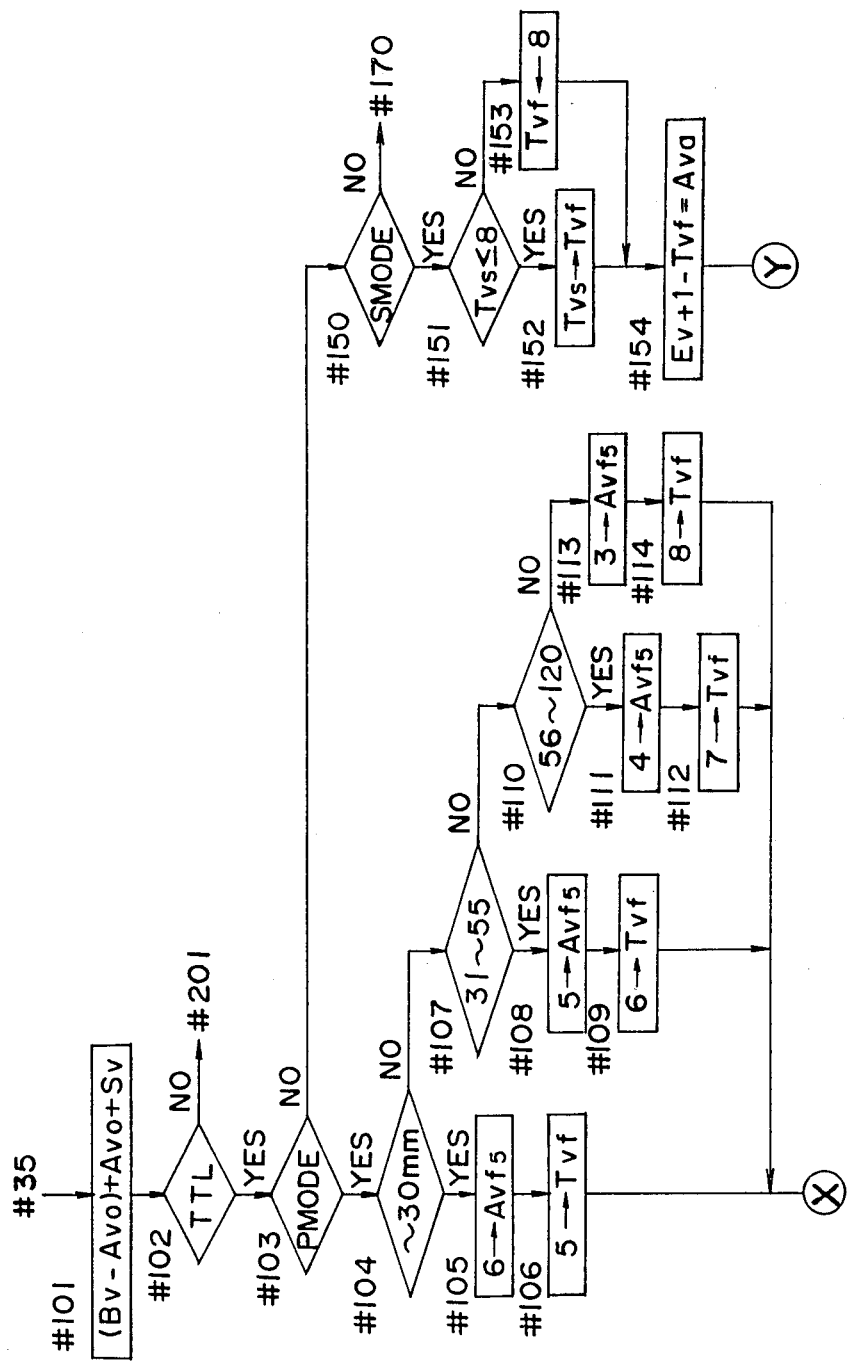
Figure 19B:
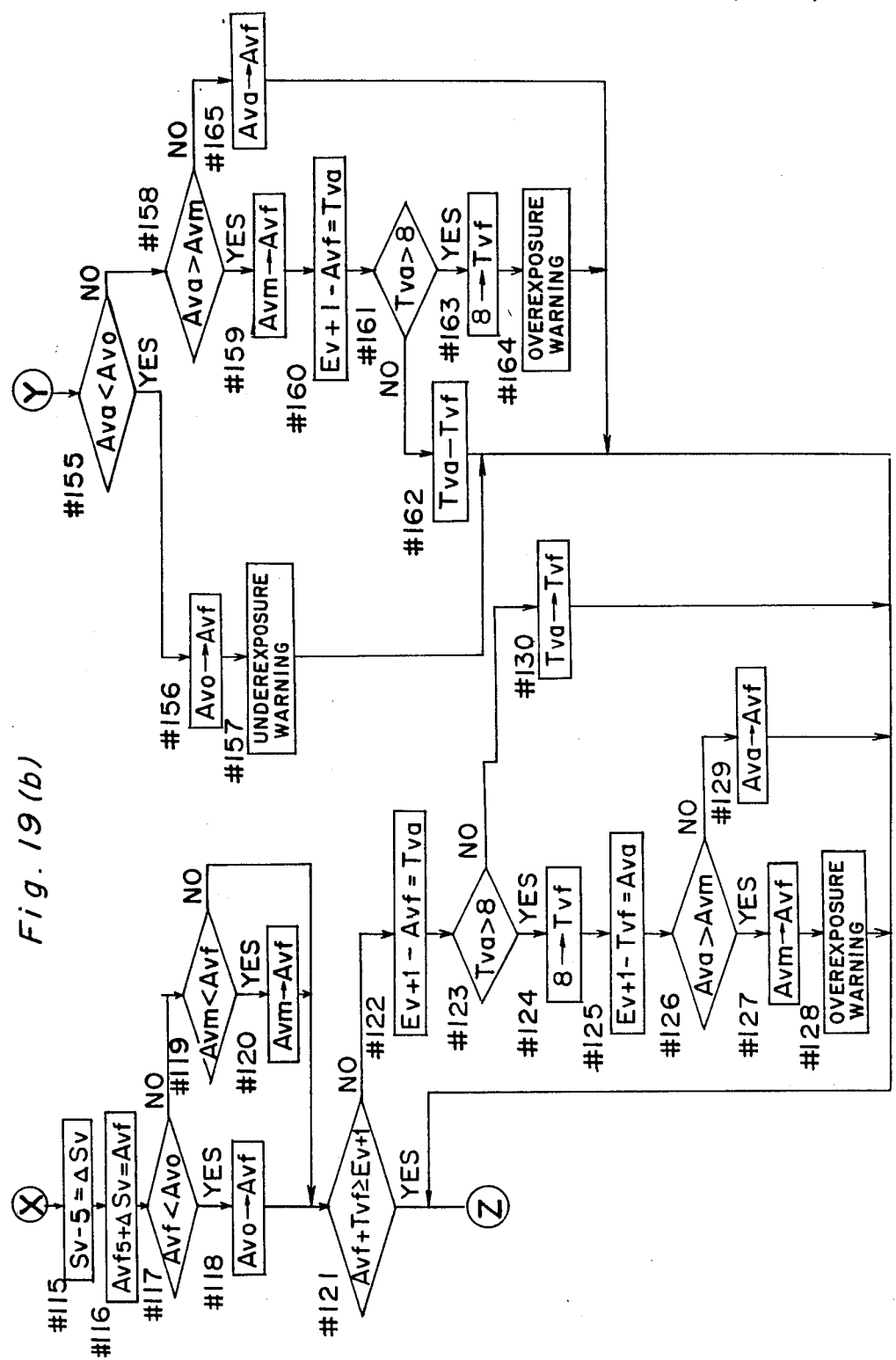
Figure 19C:
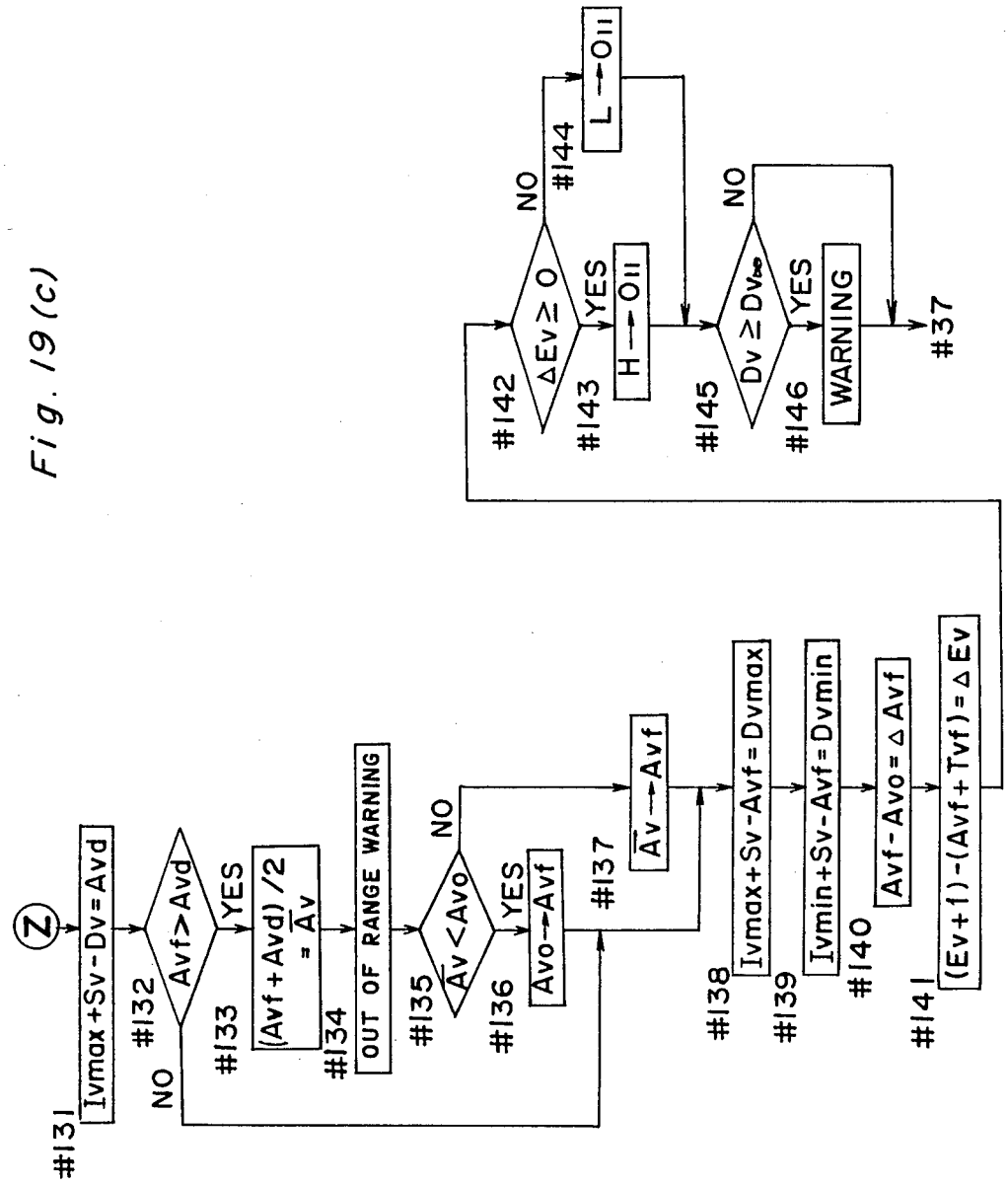

Referring to FIG. 19, in the step #101, the following equation is calculated $$(Bv - Avo) + Sv + Avo = Ev \tag{15}$$

Subsequent to the calculation, which modes of the TTL mode or the external light mode is selected by the flash device FL is determined in the step #102. The external light mode means the exposure control using the information obtained by a photo sensor provided in the flash device. If the TTL mode is selected, the program flow goes to the step #103. If the ex ternal light mode is selected, the program flow goes to the step #201 shown in FIG. 20.

In case of the TTL mode, if the camera is set in the P mode, the program flow goes to step #104, and if not in the P mode, the step #150 is selected. Where the TTL mode and P mode are selected, the CPU determines whether or not the focal distance of the interchangeable lens LE attached to the camera is shorter than 30 mm in the step #104. In the case of YES, an aperture value 6 (F8) is set as the data Avf5 as shown in W1 in FIG. 17 for the film sensitivity Sv=5 in the step #105, and in turn the exposure time data 5 (1/30 sec) is set as the synchronized exposure time Tvf in the step #106. When the focal distance of the interchangeable lens is longer than 30 mm, whether or not the focal distance is in the range of 31 mm to 55 mm is step #107. In the case of YES, the aperture value Avfs is set by 5 (F5.6) and the exposure time Tvf is set by 6 (1/60 sec) as shown by W2 in FIG. 17. In a case where the focal distance is larger than 55 mm, whether or not the focal distance is in the range of 56 mm to 120 mm is determined in the step #110. In the case of YES the aperture value Avf5 is set by 4 (F4) and the exposure time Tvf5 is set by 7 (1/125 sec) as shown by T1 in FIG. 17. In the case of NO, the aperture value Avf5 is set by 3 (F2.3) and the exposure time Tvf is set by 8 (1/250 sec) in the step #113, then the program flow goes to the step #115.

In the step #115, $$Sv - 5 = \Delta Sv \tag{16}$$

is calculated and the program flow goes to the step #116 wherein $$Avfs + \Delta Sv = Avf \qquad (17)$$

is calculated. By determining the aperture value AVf as described above, since the incident light from the flash device FL to the camera can be decreased so that the actual diaphragm aperture size can be decreased as small as possible under such a state that the flash available operation range between the camera and the flash device is kept constant. Accordingly, in a photograph with the flash light, the depth of the focus can be as deep as possible. In a case where the film sensitivity is different from $Sv=5$ by $\Delta Sv$, the diaphragm perture size can be decreased according to the value $\Delta Sv$, the flash available operation range between the flash device and the camera is kept unchanged.

In the step #117, the CPU 1 determines whether or not the aperture value Avf obtained by the equation (17) is smaller than Avo and when Avf avo, the value Avo is used as the aperture value Avf for the photograph with the flash device FL in the step #118. When $Avo \leq Avf$, then the CPU 1 determines if $Avm < Avf$ in the step #119. When $Avm < Avf$, Avm is used as Avf and when $Avm \geq Avf$ the value Avf calculated by the equation (17) is used as the aperture value and then the program flow goes to the step #121.

In the step #121, the CPU determines if the following equation $$Avf + Tvf \geq Ev + 1 \qquad (18)$$

is satisfied, and if YES, the program flow goes to #131, on the other hand, if NO, the program flow goes to #122. The Ev value corresponding to the changeover point of the judgement at the step #121 is $Ev=10$. Accordingly, if the Ev is smaller than 10, the data Tvf and Avf are used without modification in the step #131. On the other hand, if the value Ev is equal to or greater than 10, the data Tvf and Avf are modified as hereinafter described and the program flow goes to the step #131.

In the step #122, $$Ev + 1 - Avf = Tva \qquad (19)$$

is calculated and in the step #123, if Tva is greater than 8 is determined. When Tva is equal to or smaller than 8, the value Tva obtained by the equation (19) is used as the exposure time control data Tvf and the program flow goes to the step #131.

Figure 16:
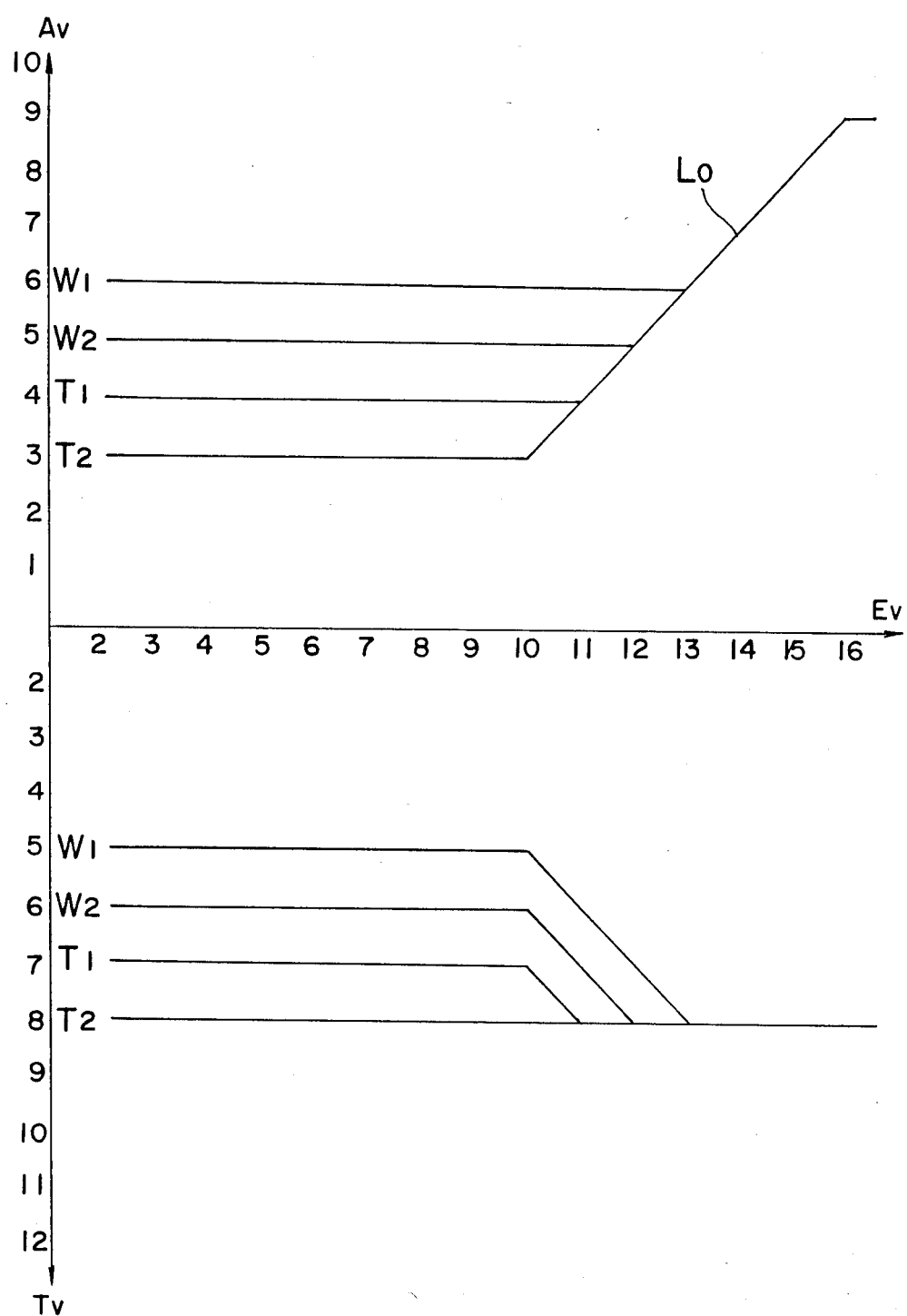

The operation performed in the steps #121 and #122 shows that in a case where the focal distance is greater than 30 mm the aperture value is forcibly set by the data W1 for the brightness Ev within the range of $10 \leq Ev \leq 13$. Similarly, in a case where the focal distance of the lens is in the range of 31 mm to 55 mm, the aperture value is forcibly set by the data W2 for the brightness Ev within the range of $10 \leq Ev \leq 12$. The data T1 corresponds to the brightness Ev in the range $10 \leq Ev \leq 11$. If $Tva > 8$, $$Ev + 1 - Tvf = \qquad (20)$$

is calculated by putting $Tvf=8$. Subsequently, if $Ava \leq Avm$, the aperture value Ava calculated by the equation (20) is used as the control data, and in turn the program flow goes to the step #131. If $Ava > Avm$, the data Avm is used as the control data with the warning lamp (display device OE in FIG. 12) lit to indicate an overexposure and the program flow goes to the step #131. The steps from #124 to #129 show the operation for determining the data of the aperture value and the exposure time relative to the brightness Ev in FIG. 16, i.e., the aperture value can be calculated along the slanting line $L_0$ for $Ev \geq 13$ when the data W1 is selected for $Ev \geq 12$ when the data W2 is selected, for $Ev = 11$ when the data T1 is selected and for $Ev \geq 10$ when the data T2 is selected.

In the above description, the aperture value Tva and the exposure time Tva are calculated on the basis of the data $Ev+1$, namely the value k2 is designated as 1Ev, however, the k2 can be selected by a desired value ranging from 0Ev to 2Ev.

The calculation of the exposure data for the S mode will be described hereinafter.

Figure 17:
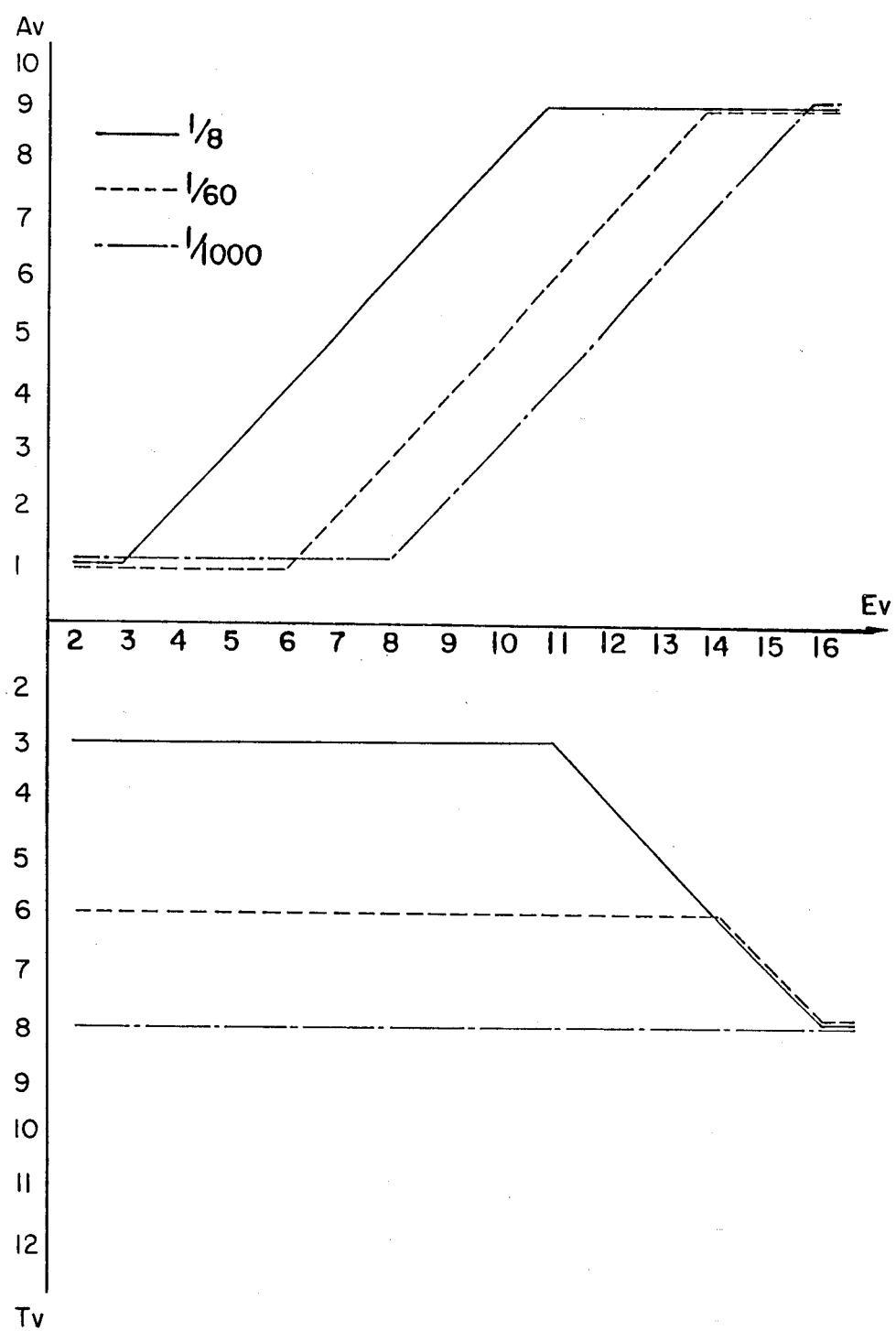

FIG. 17 shows the relationships between Av, Tv and Ev taking Tvs as a parameter wherein the real lines correspond to the parameter $Tvs=3$ ($\frac{1}{8}$ sec), the dotted lines correspond to $Tvs=6$ (1/60 sec) and the chain lines correspond to $Tvs=8$ (1/250 sec).

In FIG. 19 if the mode is not the P mode, the program flow goes to the step #150 to determine if the mode is the S mode. In case of the S mode, the CPU 1 determines whether or not Tvs is equal to or less than 8 in the step #151. If $Tvs \leq 8$, the set exposure time Tvs is set as the control value for the exposure time Tvf and the program flow goes to the step #154. However, if $Tvs > 8$, a value 8 is set for Tvf in the step #153 and the program flow goes to the step #154, wherein $$Ev + 1 - Tvf = Ava \qquad (21)$$

is calculated to obtain the aperture control value Ava. In the step #155, if $Ava < Avo$ is detected the program flow goes to #156.

In the step #156, the data Avo is used for the aperture control data Avf and the warning lamp UE is lit to indicate the underexposure then the program flow goes to the step #131. It is noted that the operation of the step #156, corresponds to the range $Ev < 3$ when the characteristic curve is represented by the real line, to the range $Ev < 6$ for the characteristic curve of the dotted line and to the range $Ev < 8$ for the chain line.

If $Ava \geq Avo$ is determined in the step #155, the program flow goes to the step #158, wherein if $Ava > Avm$ is determined. If $Ava \leq Avm$, the aperture value Ava calculated by the equation (21) is used as the aperture control data, and then the program flow goes to the step #131. This operation corresponds to the range $3 \leq Ev \leq 11$ for the characteristic curve shown by the real line in FIG. 17, to the range $6 \leq Ev \leq 14$ for the characteristic curve shown by the dotted line and to the range $8 \leq Ev \leq 16$ for the characteristic curve shown by the chain line.

If $Ava > Avm$ is determined in the step #158, the value Avm is selected as the aperture control data Avf in the step #159 and the following equation $$Ev + 1 - Avf = Tva \qquad (22)$$

is calculated in the step #160.

If $Tva \leq$ is 8 is determined in the step #161, the program flow goes to the step #162, wherein the value Tva calculated in the equation (22) is selected as the exposure time control data Tvf and then the program flow goes to the step #131. This operation corresponds to the range $11 \leq Ev \leq 16$ for the characteristic curve shown by the real line in FIG. 18 to the range $14 \leq Ev \leq 16$ for the characteristic curve shown in the dotted line in FIG. 17. There is no such a range as described above for the chain line.

If $Tva > 8$ is detected in the step #161, the program flow goes to the step #163, wherein the exposure time control data Tvf is set to (1/250) with warning lamp OE lit to indicate an overexposure, then the program flow goes to the step #131. This operation corresponds to the range $Ev < 16$ for the characteristic curves shown in FIG. 18.

The operation under the A mode will be hereinafter described with reference to FIGS. 18 and 20.

When it is determined that the mode presently set is not the S mode in the step #150, the program flow goes to the step #3, to determine whether or not the present mode is the A mode. When the A mode is detected, the program flow goes to the step #171, wherein the CPU 1 determines whether or not the focal length of the interchangeable lens attached to the camera is greater than 30 mm. If the result of the judgement is YES, the program flow goes to the step #172 to designate the exposure time control data Tvf as 5 (1/30 sec).

If the result of the judgement is NO, the program flow goes to the step #173 to determine whether the focal length of the interchangeable lens attached to the camera is in the range of 31 mm to 55 mm. If the result of the judgement is YES, the program flow goes to the step #174 to designate the exposure time control data Tvf as 6 (1/60 sec). If the result of the judgement in the step #173 is NO, the program flow goes to the step #175 to determine whether the focal length of the interchangeable lens is in the range of 56 mm to 120 mm. If the result of the judgement is YES, the program flow goes to the step #176 to designate the exposure time control data Tvf as 7 (1/125 sec). If the focal length of the interchangeable lens is greater than 120 mm, the program flow goes to the step #177 to designate the exposure time control data Tvf as 8 (1/250 sec).

After the operation described above is completed, the program flow goes to the step #178 to determine whether the exposure time control data Tvf satisfies the following equation $$Avs + Tvf \geq Ev + 1 \quad (23).$$

If the equation (23) is satisfied, the program flow goes to the step #179 to designate the set aperture value data Avs as the desired aperture value data Avf and then the program flow goes to the step #131.

Figure 18:
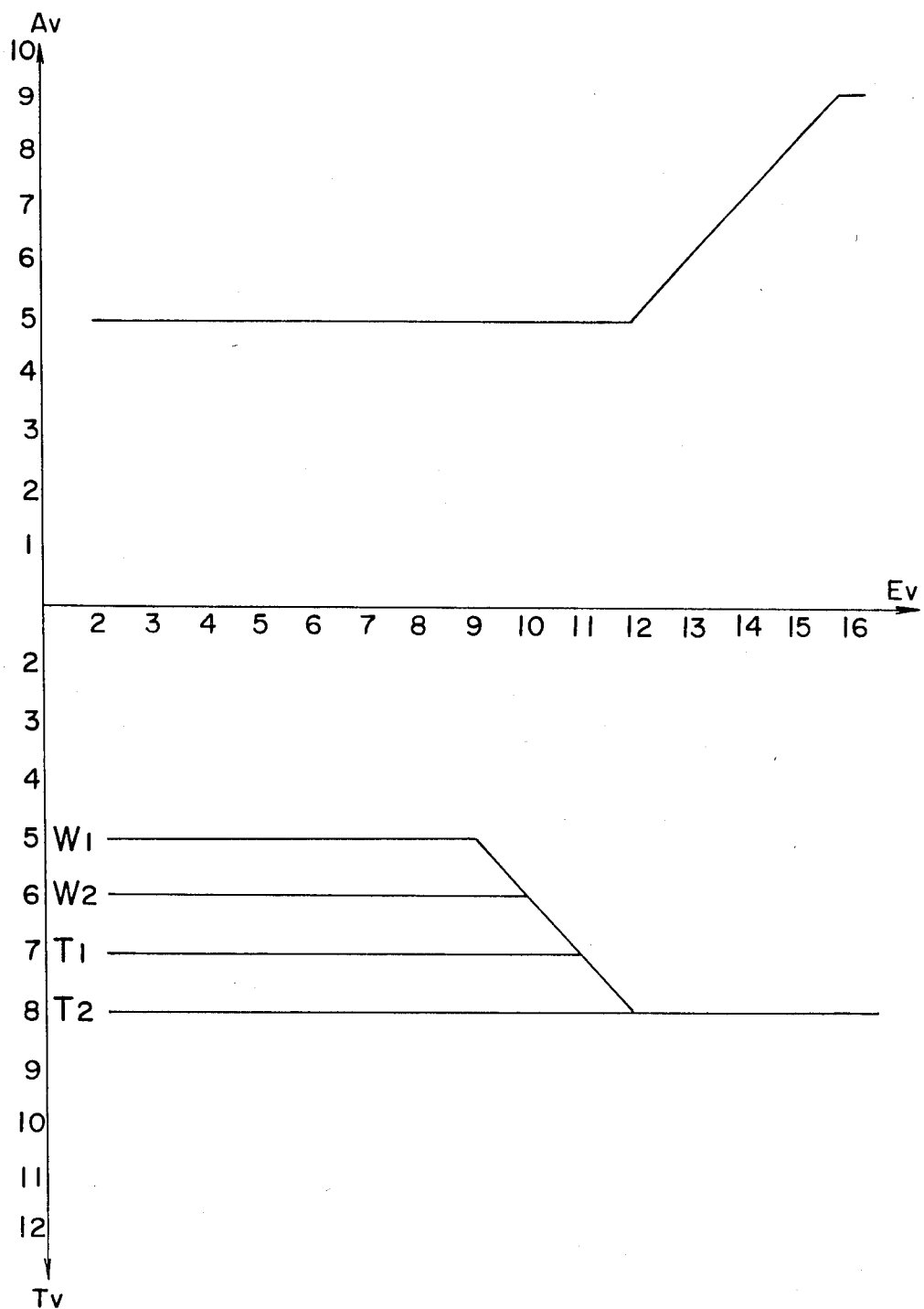

The operation in the steps #178 and #179 means that in the example shown in FIG. 18, if the focal length of the interchangeable lens is shorter than 30 mm (this range is shown as W1 in FIG. 18) and the aperture value is set to the value 6, the brightness value Ev equal to or smaller than 9 may be suitable for the photograph. Similarly for the focal length range W2 (31 mm $\leq$ focal length $\leq$ 55 mm) and the aperture value 5 the brightness value in the range $Ev \leq 10$ can be used, for T1 (56 mm $\leq$ focal length $\leq$ 120 mm) and T2 (focal length > 121 mm) $Ev \leq 11$ and $Ev \leq 12$ can be used.

In a case where the equation (23) is not satisfied, the program flow goes to the step #180 to calculate the following equation $$Ev + 1 - Avs = Tva \quad (24)$$

Then whether the data Tva is greater than 8 is determined in the step #181. If the result of the judgement in the step #181 is NO, i.e., the value Ev is equal to or smaller than 8, the program flow goes to the step #188 to designate the exposure time control data Tva calculated by the equation (24) as the desired exposure time control data Tvf and the program flow goes to the step #131. The operation in the steps #181 and #188 is performed for the respective ranges of the brightness $9 < Ev < 12$ for the focal length W1, $10 < Ev < 12$ for the focal length W2 and $11 < Ev \leq 12$ for the focal length T1. In this case there is no suitable brightness range for the focal length T2.

If $Tva > 8$ is detected in the step #181, the program flow goes to the step #182, wherein the exposure time control data Tvf is designated as 8. The the program flow goes to the step #183 to calculate $$Ev + 1 - Tvf = Ava \quad (25)$$

In the step #184, if $Ava > Avm$ is determined. If $Ava < Avm$, the value Ava is designated as the aperture value control data Avf and the program flow goes to the step #131. This operation is performed in the range $12 \leq Ev \leq 16$. If $Ava > Avm$, the program flow goes to the step #185 to designate the data Avm as the aperture value control data Avf with the warning lamp OE lit in the step #186 to indicate an overexposure, then the program flow goes to the step #131.

If the result of the determination in the step #170 is NO, i.e., the mode set in the camera is not the A mode, the program flow goes to the step #190 for the M mode. In the step #190, whether the exposure time data Tvs set by a manual operation is equal to or smaller than 8 is determined. If $Tvs > 8$, the exposure time data is set to 8 and if $Tvs \leq 8$, the set exposure time data Tvs is used as the exposure time control data Tvf and the aperture value Avs is used as the value Avf in the step #193, then the program flow goes to the step #131.

Figure 20A:
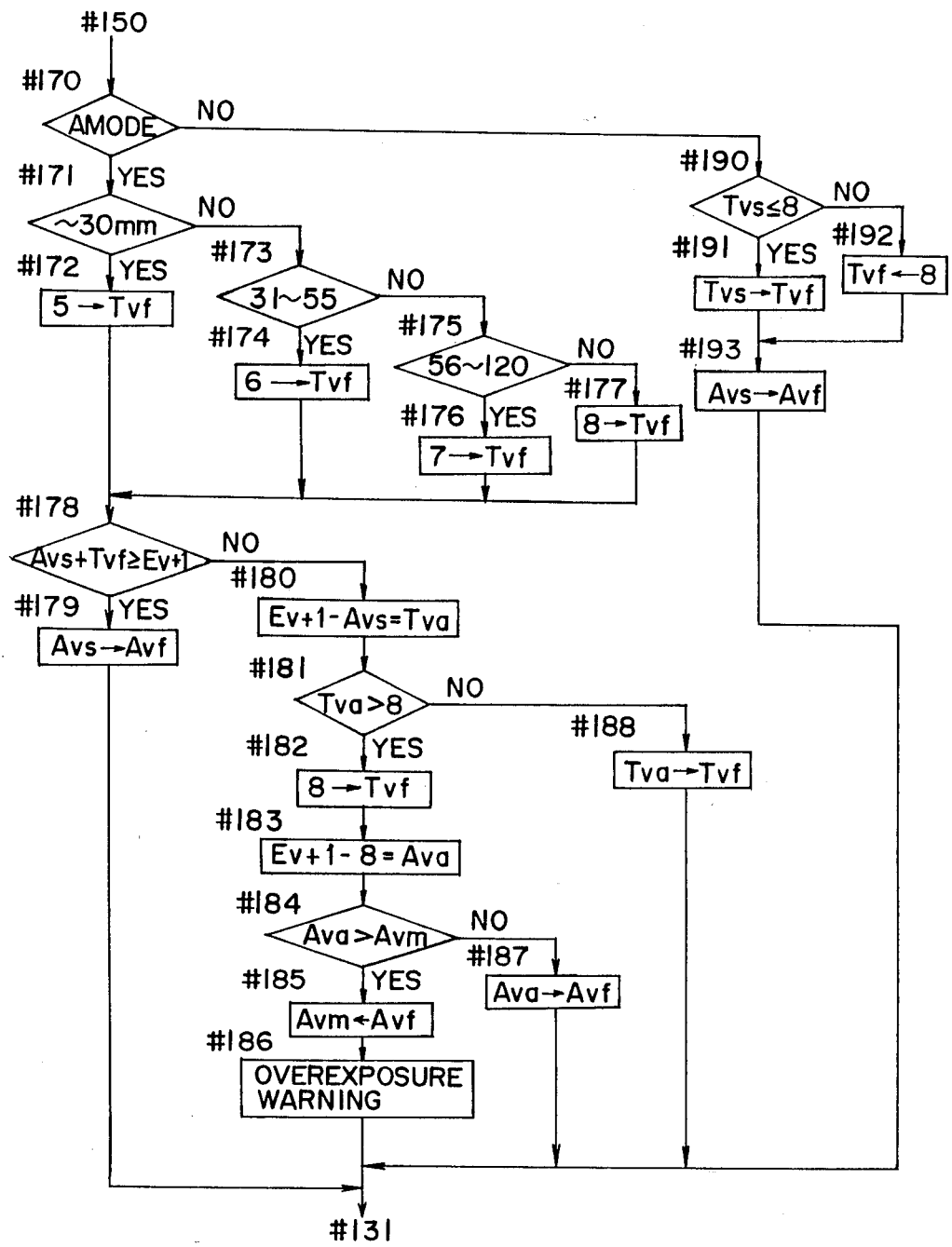

In the step #102 shown in FIG. 20, if the result of the determination is NO, i.e., otherwise the TTL mode is detected, the program flow goes to the step #201 upon such a judgement that the stationary light photographing mode is set in the flash device FL.

In the step #201, whether the M mode is set in the camera is determined. If the M mode is detected, the program flow goes to the step #202 to determine if the set exposure time data Tvs is larger than 8. If the result of the determination is YES, the desired exposure time control data Tvf is set to 8. If the result of the determination is NO, i.e., the data Tvs is equal to or smaller than 8, the set exposure time data Tvs is used as the exposure time control data Tvf.

Subsequently, in the step #205, the set aperture value Avs is used as the aperture value control data Avf, then the program flow goes to the step #131.

In the step #201, if the result of the judgement is NO, the program flow goes to the step #206 for all of the P mode, A mode and S mode to determine whether the focal length of the interchangeable lens is smaller than 30 mm. If the result of the determination is YES, the exposure time control data Tvf is set to 5 and the program flow goes to the step #213. If the focal length is greater than 30 mm, the program flow goes to the step #208 to determine whether the focal length is in the range W2 (from 31 mm to 55 mm). If the result of the determination in the step #208 is YES, the exposure time control data Tvf is set to 6 and then the program flow goes to the step #213. If the result of the determination in the step #208 is NO, the program flow goes to the step #210 to determine whether the focal length of the interchangeable lens is in the range T1 (from 56 mm to 120 mm). If the result of the determination is YES, the exposure time control data Tvf is set to 7 and the program flow goes to the step #213. If the result of the determination in the step #210 is NO, i.e., the focal length of the interchangeable lens is greater than 120 mm, the exposure time control data Tvf is set to 8 and the program flow goes to the step #213.

In the step #213, the aperture control data Avf is obtained by the data coming from the flash device FL and whether the aperture value control data Avf is smaller than the value Avo is determined in the step #214. If the determination is YES, the value Avo is used as the aperture value control data Avf and the program flow goes to the step #218.

If the result of the determination in the step #214 is NO, i.e., the aperture value control data Avf is equal to or greater than Avo. If Avf>Avm is determination in the step #216 and if the result of the determination in this step is YES, the value Avm is used as the aperture value control data Avf and the program flow goes to the step #218. If the result of the determination in the step #216 is NO, i.e., the aperture value control data Avf≦Avm, the program flow goes to the step #218 to calculate the following equation $$Ev + 1 - Avf = Tva \quad (26)$$

Subsequently, whether the value Tva>Tvf is determined. If Tvf≦Tva, the program flow goes to the step #131.

If Tva>Tvf, the program flow goes to the step #220 to determine whether the value Tva is equal to or smaller than 8. If the result of the determination is NO, The program flow goes to the step #222 to designate the value 8 for the exposure time control data Tvf, then the program flow goes to the step #131.

If the result of the determination in the step #220 is YES, i.e., Tva≦8, the value Tva calculated by the equation (26) is used as the exposure time control data Tvf, then the program flow goes to the step #131.

As explained above, in a case where pictures are taken under the external light mode, the aperture value for the aperture control device CA is controlled by the aperture value set in the flash device FL.

In a case where the exposure time control value determined by the brightness of the photographic object has a value in the range U0 between the exposure time value determined corresponding to the focal length of the interchangeable lens LE and the critical synchronizing exposure value, the value Tvf is used as the desired exposure time control data. When the exposure time control value determined by the brightness of the photographic object is out of the range U0, the exposure time control data Tvf is used. In the step #131, a critical aperture value Avd for the operation coupled with the flash device is calculated on the basis of the maximum light emission value $Iv_{max}$, film sensitivity Sv and the distance Dv using the following equation $$Iv_{max} 30 \, Sv - Dv = Avd \quad (27)$$

Subsequently, whether Avf is greater than Avd is determined in the step #132 (FIG. 19). If Avf≦Avd, the aperture value control data Avf is set slightly greater than the flash available critical aperture value, the light emission is sufficient so that the program flow goes to the step #133 without indication of the out-of-the-flash available range for the coupled operation with the flash device. If Avf>Avd, which means that the light value is insufficient for photographing due to the decreased aperture value i.e., the diaphragm aperture size is slightly smaller than the desired value, the program flow goes to the step #133 to calculate an intermediate aperture value $\overline{Av}$ by the following equation $$(Avf + Avd)/2 = \overline{Av} \quad (28)$$

Also the warning lamp RA (FIG.12) is lit to indicate that the aperture value control data Avf is out of the range for photographing with the flash device coupled.

Subsequently, whether $\overline{Av}$ is smaller than Avo is determined in the step #135. If $\overline{Av} \leq Avo$, the value Avo is used for the aperture value control data Avf. However if Avd≧Avo, the value Av is used as Avf and the program flow goes to the step #138, wherein $$Iv_{max} + Sv - Avf = Dv_{max} \quad \text{(29-1) is calculated. And in the step #139,}$$

$$Iv_{min} + Sv - Avf = Dv_{min} \quad (29-1)$$

is calculated.

The value $Dv_{max}$ shows the maximum flash available distance for the aperture value Avf and the $Dv_{min}$ shows the minimum flash available distance. These data $Dv_{max}$ and $Dv_{min}$ are transferred to the flash device FL through the flash control device FC (FIG. 12) so as to display the TTL mode operation which means that the light emission of the flash device is controlled on the basis of the light measurement value of the light sensing element PD1 in the camera as hereinafter described. The value $Iv_{min}$ shows the minimum amount of light of the flash device. The value $Iv_{min}$ may be read from a memory.

In the step #140, the step number of decreasing of the diaphragm aperture size ΔAvf is calculated by the equation $$Avf - Avo = \Delta Avf \quad (30)$$

In the step #141, an exposure difference value ΔEv is calculated by the following equation $$(Ev + 1) - (Avf + Tvf) = \Delta Ev \quad (31)$$

The exposure difference value ΔEv thus calculated is displayed by the display device DP1 shown in FIG. 12. The value ΔEv shows the difference between the actual exposure value of the auxiliary object and the desired exposure value thereof.

In the step #142, whether the value ΔEv≧0 is determined. If ΔEv≧0 i.e., Ev≧10 in case of FIG. 16, since the fill-in flash mode is set, the output terminal O11 is made "High" and the program flow goes to the step #145. If ΔEv<0 is determined in the step #142, which shows the main flash light mode, the output O11 is made "Low" and the program flow goes to the step #145.

In the step #145, whether the actual photographing distance Dv of the interchangeable lens LE coincides with the maximum photographing distance $Dv_\infty$ of the lens is determined, wherein the maximum photographing distance $Dv_{28}$ means the distance shorter than the infinitive position of the lens by a unit scale. The maximum photographing distance is different from lens to lens, so that the maximum photographing distance data is provided from the lens in use to the camera as a fixed data.

If $Dv \geq Dv_\infty$ is determined in the step #145, there is a great possibility of an underexposure even if the flash light is used, since the photographing distance is set around infinity the flash device is useless so that the program flow goes to the step #146 to light the display lamp FIP to warn of the above matter, whereby the program flow goes to the step #37. If $Dv < Dv_\infty$, the program flow goes to the step #37 directly.

In the operations described above, the overexposure warning, underexposure warning, the warning of the out-of-the-flash-available range and infinity distance warning is made by making the output terminals O1 through O4 "High", respectively. When such warning is not necessary, the output terminals are made "Low".

The device shown in FIG. 12 is explained with reference to the flow chart shown in FIG. 15.

In the step #38, whether a charge completion signal is applied to the CPU 1 from the flash device FL is determined. The charge completion signal is generated when the main capacitor provided in the flash device FL is charged with the predetermined voltage sufficient to ignite the flash device. If the charge completion signal is present, the display device DP1 indicates the exposure time control data Tvf, aperture value control data Avf and the exposure difference data Ev, and the fact that the camera system is set in the flash light mode.

Subsequently, the output terminal O10 is made "High", and the distance data $Dv_{max}$ and $Dv_{min}$ determined in the steps #138 and 139 are transferred to the flash device FL from the flash control device FC, and the CPU 1 waits for the "Low" signal at the input terminal I5. When the transfer of the data is completed, the input terminal I5 is made "Low" so that the program flow goes to the step #42 causing the output terminal O10 to be "Low", thereby going to the step #44. If the charge completion signal is absent, the program flow goes to the step #43 to display that the camera system is set in the ambient light mode and the exposure control mode, exposure time control data Tvc, aperture control data Avc and the exposure difference $\Delta Ev$ by the display device DP1, then the program flow goes to the step #44 to enable the interrupt operation for the exposure control operation.

The program flow returns to the step #1 to determine whether the input terminal ST is "High" due to closure of the light measurement switch MS. If the terminal ST is "High" the program flow goes to the step #7. On the other hand, if the terminal ST is "Low", the program flow goes to the step #2 to determine whether the input terminal I2 is "Low". In a case where the exposure operation is ready and the film is not advanced, therefor the shutter is not in the charged position, the switch CS is set in a open state whereby the input terminal I2 is "Low", the program flow goes to the step #4 wherein a signal BLANK for disabling the display device DP1 is output and in the step #5, the interrupt operation is disabled stopping the CPU 1.

However, when the film is already advanced and the shutter is already charged, the switch CS is closed to make the input terminal I2 "High", so that the program flow goes to the step #3, wherein whether the content of the timer register TR is a predetermined value K is determined. The value K is for example 15 seconds. If the content of the timer register TR is larger than the value K, the program flow goes to the step #4, but if the content of the timer register TR is smaller than the value K, 1 is added to the content of the timer register TR, then the program flow goes to the step #8 to repeat the operation described above.

By the arrangement described above, while the light measurement switch MS is closed, read-in operation, calculation and display are continued. The same operation is continued until the content of the timer register TR reaches the value K when the light measurement switch MS is open with the film advanced and the shutter set in the charged position. When the light measurement switch MS is open and the predetermined time interval has passed, the read-in operation, calculation and the display are stopped.

When the light measurement switch MS is closed and the first calculation operation is completed, the CPU 1 is enabled to receive the interruption signal at the input terminal 1t. When the release switch RS is closed in such state that the film is advanced and the shutter is set in the charged position, the output of the AND gate AN1 is "High" to apply the interruption signal to the input terminal 1t, whereby the program flow goes to the step #50 to effect the exposure control. In the step #50, the signal BLANK is output to disable the display device DP1. Then the program flow goes to the step #51 to make the output terminal O6 "High" to prevent the read-in operation of the data of the lens LE in the CPU 1 from the interface IF during the read-in operation of the data in the interface IF from the lens circuit LEC. If the interruption signal is applied to the CPU 1 during the read-in operation of the data of the flash device FL to the CPU 1, the CPU 1 refuses the interruption operation until the input terminal i4 changes to "Low" from "High". When the input terminal i4 becomes "Low", the output terminal O9 is made "Low" and then the program flow goes to the step #54.

In the step #54, in a case where the data is transferred to the flash device FL from the flash control circuit FC, when the interruption signal is applied to the CPU 1, the CPU 1 waits until the input terminal i5 changes to "Low" from "High". When the input terminal i5 becomes "Low", the program flow goes to the step #55 to make the output terminal O10 "Low". Then the program flow goes to the step #56 to make the output terminal O8 "High" and the CPU 1 determines whether the charge completion signal is applied to the flash control device FC from the flash device FL. If the charge completion signal is detected by the change of the state of the input terminal i6 to "Low", the program flow goes to the step #58 causing the output terminal O8 to be "Low", and in turn whether the input terminal i7 is "High" is determined in the step #59. The input terminal i7 is "Low" or "High" depending on the absence or presence of the charge completion signal.

When the "High" on the terminal i7 is detected, the step number of the aperture decreasing value Avf calculated in the steps #30 and 36 is output from the output port OP2 to the aperture control device CA in the step #60. Then the exposure time control data Tvf is derived from the output port OP1 to the exposure time control device CT in the step #61.

However, if the charge completion signal is absent, and therefore "Low" on the terminal i7 is detected in the step #59, the program flow goes to the steps #62 and 63 to derive the step number of the decreasing aperture value ΔAvc for the photographing under the ambient light and the exposure time control data Tvc.

As described above, according to the preferred embodiment of the present invention, whether the charge completion signal is present is determined immediately before the shutter SHT begins releasing, the control data for the flash light photographing or the data for the ambient light photographing are selectively output depending on the presence or absence of the charge completion signal.

Subsequently, the terminal O5 is made "High" in the step #64 to start the release circuit RL and a "Low" signal is fed to the base of the transistor BT1 through the inverter IN3 to continue the conductive state of the transistor BT1 even if the light measurement switch MS is open. By the operation of the release circuit RL the exposure control device 3 in FIG. 12 starts, whereby an aperture control ring is rotated, so that a pulse train is generated from the pulse generator PG, the number of pulses being proportional to the amount of the rotation of the aperture control ring. The aperture control device CA counts the number of the pulses, whereby the aperture control ring is rotated until the counted number of pulses coincides with the decreasing size value ΔAvc or ΔAvf for controlling the actual diaphragm aperture size.

In a case where the single lens reflex camera is used, a reflection mirror RM is raised as shown in FIG. 14. When the reflection mirror RM is moved to the raised position, and the setting of the diaphragm aperture is completed, the shutter starts running and the exposure time control device CT begins counting the exposure time on the basis of the data fed from the terminal OP1 of the CPU 1.

In a case where the camera system is set in the flash light photographing mode, at the time when the shutter SHT is completely opened, a flash light start signal is applied to the terminal JF3 of the flash device FL from the terminal JB7 of the flash control device FC to effect the light emission of the flash device. If the flash device is set in the TTL mode, when the integrated value of the light value on the film plane measured by a light measuring circuit reaches the predetermined value, a flash stop signal is applied to the terminal JF1 of the flash device FL from the terminal JB5 to stop the flash device FL. When the time counted by the exposure time control device CT reaches the exposure time control data fed from the output terminal OP1 of the CPU 1, the rear curtain of the shutter SHT starts, regardless of the mode of the flash light photographing mode or stationary light photographing mode set in the camera. Upon completion of the running of the rear curtain of the shutter SHT, the switch CS is opened, and the reflection mirror MR is dropped with the aperture set at the open aperture value.

After the exposure control as described above, the output of the inverter IN5 (FIG. 12) becomes "Low" with the input terminal i3 of the CPU 1 "High" causing the output terminal O5 to be "Low" in the step #66 so that the release circuit RL is stopped and the transistor BT1 becomes non conductive.

In the step #67, the interruption by the interruption signal at the terminal 1T is disabled and the program flow returns to the START. In this case if the light measurement switch MS is in the closed position, data read-in, calculation and the display operations are performed again.

If the switch CS is opened, the output of the AND gate AN1 is "Low" so as to prevent the application of the interruption signal to the interruption terminal 1T of the CPU 1, thereby preventing the exposure operation even if the release switch RS is closed. In this case data read-in, calculation, and display operations are possible.

Figure 21A:
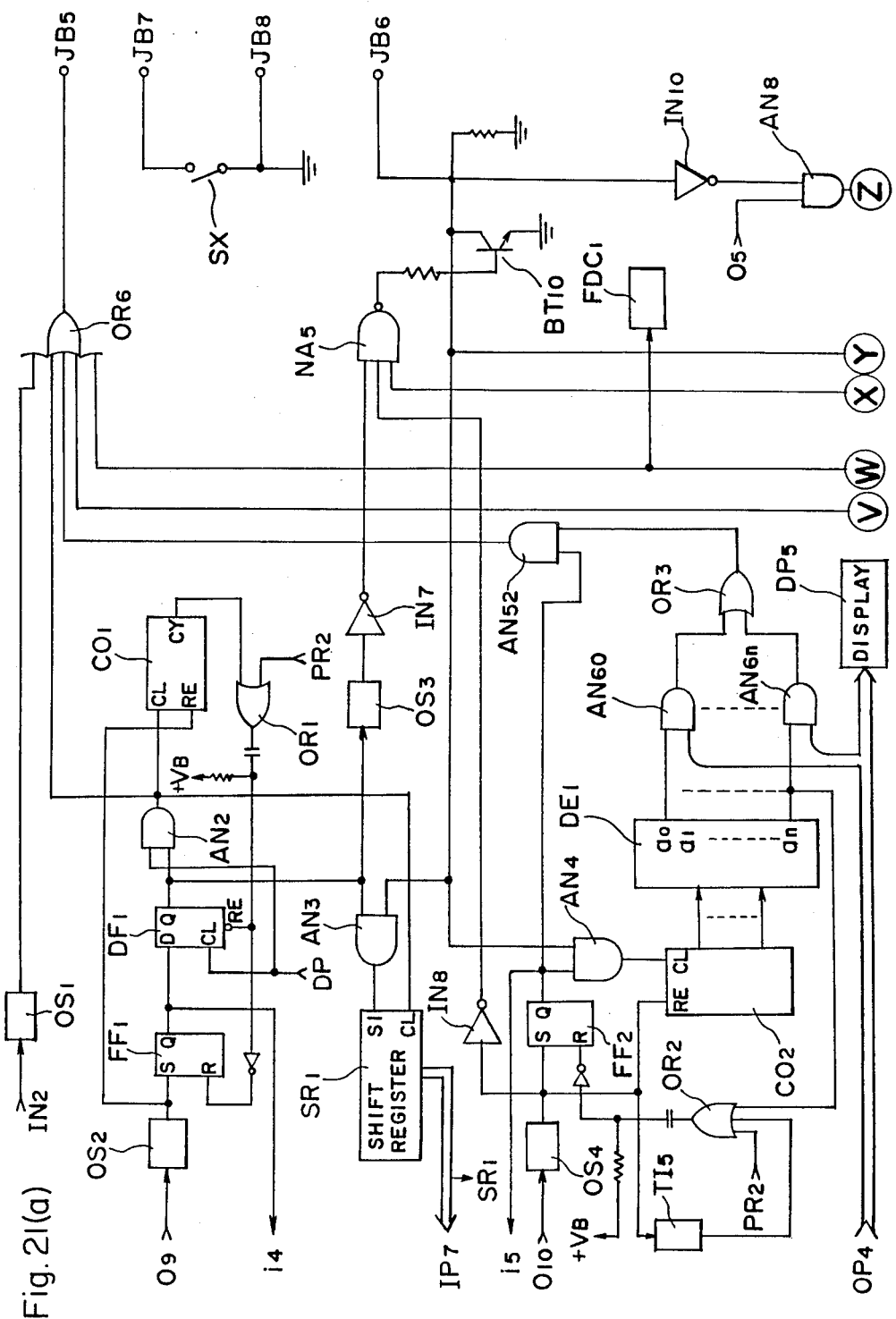
FIG. 21 is a detailed circuit diagram of a flash control circuit in FIG. 12.
Figure 21B:
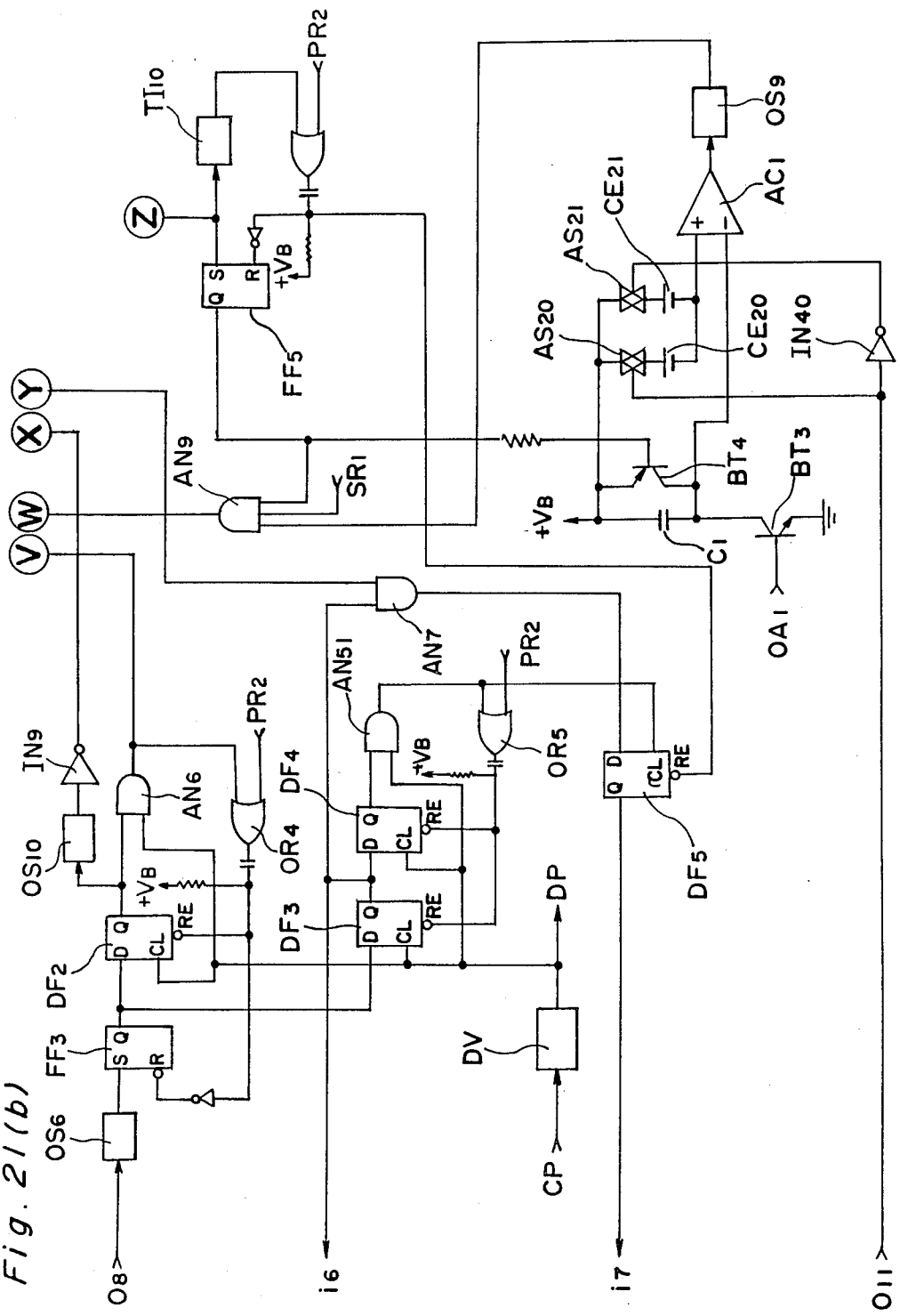
Figure 22A:
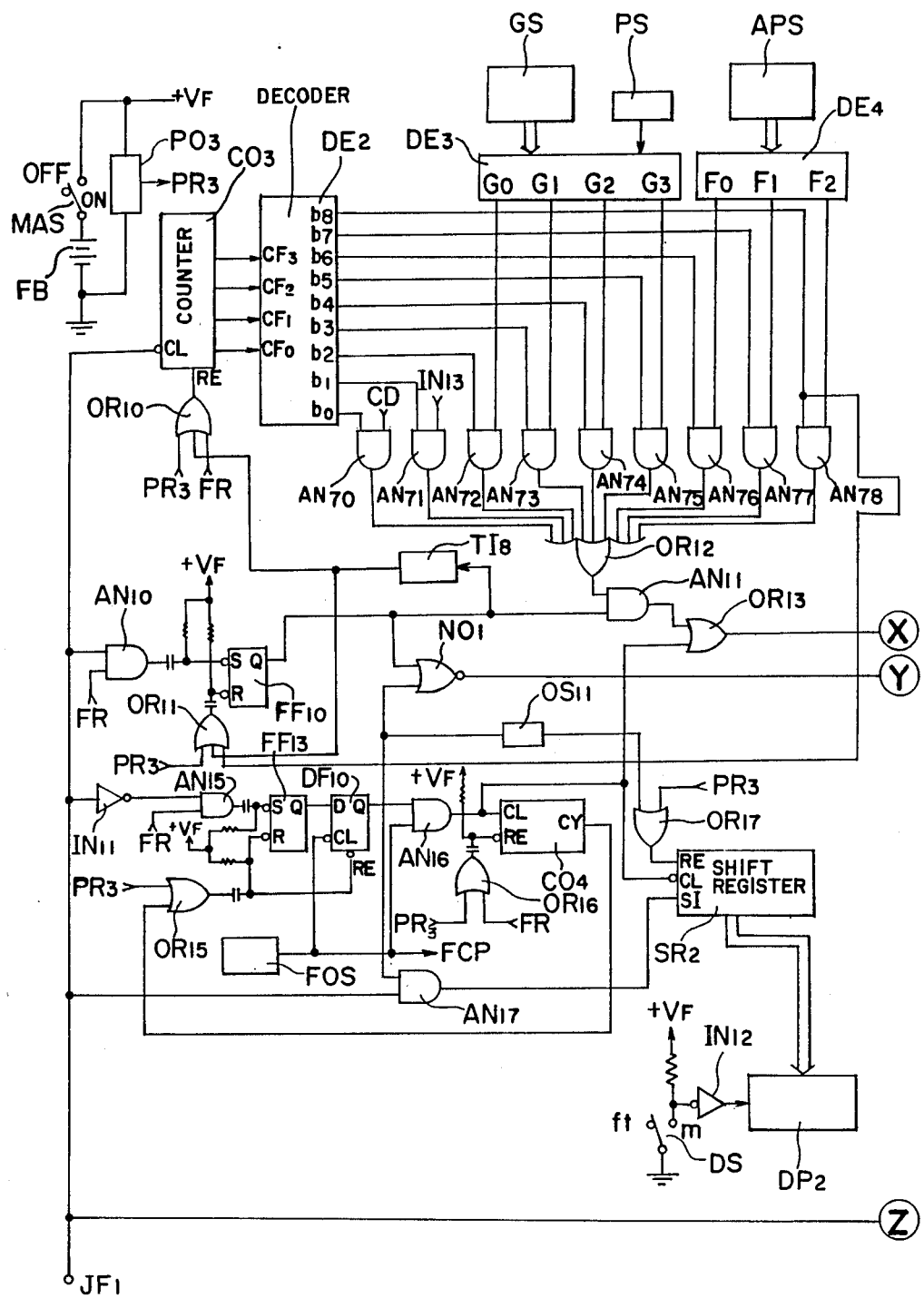
FIG. 22 is a detailed circuit diagram of a flash device shown in FIG. 12.
Figure 22B:
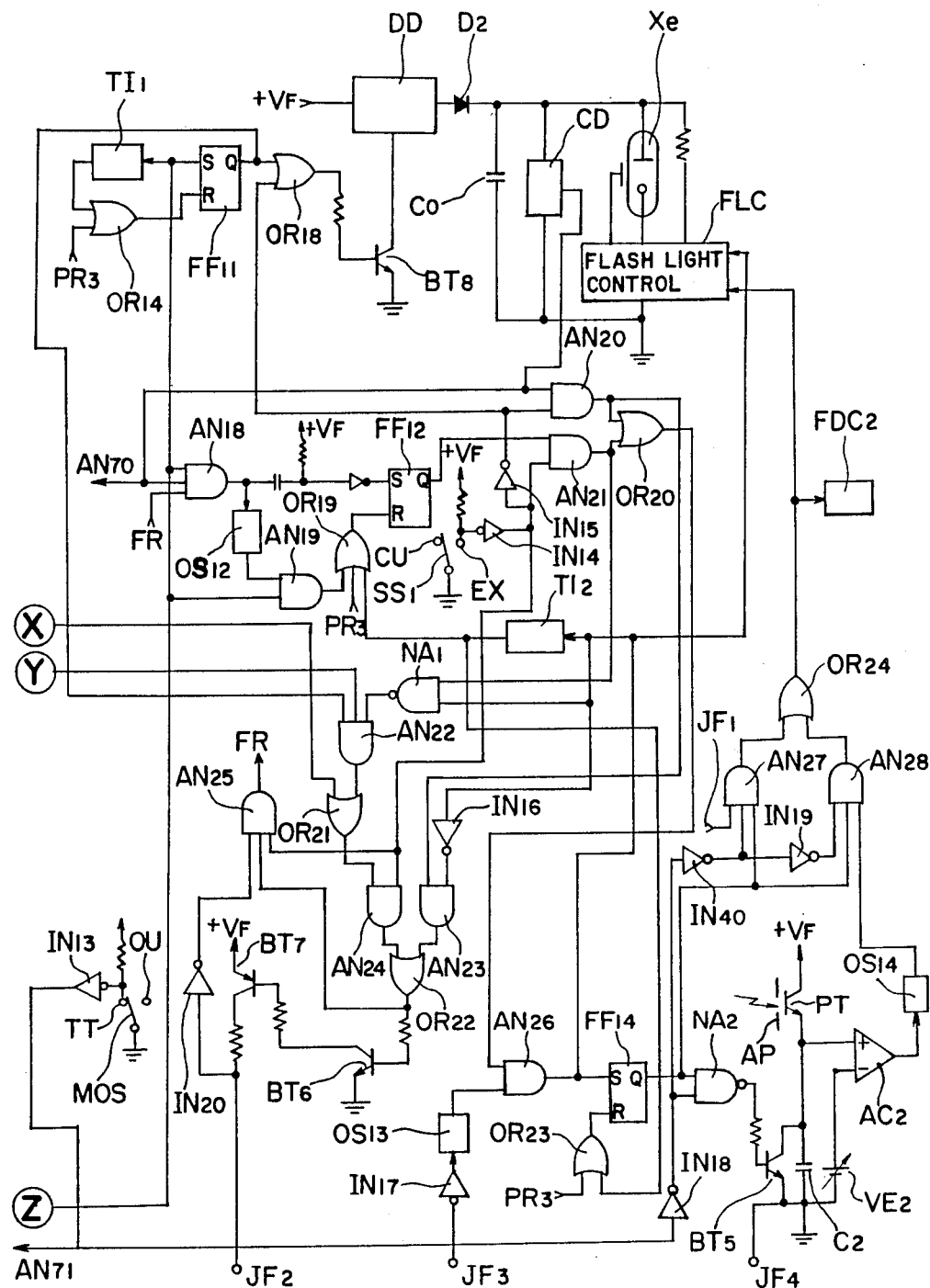

The detailed circuit arrangements of the flash control device FC and the flash device FL are shown in FIGS. 21 and 22. Referring to FIG. 22, upon closure of the main switch MAS, the DC power is supplied to the flash device FL from the battery FB and the power on reset signal PRO3 is output from the terminal PR3 of the power on reset circuit PO3 to reset the flash device FL.

When the change over switch SS1 is switched to the CU contact, the flash device FL is set in the first flash light photographing mode. Under this condition, the output of an inverter IN14 is "Low" and the output of an inverter IN15 is "High", so that the output of an OR gate OR18 is "High", thereby a transistor BT6 conducts to effect the boosting operation of the booster DD.

However, when the change over switch SS1 is switched toward the EX contact, the flash device FL is set in the second flash light photographing mode. The output of an inverter IN15 becomes "Low" and the output of the OR gate OR14 becomes "High" by the power ON reset signal PR3. The output of the OR gate OR14 resets a flip-flop circuit FF11, thereby causing the output of an OR gate OR18 to be "Low". Under this condition, the booster DD is not enabled even if only the main switch MAS is closed. In order to enable the booster DD in the flash light photographing mode, the following procedure is taken. By closure of the light measurement switch MS in the camera, the transistor BT1 is conductive to allow the DC power supply to the power ON reset circuit PO2 from the battery BB provided in the camera. Thus, the power ON reset circuit PO2 supplies the power ON reset signal PR2 to the flash control circuit FC to reset the latter. Upon closure of the light measurement switch MS, the output of the inverter IN2 (FIG. 21) becomes "High", thereby causing a one shot circuit OS1 to produce a "High" pulse. The output pulse of the one shot circuit OS1 is supplied to the set input terminal of the flip-flop circuit FF11 through the OR gate OR6 and the terminals JB5 and JF1. The flip-flop FF11 is set by that pulse and an OR gate OR18 produces a "High" signal , which is fed to the base of the transistor BT8 which is made conductive, whereby the booster DD is enabled. Also, the "High" pulse input from the terminal JF1 is applied to the input terminal of the timer TI1 to start counting of time, which generates an output when a predetermined time period, for example, 0.5 seconds has passed after reception of the "High" pulse. The output signal of the timer TI1 is applied to the reset input terminal of the flip-flop FF11 to make the Q output of the flip-flop FF11 and the output of an OR gate OR18 "Low", thereby causing the transistor BT8 to be non conductive. Then the booster DD is disabled to save the DC power. The timer TI1 may be reset and start the time counting each time when the "High" pulse is applied to the timer from the terminal JF1, Also the timer TI1 may be reset when a sufficient time such as 10 minutes has passed after the "high" pulse is applied to the timer from the terminal JF1.

When the flip flop FF11 is reset, a flip-flop FF10 and a D type flip flop DF10 are in the reset state, therefore the output terminal of a NOR gate NO1 is "High". Also as hereinafter described, the output of a NAND gate NA1 is "High" with the output of an AND gate AN22 and an OR gate OR21 "High". Under such conditions, if the flash device FL is set in the second flash light photographing mode with the switch SS1 changed to the EX contact, both input terminals of an AND gate AN24 receive "High" signals, thus an OR gate OR22 outputs a "High" signal to the base of the transistor BT6 causing the transistor BT6 to be conductive. Also a transistor BT7 is made conductive to produce a "High" signal which is supplied to the flash control circuit FC through the terminals JF2 and JB6.

In the condition that the light measurement switch MS is closed, when the output terminal O7 of the CPU becomes "High", a one shot circuit OS2 generates a pulse (FIG. 21). Then a flip-flop FF1 is set by the positive edge of pulse and the counter CO1 is reset. A D type flip flop DF1 acts to generate a series of pulses in response to application of the positive edge of each of pulses DP fed from a frequency divider DV provided in the flash control circuit FC. The pulse DP has a period shorter than the time interval set in the timer TI1. A pulse is applied to the terminal JF1 of the flash device FL from an AND gate AN2 through an OR gate OR6 and the terminal JB5 of the flash control circuit FC every time the Q output of the flip-flop DF1 becomes "High". The output pulses of the AND gate AN2 are applied to the counter CO1. A one shot circuit OS2 generates a pulse every time the Q output of the flip-flop DF1 becomes "High", and an inverter IN7 reverses the output of the flip-flop DF1, then in turn a NAND NA5 applies a series of "High" pulses to the base of a transistor BT10 in response to the "Low" signals of the inverter IN7, whereby the transistor BT 10 is made conductive corresponding to the period of time during which each of the pulses of a NAND gate NA5 becomes "High". The terminal JF2 is made "Low" when the transistor BT10 is in the conductive state.

Upon application of the "Low" signals to the terminal JF2 from the transistor BT10 through terminal JB6 in the flash light photographing mode, the "Low" signals are applied to an inverter IN20 and an AND gate AN25 generates a pulse train supplied from the inverter IN20. The output of the AND gate AN25 and the pulses DP on the terminal JF1 are applied to the input terminals of an AND gate AN20 to produce the output pulse which corresponds to the pulse on the terminal FR, thereby resetting the flip-flop FF10 resulting in generation of a "High" signal on the Q output of the flip-flop FF10. The Q output of the flip-flop FF10 is applied to a NOR gate NO1 which generates a "Low" signal to an AND gate AN22 to make the output of the AND gate AN22 "Low".

The output of the flip-flop FF10 is applied to one input terminal of an AND gate AN11. Thus, the AND gate AN11 effects to pass the signals applied from an OR gate OR12 to the base of the transistor BT6 through OR gates OR13, OR21, an AND gate AN24 and the OR gate OR22, whereby the transistors BT6 and BT7 are made conductive to produce "Low" signals. By the operation described above, the output data of the OR gate OR 12 is transferred to the terminal JB6 through JF2.

A counter CO3 for counting the number of pulses applied to the terminal JF1 is adapted to be reset by the output FR of the AND gate AN25. A decoder DE2 provides the output data shown in Table 3 (at the end of the specification) on the output terminals b0 through b8 corresponding to the data applied to the input terminals CF0 through CF3. The output terminal b0 of the decoder DE2 is made "High" during a time interval between two falling points of the first pulse and the second pulse on the terminal JF1. The "High" signal on the output terminal b0 is applied to the one input terminal of an AND gate AN70, another input terminal of which receives the charge completion signal CD. The AND gate AN70 gates the charge completion signal CD upon receipt of the signal on the terminal b0, in other words, the charge completion signal can be transferred to the terminal JF2 when the terminal b0 is "High". The charge completion signal CD on the terminal JF2 is transferred to the serial input terminal SI of a shift register SR1 through the terminal JB6 of the flash control circuit FC and an AND gate AN3 (FIG. 21). The shift register SR1 takes the data fed from the AND gate AN3 when the second pulse is applied to the terminal CL from the AND gate AN2.

The terminal b1 of the decoder DE2 is made "High" during a time interval between two falling points of the second pulse and the third pulse on the terminal JF1. The output of the terminal b1 is applied to one input terminal of an AND gate AN71 (FIG. 22) another input terminal of which receives a signal representing which of the TTL mode or the external light mode is selected. When the TTL mode is selected a switch MOS is switched to the TT contact so that an inverter IN 13 generates a "High" output. However, when the external light mode is selected, the switch MOS is switched to the OU contact so that the inverter IN13 generates a "Low" signal. The output of the inverter IN13 is transferred to the shift register SR1 through the terminals JF2 and JB6 and stored therein in a similar manner as described above.

A decoder DE3 is adapted to receive the output data of a first data output device GS and the data of a second data output device PS to provide one of the maximum light emisssion values Ivmax of the flash device FL at the terminals G0 through G3, the contents of which are shown in the Table 4 (at the end of the specification). The output of the decoder DE3 can be also transferred to the shift register SR1 through AND gates AN72 through AN75 which receive the output signals on the terminals b2 through b5.

The first data output device GS is coupled with an adjusting member for adjusting a light distribution characteristic by changing a positional relationship relative to a light reflection plane for the flash light and generates various data. The second data output device PS generates data representing the kind of the reflection panel used in the flash device for emitting the flash light. In the preferred embodiment, either the wide angle reflection panel or the normal reflection panel is alternatively used. The decoder DE3 provides the maximum light emission value Ivmax shown in the Table 4 on the basis of the output data of the first output data output device GS and the second data output device PS.

A decoder DE4 provides the aperture values set in the flash device FL by the data input from an aperture value data output device APS which is coupled and moved with an adjusting member for adjusting the aperture AP disposed in front of the photo transistor PT used in the flash device FL so as to adjust the incident light value. The contents of the decoder DE4 are shown in the Table 5 (also at the end of the specification).

The output terminals F0, F1 and F2 of the decoder DE4 can be transferred to the shift register SR1 through AND gates AN76 through AN78 which are enabled by the output signals of the terminals b6 through b7 of the decoder DE2.

The tenth pulse applied to the counter CO3 causes the terminal b8 of the decoder DE2 to become "Low" to reset the flip-flop FF10 through an OR gate OR11 to cause the Q output of the flip-flop FF10 to be "Low", thereby causing the output of the AND gate AN11 to be "Low" with the output of the NOR gate NO1 being "High", resulting in making the terminal JF2 of the flash device FL "High".

With reference to FIG. 21, the application of the tenth pulse DP to the decimal counter CO1, a carry signal is generated at the carry terminal CY. The carry signal is fed to the reset terminal R of the flip-flop FF1 and the reset terminal RE of the D-type flip-flop DF1, then both flip-flops FF1 and DF1 are reset so that the Q output terminals become "Low" respectively. Both of the AND gates AN2 and AN3 are disabled by the "Low" signal of the D-type flip-flop, then the read-in operation of the data $Iv_{max}$ and the set aperture value Av into the shift register SR1 is stopped.

When the input terminal i4 of the CPU 1 (FIG. 12) becomes "Low" by the Q output of the flip-flop FF1, the CPU 1 determines that the read-in operation of the data from the flash device FL to the flash control circuit FC is completed. Also the data in the shift register SR1 is transferred to the input terminal IP7 of the data selector MP1 and in turn the data is transferred to the CPU 1 in the order designated by the signals applied to the terminal SL of the data selector MP1 from the CPU 1.

In the preferred embodiment, the shift register SR1 contains 9 bits, so that the data in the shift register SR1 can be read out separated in two or three groups if the number of bits of the CPU is small.

In a case where the flash device FL is not attached to the camera or the flash device is attached to the camera but the power switch MAS is OFF, the contents of the shift register SR are zero. Thus from the contents of the shift register SR1, whether or not the flash device is attached to the camera and the power switch MAS is OFF can be detected by the CPU 1.

In a case where the flash device FL is set in the first flash light photographing mode with the switch SS1 (FIG. 22) changed to the CU contact, the output of an inverter IN14 is "Low", so that the AND gate AN24 is disabled to prohibit transfer of the maximum light emission data $Iv_{max}$ and the set aperture value Av to the shift register SR1 through the OR gate OR12. As the switch SS1 is in the CU position the output of an inverter IN15 is "High", and the "High" signal is applied to one input terminal of the AND gate AN20. If the charge completion signal CD is "High", the output of the AND gate AN 20 is "High". On the other hand, if the X contact of the flash device is opened, the output of an AND gate AN26 is "Low" with the output of an inverter IN16 "High". Accordingly, the output of an AND gate AN23 is "High". The output of the AND gate AN23 is applied to the base of the transistor BT6, whereby the transistors BT6 and BT7 are conductive. By this operation only the charge completion signal is applied to the flash control circuit FC through the terminals JF2 and JB6 and stored in the shift register SR1 in the first flash light photographing mode.

As shown in the Tables 4 and 5, the data is so arranged that all of the data which is read in the shift register SR1 is not "High", therefore the mode set in the flash device is the first flash light photographing mode.

A method of determinig the mode set in the flash device FL by the CPU 1 is explained hereinafter.

When the flash light photographing mode is ordered in a given step, whether the first flash light mode is ordered is determined. As the result of that determination, if the mode ordered is not the first mode, the program flow goes to the step #101 in FIG. 20. However, if the ordered mode is the first mode, the exposure time is set to 1/250 sec and the aperture value is set by the data set in the flash device, then the program flow goes to the step #140 (FIG. 19).

The following description explains a way of transferring the flash available range data from the camera to the flash device.

Referring to FIG. 21, when the terminal O10 of the CPU 1 becomes "High", the "High" signal is applied to a one shot circuit OS4, which supplies a pulse having a predetermined width to the set terminal of a flip-flop FF2 and the reset terminal RE of the counter CO2. Then the Q output of the flip-flop FF2 is "High". This "High" signal is fed to the input terminals of AND gates AN52 and AN4. The contents of the counter CO2 are zero. The output of the one shot circuit OS4 is inverted by an inverter IN8 and the transistor BT10 is made conductive, whereby a "Low" signal is applied to the terminal JF2 of the flash device FL (shown in FIG. 22) from the terminal JB6 of the flash control device FC, and the output of the AND gate AN25 is "Low". As the input terminal JF1 is "Low", the inverter IN11 produce a "High" signal to the input terminal of an AND gate AN15. Another input terminal of the AND gate AN15 receives a "high" signal from the output FR of the AND gate AN25. By the output of the AND gate AN15, a pulse is applied to the set terminal of a flip-flop FF13 through a capacitor C15 so that the flip-flop FF13 is set, causing the Q output to be "High". This "High" output is applied to the input terminal of the D-type flip-flop DF10. The Q output of the flip- flop DF10 becomes "High" upon receipt of a pulse at the terminal CL from a oscillator FOS. The "High" signal at the Q output of the flip-flop FF10 is applied to AND gates AN16 and AN17. The AND gate AN16 gates the pulse train FCP fed from the oscillator FOS to both clock input terminals CL of a counter CO4 and a shift register SR2. Also the clock pulse train FCP is applied to the base of the transistor BT6 through the OR gates OR13, OR21, OR22, and the AND gate AN24 so as to drive the transistor BT7, which feeds the pulse train to the clock input terminal CL of the counter CO2 through the terminals JF2, JB4, and the AND gate AN4 (FIG. 21).

A one shot circuit OS11 generates a "High" pulse signal by the output of the D-type flip-flop DF10 to reset the shift register SR2 through an OR gate OR17 and the counter CO4 is reset by the "High" signal applied through an OR gate OR16.

The output of the counter CO2 (FIG. 21) which is the result of the counting of the clock pulse train FCP is input to the decoder DE1 which generates a "High" signal on any one of the output terminals ao through an in the order corresponding to the counted value of the counter CO2.

When the first pulse of the pulse train FCP is input to the counter CO2 from the AND gate AN4, the output of the decoder DE1 becomes "High" by the positive going edge of the first pulse. The "High" state is continued until the positive going edge of the second pulse of the pulse train FCP. An AND gate AN60 is opened by the output of the decoder DE1 to gate the most significant bit of the maximum flash available distance data $Dv_{max}$ to the terminal JB5 through the OR gates OR3 and OR6 and the AND gate AN52. This data on the terminal JB5 is applied to the serial input terminal SI of a shift register SR2 through the AND gate AN17 (FIG. 22). The shift register SR2 takes the most significant bit of the data $Dv_{max}$ therein synchronized with the negative going edge of the first pulse of the pulse train FCP. In a similar manner aa described above, the output terminal (an) of the decoder DE1 becomes "high" with the positive edge of the (n+1)th pulse of the pulse train FCP until the positive edge of the (n+2)th pulse. During this period, the least significant bit of the minimum flash available distance data $Dv_{min}$ is output from an AND gate AN6n and this information is taken in the shift register SR2 synchronized with the negative going edge of the (n+1)th pulse.

Since the counter CO4 is a (n+2) number system, the (n+2)th pulse of the pulse train FCP is output from the carry terminal CY and in turn the carry output is applied to the reset terminals CL of the flip-flop FF13 and the D-type flip-flop DF10 which are reset respectively, causing the AND gates AN16 and AN17 to be disabled. The shift register SR2 takes a "High" or "Low" signal in synchronism with the negative going edge of the pulse FCP. However, the least significant bit of the shift register SR2 is not applied to the display device DP2.

On the other hand, the counter CO2 in the camera is (n+2) number system and all of the output of the counter CO2 becomes "Low" with the positive going edge of the (n+2)th pulse of the pulse train FCP, whereby all of the output (a0) through (an) of the decoder DE1 becomes "Low". The flip-flop FF2 is reset when the terminal (an) goes "Low" by the positive going edge of the (n+2)th pulse, then the AND gates AN4 and AN52 are disabled. Since the Q output of the flip-flop FF2 is connected with the input terminal i5 of the CPU 1, the CPU 1 detects that the data transfer is completed by the "Low" signal on the terminal i5.

In the flash device FL (FIG. 22), the display device DP2 displays the flash available range of the flash device by the data $Dv_{max}$ and $Dv_{min}$ fed from the camera. A switch DS is provided for switching the unit of the contents of the display. A display device DP2 displays the flash available range distance data in terms of the metric system with the switch DS switched to the (m) contact and displays the distance data in terms of the U.S. system with the switch DS switched to the (ft) contact. The flash available range distance data can be displayed by a display device DP5 (FIG. 21). The display device DP2 is provided on the back side of the flash device and the display device DP5 can be provided in a finder, top face or the back lid of the camera.

With continuing reference to FIG. 21, a timer circuit TI5 generates an output after a sufficient time has passed for transferring the data $Dv_{max}$ and $Dv_{min}$ to the flash device FL from the period of generation of the output of the one shot circuit OS4. Thus, the timer circuit TI5 resets the flip-flop FF2 through the OR gate OR2 after the period for transferring the data has lapsed.

Detecting the charge completion signal is explained hereinafter.

Referring to FIGS. 21 and 22 the terminal O8 of the CPU 1 becomes "High" upon closure of the release switch RS. The "High" signal is applied to a one shot circuit OS6, which generates a "High" pulse of a predetermined width. A flip-flop FF3 is set by the output of the one shot circuit OS6 to generate a "High" signal at the Q output terminal. The output of the flip-flop FF3 is applied to the D input terminal of a D-type flip-flop DF2 so that the Q output terminal of the flip-flop DF2 becomes "High" upon application of the clock pulse DP to the clock terminal CL of the flip-flop DF2 from the frequency divider DV. The Q output is applied to one input terminal of an AND gate AN6 which receives the clock pulse DP from the frequency divider DV at another input terminal, whereby the AND gate AN6 gates the clock pulse DP to the terminal JF1 of the flash device FL through the OR gate OR6 and the terminal JB5 of the flash control device FC.

The "High" signal at the Q output of the flip-flop DF2 is applied to another one shot circuit OS10, which generates a pulse of the predetermined width to an inverter IN9. The NAND gate NA5 generates a "High" level pulse the width of which corresponds to that of the output of the one shot circuit OS10. The output pulse of the NAND gate NA5 is applied to the base of the transistor BT10, which conducts during the period of the pulse of the NAND gate NA5. Accordingly a pulse of "Low" level is inputted to the terminal JF2 of the flash device FL through the terminal JB6 of the flash control circuit FC. The "Low" level pulse on the terminal JF2 is inverted by tne inverter IN20 (FIG. 22) and applied to the input terminal of the AND gate AN25, which generates a pulse FR.

The pulse DP is applied to the set terminal of the flip-flop FF10 to set it, so that the Q output of thereof is "High". The "High" signal of the flip-flop FF10 is inverted by the NOR gate NO1, then applied to the input terminals of the AND gates AN11 and AN22.

The counter CO3 in the flash device FL counts one pulse DP and the content thereof becomes "0001", whereby the output terminal b0 of the decoder DE2 becomes "High". This "High" signal is applied to the input terminal of the AND gate AN70 which gates the charge completion signal CD to the terminal JF2. The charge completion signal on the terminal JF2 is transferred to the terminal JB6 of the flash control circuit FC as hereinbefore described.

With reference to FIG. 21, when the Q output of the flip-flop DF2 becomes "High", the pulse DP from the frequency divider DV is applied to the reset input terminal R of the flip-flop FF3 and the reset terminal RE of the flip-flop DF2, then the flip-flops FF3 and DF2 are respectively reset by the negative going edge of the pulse DP. Thus one pulse DP is transferred to the flash device FL from the flash control circuit FC.

After the "High" signal is input to the D-type flip-flop DF3 from the flip-flop DF2, the Q output of the flip-flop DF3 becomes "High" by the positive going edge of the pulse DP applied to the clock terminal CL of the flip-flop DF3. Also the Q output of the D-type flip-flop DF4 becomes "High" by the pulse DP. The "High" signal of the flip-flop DF3 is applied to the input terminal of an AND gate AN7, which gates the charge completion signal applied from the terminal JB6.

An AND gate AN51 produces a "High" signal upon receipt of the "High" signal from the Q output of a D-type flip-flop DF4. The output of the AND gate AN51 is applied to the input terminal of a D-type flip-flop DF5, the Q output of which becomes "High" upon receipt of the charge completion signal CD. The "High" signal of the flip-flop DF5 is applied to the input terminal i7 of the CPU 1.

The output signal of the AND gate AN51 is input to the reset terminals RE of the D-type flip-flops DF3 and DF4, then the Q output terminals of the both flip-flops DF3 and DF4 become "Low". The "Low" output of the flip-flop DF3 is applied to the input terminal i6 of the CPU 1 as the signal representing that the read-in operation of the charge completion signal is completed.

In the flash device shown in FIG. 22, when the flip flop FF10 is set as described above, a timer TI8 starts counting. The preset time of the timer TI8 is longer than the time required for transferring the charge completion signal from the flash device FL to the flash control circuit FC.

The timer TI8 generates a "High" signal when the preset time has lapsed and the "High" signal is applied to the reset input terminal of the counter CO3 through an OR gate OR10 and is applied to the reset terminal of the flip-flop FF10 through an OR gate OR11, whereby the counter CO3 and the flip-flop FF10 are simultaneously reset, so as to prevent the output 0001 of the counter from being held a long time.

In a case where the "High" signal on the terminal JF1 and the charge completion signal are applied to the input terminals of an AND gate AN18, the AND gate AN18 gates the output of the AND gate AN25 to the set input terminal of a flip-flop FF12 and a one shot circuit OS12. The flip-flop FF12 is set and the one shot circuit OS12 generates an output the width of which is longer than the time period of the pulse DP. By this arrangement, if a plurality of pulses DP must be transferred to the terminal JF1 in series, each one of the pulses DP can be transferred to the terminal JF1 within one period of the output pulse of the one shot circuit OS12.

In a case where only one pulse DP is transferred to the terminal JF1 after the release switch RS is closed, an AND gate AN19 does not generate the an output so that the flip-flop FF12 is kept in the set state. In such state if the switch SS1 is switched to the EX contact with the output of the inverter IN14 being "High", this "High" signal is applied to one input terminal of an AND gate AN26 through an OR gate OR20 and the AND gate AN21. Accordingly, when an order signal of the light emission is applied to the terminal JF3, the order signal is transferred to the flash light emission control device FLC through the AND gate AN26. Therefore, under the second mode and when the charge completion signal is present, the flash device FL is ready for light emission upon closure of the release switch RS.

When the X contact SX in the flash control device FC is closed, an inverter IN17 drives a one shot circuit OS13 which generates a "High" output pulse. The "High" output pulse is transferred to the light emission control circuit FLC thereby causing a xenon valve XE to emit the flash light in a known manner. On the other hand, from the output of the one shot circuit OS13, a "Low" level pulse appears on the terminal JB6. An inverter IN10 generates a "High" signal which is applied to an AND gate AN8. If the shutter button has already been pressed, a "High" signal is generated from the output terminal O5 of the CPU 1, the "High" signal is applied to an AND gate AN8. Then the AND gate AN8 provides a "High" signal to a flip-flop FF5 to set it, thereby the Q output of the flip-flop FF5 becomes "High". The Q output of the flip-flop FF5 is applied to one input terminal of an AND gate AN9 and the base of a transistor BT4 which is then non-conductive.

With continuing reference to FIG. 21, a transistor BT3 receives a light value measured on the film plane by a light measurement circuit ME and produced from an operational amplifier OA1, whereby a current proportional to the light value of the flash light measured on the film plane flows in the collector of the transistor BT3. The collector current is integrated by a capacitor C1. A voltage across the capacitor C1 is applied to a comparator AC1 to which either a reference voltage CE20 or another reference voltage CE21 is applied through analog switches AS20 or AS21 controlled by the signal at the terminal 011. The terminal 011 becomes "High" for the fill-in flash mode and "Low" for the flash light mode, i.e., the flash light is used as a main light source for photographing. Accordingly, under the fill-in flash mode, the analog switch AS20 is ON so that the reference voltage CE20 is applied to the comparator AC1. Under the flash light mode, the analog switch AS21 is ON so that the reference voltage CE21 is applied to the comparator AC1. The ratio of the reference voltages CE20 and CE21 is 3:4, in other words, the reference voltage CE20 is lower by 0.5 Ev than the reference voltage EC21 in terms of the apex value. Furthermore, the reference voltage CE21 corresponds to the correct exposure.

When the voltage across the capacitor C1 reaches the reference voltage CE20 in case of the fill-in flash mode , the comparator AC1 generates a "High" output, so that a one shot circuit OS9 generates a "High" output. Under this condition if the signal showing TTL light measuring mode is stored in the shift register SR1, a pulse is transferred to the terminal JF1 through the AND gate AN9, OR gate OR6 and the terminal JB5 to stop the light of the flash device FL. In a similar manner as described above, the flash device is stopped when the voltage across the capacitor C1 reaches the reference voltage EC21 in case of the flash light mode. As described above, in case of the fill-in flash mode, when the light exposure value measured on the film plane reaches the value smaller by 0.5 Ev than the correct exposure value, the light of the flash device FL is stopped. This operation corresponds to the case wherein the value k1 is set by 0.5 Ev as described with reference to FIGS. 1 and 2.

The output pulse of the AND gate AN8 is applied to the timer TI10. The timer TI10 generates a pulse when a sufficient time has passed after the flash device. FL completes the light emission, so that the flip-flops FF5 and DF5 are reset, thereby causing the transistor BT4 to be conductive resulting in disabling the AND gate AN9.

In the flash device FL shown in FIG. 22, the AND gate AN26 produces a "High" pulse by the output of the one shot circuit OS13, whereby a flip-flop FF14 is set and the Q output thereof becomes "High". In a case where the switch MOS is switched to the OU contact i.e., the external light mode is set in the flash device, inverters IN18 and IN19 generate "High" output. Therefore, the output of a NAND gate NA1 is "Low", whereby a transistor BT5 is non conductive and an AND gate AN28 is enabled.

By emitting the flash light from the xenon tube XE a photo transistor PT receives light reflected from the photographing object through an aperture AP. The output current of the photo transistor PT is integrated by a capacitor C2. When the voltage across the capacitor C2 reaches a reference voltage VE2, which is variable and determined corresponding to the film sensitivity used in the camera, a comparator AC2 provides a "High" output to enable a one shot circuit OS14. The output pulse of the one shot circuit OS14 is transferred to the flash light control circuit FLC, whereby the xenon valve XE stops emission of the flash light.

In case of the TTL mode with the switch MOS switched to the TT contact, an inverter IN40 generates a "High" signal to enable an AND gate AN27, whereby the light-emission-stopping-signal transferred to the terminal JF1 of the flash device FL from the one shot circuit OS9 is further transferred to the flash light control circuit FLC through the AND gate AN27 and an OR gate OR24.

When the order signal for emission of the flash light is applied to a timer TI2 from the AND gate AN26, the timer TI2 counts the period of time required for the full light emission of the xenon tube. When the time set in the timer TI2 elapses, the output of the timer TI2 is applied to the reset terminal of a flip-flop FF12 through the OR gate OR19 to reset it. The output of the timer TI2 is also applied to the reset terminal of a flip flop FF14 to reset it.

In a case where the first flash light photographing mode is selected with the switch SS1 switched to the CU contact, the output of the inverter IN15 is "High". If the charge completion signal is present, the AND gate AN20 and the OR gate OR20 generate "High" signals respectively, whereby the AND gate AN26 is enabled. In the state described above, with the X contact opened, an AND gate, AN23 is enabled by the output of the inverter IN16 to gate the charge completion signal to the terminal JF2 through the OR gate OR22 and the transistors BT6 and BT7. The charge completion signal is read in the flash control circuit FC, then the first flash light photographing mode is detected.

Upon closure of the X contact SX, the AND gate AN26 generates a "High" signal by the output of the one shot circuit OS13 and in turn the output of the inverter IN16 is made "Low". The "Low" signal is transferred to the terminal JB6 of the flash control device FC through the terminal JF2 as the order signal of the flash light emission. In case of the TTL mode, the light-emission-stopping-signal from the flash control circuit FC is transferred to the flash light control device FLC through the AND gate AN27 and the OR gate OR24. In case of the external light mode, the light-emission-stopping-signal from the one shot circuit OS14 is applied to the flash light control device FLC through the OR gate OR24 to stop the emission of light by the xenon tube XE.

In order to display that the light control is completed by the output of the one shot circuits OS9 and OS14, there are provided a display device FDC1 in the flash control circuit FC and another display device FDC2 in the flash device FL. In the flash control device FC, when the AND gate AN9 is enabled by the content of the shift register SR1 showing the TTL mode, and when the light-emission-stopping-signal signal is generated, the display device FDC1 displays whether the light control performed in the camera system is correct for a predetermined period. On the other hand, in the flash device, when the light emission stopping signal is generated from the OR gate OR24, the display device FDC2 displays an indication confirming that the light value is controlled correctly.

Figure 23A:
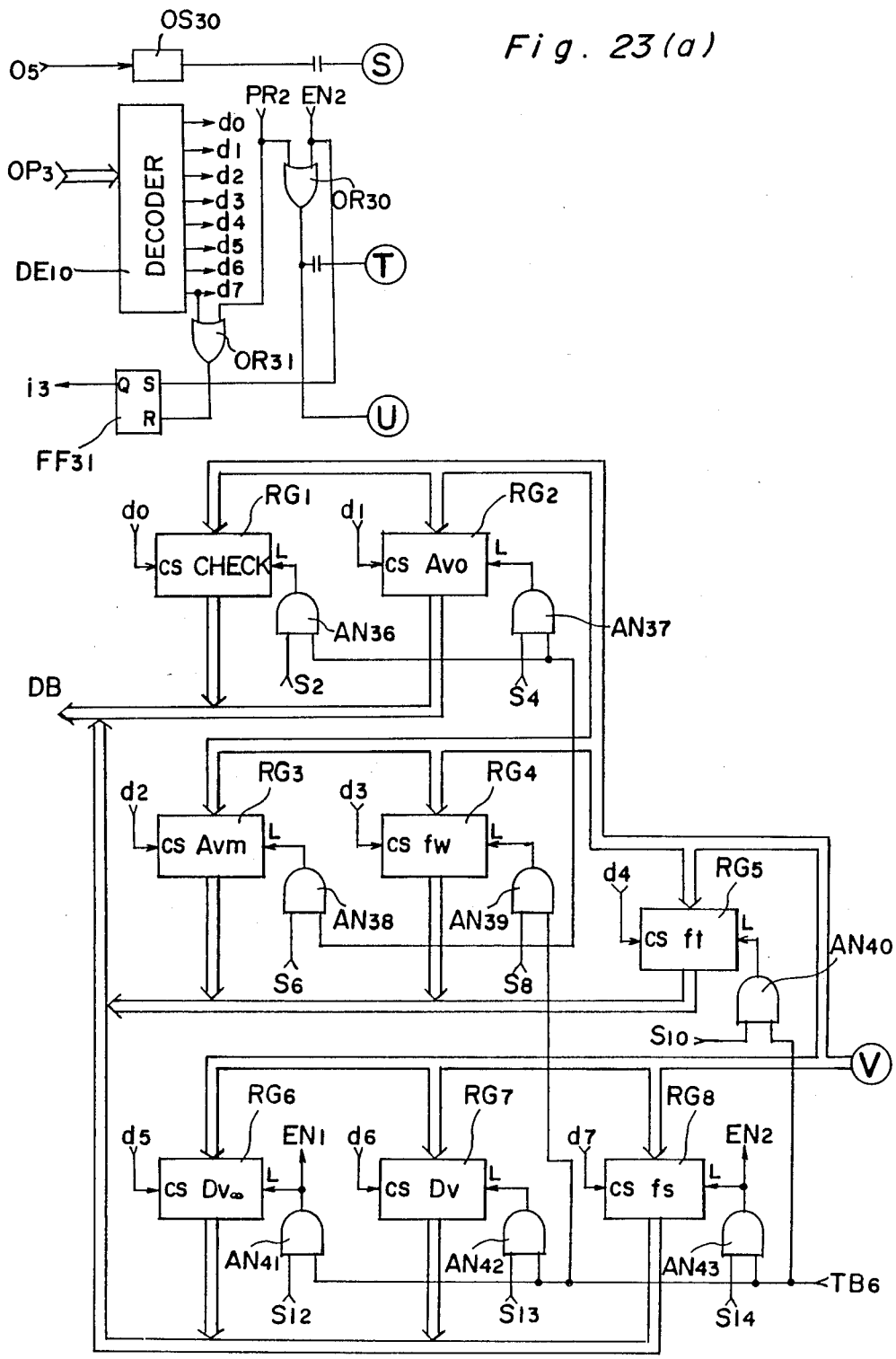
FIG. 23 is a detailed circuit diagram of a lens circuit and an interface circuit used in the embodiment shown in FIG. 12.
Figure 23B:
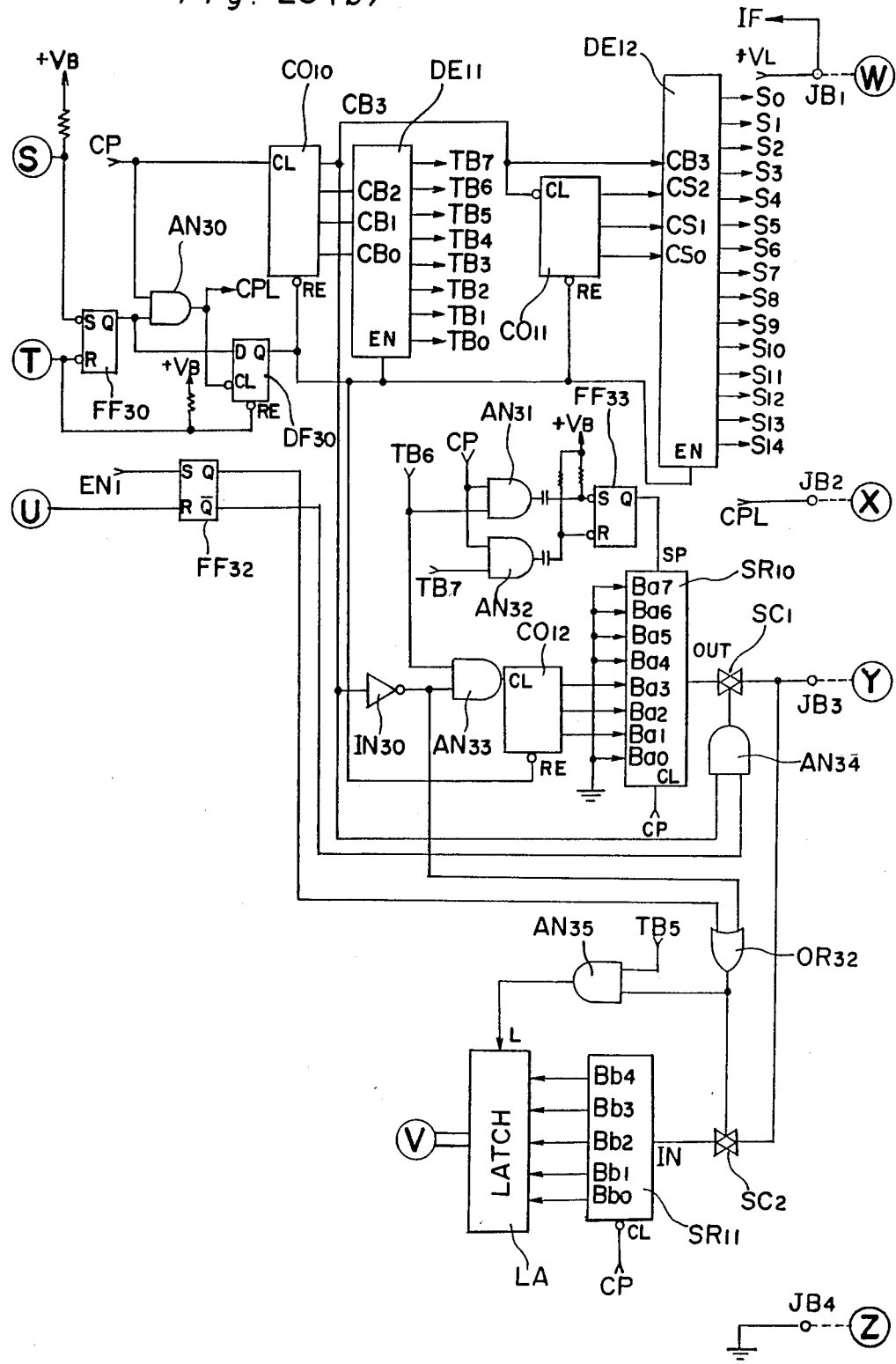
Figure 23C:
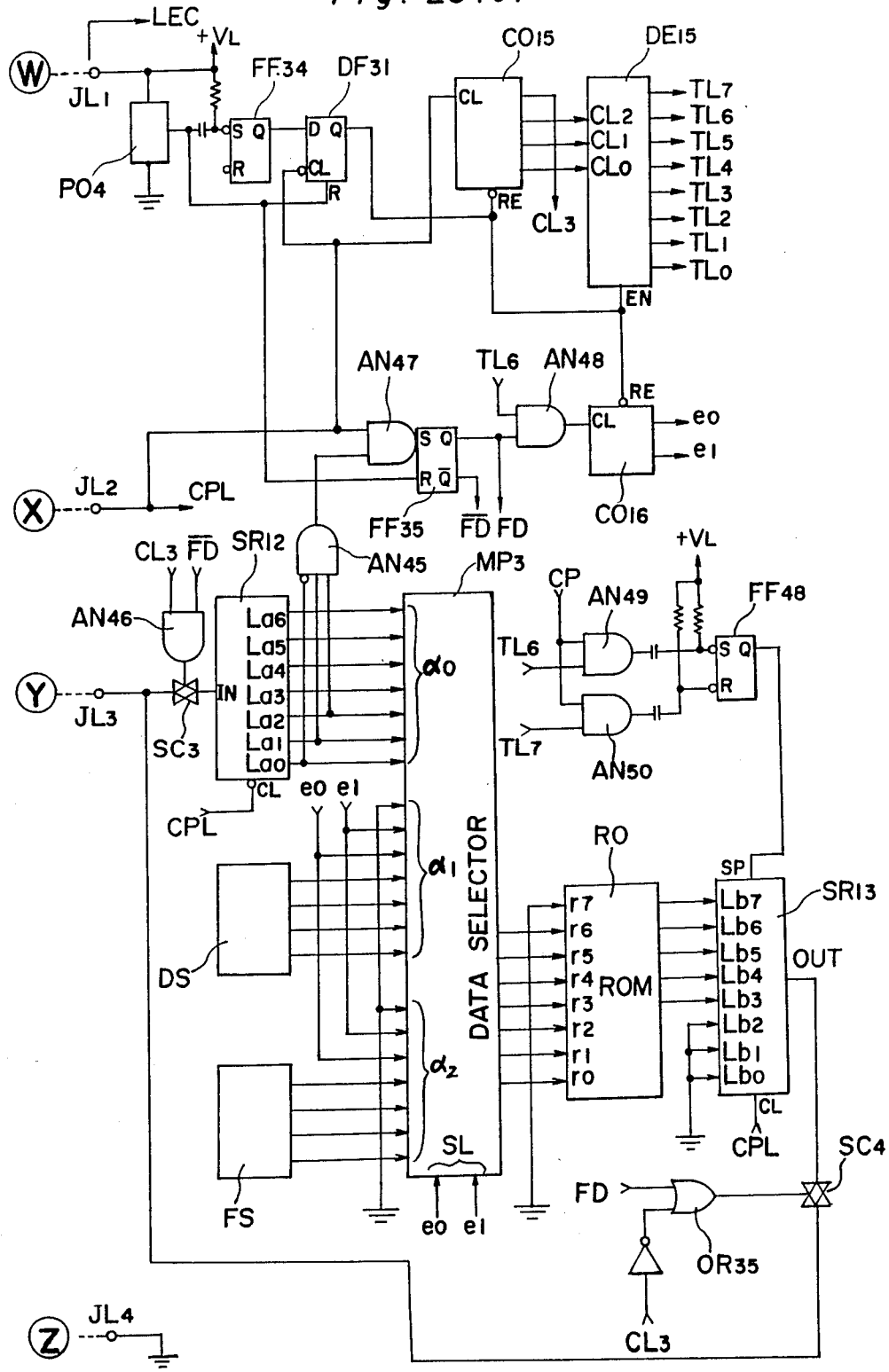

FIG. 23 shows the detailed circuit arrangement of the interface IF and the lens circuit LEC.

The ROM RO stores the following data. The Table 6 (at the end of the specification) shows the specific technical meaning of the data stored in the ROM RO and the Table 7 shows the address of the data stored in the ROM RO.

The data "11100" in the address "00000001" is used to check whether an interchangeable lens is attached to the camera. The data "11100" can be commonly used for all kinds of lenses. The opened aperture value Avo is stored in the address "00000010" and the maximum aperture value Avm is stored in the address "00000011". The shortest focal length fw of the zoom lens is stored in the address "00000100". If the lens used is a fixed focal length type, the fixed focal length may be stored in this address. The longest focal length ft of the zoom lens is stored in the address "00000101". For the fixed focal length lens, the data "11111" is stored in the ROM RO. The maximum distance data Dv is stored in the address "00000110".

The photographing distance data of variable value is stored in the addresses "00010000" through "00011111". The set focal length data are stored in the addresses "00100000" through "00101111".

A distance information unit DS produces the data of 4 bits representing an amount of the rotation angle of a distance adjusting ring (not shown) of the camera relative to the infinity position. The ROM RO can be accessed by designating the lower four bits r3 through r0 of the address data with the output data of the distance information unit DS so as to produce the distance data from the ROM. As understood by the Table 8 at the end of the specification, a distance data "11001" corresponding to $Dv = 8.5$ can be produced from the ROM if the distance adjusting ring is set at a position between the infinity position and 17 m, so that the distance information unit DS produces the data "0000". In case of flash light photographing, if the data "11001" is input in the CPU 1, the infinity warning can be displayed by a display device FIP in FIG. 12.

By increasing the number of bits of the address data and the distance data stored in the ROM, the interval of each of the distance ranges can be decreased and the total number of the distance ranges can be increased.

The focal length data set for the zoom lens are stored in the addresses "00100000" through "00101111". For a fixed focal length lens, the data "11111" l is stored in all the addresses mentioned above.

A focal length information unit FS produces the data of 4 bits representing the amount of movement of a zoom ring of a zoom lens from the shortest focal position. The ROM RO can be accessed by designating the lower 4 bits r3 through r0 of the address data with the output data of the focal length information unit FS to produce the focal length data (absolute value) from the ROM RO.

The operation of the interface IF will be described hereinafter.

A one shot circuit OS30 produces a "High" signal by the output of the "High" signal on the output terminal 06 of the CPU 1. The "High" signal of the one shot circuit OS30 sets a flip-flop FF30. Upon setting of the flip-flop FF30, the clock pulse train CPL is applied to the clock terminal of a D-type flip-flop DF30 through an AND gate AN30. Then the Q output of the flip-flop DF30 becomes "High" in synchronism with the positive going edge of the clock pulse, so that counters CO10, CO11 and CO12 are released from a reset condition, whereby decoders DE11 and DE12 are enabled to output the data. The clock pulse train is also applied to the terminal JL2 of the lens circuit LEC through the terminal JB2 of the interface IF. The DC power is supplied to the terminal JL1 of the lens circuit LEC from the terminal JB1 of the camera upon conduction of the transistor BT2 by the "High" output of the terminal 06 of the CPU 1 (FIG. 12), thus, the power ON reset PO4 generates a pulse. A flip-flop FF35 and a D-type flip-flop DF31 are reset and a flip-flop FF34 is set by the positive going edge of the output pulse of the power ON reset PO4. The Q output of the flip-flop DF31 becomes "High" by the negative going edge of the first clock pulse CPL, whereby counters CO15 and CO16 are released from the reset condition, resulting in enabling the decoder DE15, whereby the data transferring becomes ready.

The counter CO10 and the decoder DE11 in the interface IF and the counter CO15 and the decoder DE15 are provided for generating the timing signals for synchronizing the operation of the camera and the lens circuit LEC. The counter CO10 is a hexadecimal number system counter of 4 bits for counting the clock pulses CP and the counter CO15 is a hexadecimal number system counter for counting the clock pulses CPL. The decoders DE11 and DE15 are applied with the respective lower 3 bits CB0, CB1, CB2, CL0, CL1 and CL2 of the counters CO10 and CO15 so as to output "High" signals at any one of the output terminals TB0 through TB7 and TL0 through TL7 respectively corresponding to the input data. The Table 9 at the end of the specification shows the relationship between the input data and the output data of the decoders DE11 and DE15.

The counter CO11 of 3 bits is provided for counting the number of pulses output from the terminal CB3 of the counter CO10. The output terminals CO0 through CO2 of the counter CO11 and the output terminal CB3 of the counter CO10 are connected to the decoder DE12, which generates a "High" signal at any one of the terminals S0 through S14 corresponding to the data of the counter CO3 and the data on the terminal CB3. The relationship between the input data and the output data is shown in the Table 10 at the end of the specification.

It is noted that the timing Si (i=0, 1, . . . ) means the period during which a high signal appears on the terminal Si hereinafter.

A shift register SR10 of 8 bits has its input terminals BA1, BA2 and BA3 connected with the three output terminals of the counter CO12 and the other terminals Ba4 through Ba7 and Ba0 are grounded. When the terminal SP of the shift register SR10 is "High", the data on the terminals Ba0 through Ba7 are taken in the shift register in parallel upon receipt of the positive going edge of the clock pulse CP and when the terminal SP is "Low", the data in the shift register SR10 is output on the output terminal OUT from the highest bit in a bit-by-bit manner upon receipt of the positive going edge of the clock pulses CL.

AND gates AN31 and AN32 each have one input terminal connected to receive the clock pulses CP with the other input terminal of the AND gate AN31 connected with the terminal TB6. Another input terminal of the AND gate AN32 is connected with the terminal TB7 of the decoder DE11. The output terminal of the AND gate AN31 is connected with the set input terminal of a flip-flop FF33 and the output terminal of the AND gate AN32 is connected with the reset input terminal of the flip-flop FF33. The Q output of the flip-flop FF33 is connected with the terminal SP of the shift register SR10. By the above arrangement, the flip-flop FF33 is set by the negative going edge of the clock pulse CP generated at the time during which the output TB6 of the decoder DE11 becomes "High" ( the timing is referred to as timing TB6 ) and is reset by the negative going edge of the clock pulse CP generated at the timing TB7. The shift register SR10 takes the data therein as the positive going edge of the pulse appears on the terminal TB7 and outputs the data in series by the negative going edge of the signals of the respective terminals TB0 through TB7.

And gates AN49 and AN50, a flip-flop FF48 and a shift register SR13 in the lens circuit LEC are arranged in a similar manner as described above, but are responsive to the TL6 and TL7 outputs of decoder DE15.

In order to operate the shift registers SR10 and SR13 as described above, the shift registers are arranged in such a manner that eight flip-flops are provided for each bit for receiving the parallel inputs with the output terminal of each flip-flop connected with the input terminal of the flip-flop situated at a one bit higher position so that the data stored in the respective flip-flops can be transferred to the other flip-flop situated at the one bit higher position. Furthermore, the output of the flip-flop for storing the highest bit is connected with the input terminal of an additional flip-flop i.e. a ninth flip-flop, the output terminal of which is used as the output terminal of the shift register. Thus, the ninth flip-flop takes the output of the flip-flop for storing the highest bit in synchronism with the clock pulse, whereby the shift register produces output data delayed by one clock pulse.

When the content of the counter CO12 is "001" in the timing TB6 in the step S0, the content of the counter CO12 is transferred to the shift register SR10 in the timing TB7. The data "00000010" of the shift register SR10 is transferred to the terminal JB3 of the interface IF through the switch SC1 by one bit in series in the respective timings TB0 through TB7 in the step S1. The data is further transferred to the terminal JL3 of the lens circuit LEC. As the switch SC3 is opened, the data is input in the shift register SR12 in order in synchronism with the negative going edge of the clock pulses CPL. Further, the data stored in the shift register SR12 is transferred to the address terminals r0 through r6 of the ROM RO through the data selector MP3, whereby the ROM RO outputs the stored data accessed by the address data.

The output terminals La0 through La6 of the shift register SR12 are respectively "0000001" by the negative going edge of the clock pulse CPL in the timing TL6, so that the address "00000001" is accessed to output the checking data "11100" from the ROM RO. The checking data is taken in the shift register SR13 at the positive going edge of the signal on the terminal TL7 i.e., at the rising period of the timing TL7. Since the output terminal CL3 of the counter CO15 becomes "Low", at the respective timings TL0 through TL7 in the step S2, each of the data stored in the shift register SR13 is output at the respective rising times of the timings TL0 through TL7 and the output data is transferred to the terminal JB3 of the interface IF through the switch SC4 and the terminal JL3.

In the step S2 during which the data is transferred to the interface IF from the lens circuit LEC, the switch SC2 is OFF by the output CB3 of the counter CO10, therefore the checking data "11100" is read into a shift register SR11 through the switch SC2 at the positive going edge of the clock pulse CP. The data in the shift register SR11 is transferred to a latch LA at the positive going edge of the respective output pulses of the AND gate AN35 in the timing TB5. The data in the latch LA is further transferred to registers RG1-RG8.

The content of the counter CO12 becomes "010" upon receipt of the output pulse from the AND gate AN33 at the timing of TB6 in the step S2. Then, the data "00000100" is taken in the shift register SR10 at the timing TB7.

In the next step S3, the switch SC1 is ON by the "High" output on the terminal CB3 of the counter CO10 which is applied to the switch SC1 through an AND gate AN34. When the output CL3 of the counter CO15 becomes "High", this "High" signal is applied to a switch SC3 through an AND gate AN46 so that the switch SC3 conducts to pass the address data from the shift register SR10 to the terminal JB3. The address data is further transferred to the shift register SR12 through the terminal JL3. The address data in the shift register SR3 is further transferred to the address terminals r0 through r6 of the ROM RO, then the data representing the opened aperture value Avo stored in the address "00000010" of the ROM RO is transferred to the shift register SR13.

In the step S4, the output terminal CB3 of counter CO10 and the terminal CL3 of the counter CO15 become "Low" respectively, whereby the switches SC2 and SC4 are conductive so that the data "00111" is transferred to the shift register SR11 from the shift register SR13 in the lens circuit LEC through the terminals JL3 and JB3 and the switch SC2. The data in the shift register SR11 is latched in the latch LA at the timing TB5. The opened aperture data Avo latched in the latch LA is taken in a shift register RG2 upon receipt of the pulse from an AND gate AN37 at the timing TB6.

In the step S5, the address data "00000110" is transferred to the lens circuit LEC, whereby the maximum aperture data Avm is taken in a register RG3 through the interface IF at the timing TB6 in the step S6. In the step S7, the address data "00001000" is transferred to the lens circuit LEC, whereby the shortest focal length data fw is taken in a register RG4 through the interface IF at the timing TB6 in the step S8. In the step S9, the address data "00001010" is transferred to the lens circuit LEC, whereby the longest focal length data ft is taken in a register RG5 at the timing TB6 in the step S10. In the step S11, the address data "00001100" is transferred to the lens circuit LEC , whereby the longest photographing distance data Dv∞ is taken in a register RG6 at the timing TB6 in the step S12. Thus, the transfer of the various fixed data is completed.

The output terminals La2, La1 and La0 of the shift register SR12 are "110" when the clock pulse CPL rises to the high level at the timing TB6 in the step S11. While the flip-flop FF35 is set to produce a "High" signal at the Q output (shown by FD) thereof when the output of the AND gate AN47 rises to the high level at the timing TL7. Also the Q terminal of the flip-flop FF35 becomes "Low". Therefore regardless of the state of the terminal CL3 of the counter CO15, the output of an AND gate AN46 becomes "Low" and the output of an OR gate OR35 is "High", so that switch SC3 is made non-conductive with the switch SC4 made conductive. Accordingly, only the data relating to the lens can be transferred to the camera in the subsequent steps.

In the step S12, the longest photographing distance data Dv is transferred to the CPU 1, the data Dv is stored in a register RG6 by the output of an AND gate AN41. A flip-flop FF32 is also set by the output of the AND gate AN41. Thus, the switch SC1 is made non-conductive by the "Low" output of the AND gate AN34 and the switch SC2 is made conductive by the "High" output of the OR gate OR32.

The content of the counter CO16 becomes "01" by counting the pulse fed from an AND gate AN48 at the timing TL6 in the step S12. The output of the counter CO16 is applied to the input terminal of a data selector MP3, which transfers the input data on the terminal M1 to the ROM RO as the address data. The higher 4 bits of the address data correspond to the output of the counter CO1 and the lower 4 bits of the address data correspond to the output data of the distance information unit DS. The photographing distance data Dv read out from the ROM RO is transferred to the shift register SR13 at the timing TL7 and in turn, the photographing distance data Dv is further transferred to the interface IF in synchronism with the negative-going edge of the respective clock pulses appearing at the timings TB0 through TB4 in the step S11. The photographing distance data Dv is taken in the shift register SR11 and latched in the latch LA at the timing TB5, thereby further being taken in the register RG7 by the output of an AND gate AN42 at the timing TB6.

After the longest photographing distance data is transferred to the register RG6, regardless of the state of the output terminal CB3 of the counter CO10, the output of the AND gate AN34 is "Low", and the output of the OR gate OR2 is "High", so that the switch SC1 is non-conductive and the switch SC2 is conductive to transfer only the lens data.

The content of the counter CO16 becomes "10" upon receipt of the output pulse of an AND gate AN48 at the timing of TL6 in the step S13. The data "10" is applied to the data selector MP3 to transfer the data input to the input terminals M2 to the ROM RO as the address data. The lower 4 bits of the address data represent the focal length output from the focal length information unit FS. The focal length data fs is taken in the shift register SR13 at the timing TL7 in the step S13 and further transferred to the interface IF. The focal length data fs is taken in the latch LA at the timing TB5 in the step S14 and further taken in a register RG8 through AND gate 43 at timing TB6. On the other hand, the output of an AND gate AN43 is applied to the set input terminal of a flip-flop FF31, which is set to produce a "High" signal at the Q output. The "high" signal is applied to the input terminal i3, whereby the CPU 1 judges that the data transfer of the lens data is completed, causing the output terminal 06 to be "Low". Then the transistor BT2 is made non-conductive to stop the power supply to the lens circuit LEC.

The data transfer operation between the interface IF and the CPU 1 through the data bus DB will be described hereinafter.

If the data on the output terminal OP3 of the CPU 1 is $6_H$, the terminal d0 of the decoder DE10 becomes "High", whereby the checking data is read in the CPU 1 from the register RG1 through the data selector MP1 and the data bus DB.

If the data on the output terminal OP3 is $7_H$, the output terminal d1 of the decoder DE10 is "High" whereby the aperture data Avo in the register RG2 is read in the CPU 1 through the data bus DB.

In similar manner as described above, each of the data Avm, fw, ft, Dv and fs stored in the registers RG3 through RG8 is read in the CPU 1 through the data bus DB in order. After the data transfer is completed, the operation shown in the flow chart in FIG. 15 is executed.

It is noted that the circuit arrangement shown in FIGS. 21 through 23 should be reset by the power ON reset signal PR1, since they must be reset when the battery BB is mounted in the camera.

Although in the embodiment described above, the aperture value which is not related to the ambient light level is set by either the aperture value corresponding to the focal distance or the set aperture value, other aperture values defined by the maximum light value $Iv_{max}$ of the flash device, or a further aperture value defined by the maximum photographing distance Dv and the mean light emission value $Iv_{mean}$ defined by the maximum light emission value $Iv_{max}$ and the minimum light emission value $Iv_{min}$ can be used.

In addition, in the above embodiment, the diaphragm aperture size can be decreased up to the minimum value if the photographing object is bright, if the interchangeable lens is not provided with the lens data output circuit, as the CPU can not detect the flash available range, the minimum aperture value may be limited to a suitable value such as the aperture value F8 to prevent failure of photographing.

TABLE 01

| Ev | | SEL$_{53}$ | SEL$_{55}$ |
|---|---|---|---|
| | Tvs Tvx | | |
| Ev Avo+Tvs | | Avo | Tvs |
| Avo+Tvs_Ev_Avm+Tvs | | Ava | Tvs |
| Avm+Tvs_Ev_Avm+Tvx | | Avm | Tva |
| Avm+Tvx_Ev | | Avm | Tvx |
| | Tvs_Tvx | | |
| Ev_Avo+Tvx | | Avo | Tvx |
| Avo+Tvx_Ev_Avm+Tvx | | Ava | Tvx |
| Avm+Tvx_Ev | | Avm | Tvx |

TABLE 1

| FORCAL DISTANCE | JUDGE CIRCUIT(DJ) | | | | DATA SELECTOR(MP$_{10}$) | | | |
|---|---|---|---|---|---|---|---|---|
| | d$_1$ | d$_2$ | d$_3$ | d$_4$ | Av | FNO. | Tv | sec. |
| -30 mm | H | L | L | L | 6 | 8 | 5 | 1/30 |
| 31 mm-55 mm | L | H | L | L | 5 | 5.6 | 6 | 1/60 |
| 56 mm-120 mm | L | L | H | L | 4 | 4 | 7 | 1/125 |
| 121 mm- | L | L | L | H | 3 | 2.8 | 8 | 1/250 |

TABLE 2

| DATA SELECTOR(MP$_1$) | | | |
|---|---|---|---|
| SELECTION TERMINAL(SL) | | | |
| BINARY NUMBER | 16 SYSTEM NUMBER | INPUT TERMINAL | OUTPUT(DB) |
| 0 0 0 0 | 0$_H$ | IP$_4$ | Tvs |
| 0 0 0 1 | 1$_H$ | IP$_5$ | Sv |
| 0 0 1 0 | 2$_H$ | IP$_6$ | MODE |
| 0 0 1 1 | 3$_H$ | IP$_2$ | MEASURED VALUE (Bv+Sv−Avo) |
| 0 1 0 0 | 4$_H$ | IP$_7$ | DATA |
| 0 1 0 1 | 5$_H$ | IP$_3$ | Avs - Avo |
| 0 1 1 0 | 6$_H$ | | CHECK DATA |
| 0 1 1 1 | 7$_H$ | | Avo |
| 1 0 0 0 | 8$_H$ | | Avm |
| 1 0 0 1 | 9$_H$ | IP$_1$ | fw |
| 1 0 1 0 | A$_H$ | | ft |
| 1 0 1 1 | B$_H$ | | Dv |
| 1 1 0 0 | C$_H$ | | Dv |
| 1 1 0 1 | D$_H$ | | fs |

TABLE 3

| INPUT | | | | OUTPUT | | | | | | | | |
|---|---|---|---|---|---|---|---|---|---|---|---|---|
| CF$_3$ | CF$_2$ | CF$_1$ | CF$_0$ | b$_0$ | b$_1$ | b$_2$ | b$_3$ | b$_4$ | b$_5$ | b$_6$ | b$_7$ | b$_8$ |
| 0 | 0 | 0 | 0 | L | L | L | L | L | L | L | L | L |
| 0 | 0 | 0 | 1 | H | L | L | L | L | L | L | L | L |
| 0 | 0 | 1 | 0 | L | H | L | L | L | L | L | L | L |
| 0 | 0 | 1 | 1 | L | L | H | L | L | L | L | L | L |
| 0 | 1 | 0 | 0 | L | L | L | H | L | L | L | L | L |
| 0 | 1 | 0 | 1 | L | L | L | L | H | L | L | L | L |
| 0 | 1 | 1 | 0 | L | L | L | L | L | H | L | L | L |
| 0 | 1 | 1 | 1 | L | L | L | L | L | L | H | L | L |
| 1 | 0 | 0 | 0 | L | L | L | L | L | L | L | H | L |
| 1 | 0 | 0 | 1 | L | L | L | L | L | L | L | L | H |

TABLE 4

| G$_3$ | G$_2$ | G$_1$ | G$_0$ | Ivmax | GNO.max |
|---|---|---|---|---|---|
| 0 | 0 | 0 | 1 | 1 | 8 |
| 0 | 0 | 1 | 0 | 1.5 | 9.5 |
| 0 | 0 | 1 | 1 | 2 | 11 |
| 0 | 1 | 0 | 0 | 2.5 | 13 |
| 0 | 1 | 0 | 1 | 3 | 16 |
| 0 | 1 | 1 | 0 | 3.5 | 19 |
| 0 | 1 | 1 | 1 | 4 | 22 |
| 1 | 0 | 0 | 0 | 4.5 | 27 |
| 1 | 0 | 0 | 1 | 5 | 32 |
| 1 | 0 | 1 | 0 | 5.5 | 38 |
| 1 | 0 | 1 | 1 | 6 | 45 |
| 1 | 1 | 0 | 0 | 6.5 | 54 |
| 1 | 1 | 0 | 1 | 7 | 64 |
| 1 | 1 | 1 | 0 | 7.5 | 77 |

TABLE 5

| F$_2$ | F$_1$ | F$_0$ | Av | FNO. |
|---|---|---|---|---|
| 0 | 0 | 1 | 2 | 2 |
| 0 | 1 | 0 | 3 | 2.8 |
| 0 | 1 | 1 | 4 | 4 |
| 1 | 0 | 0 | 5 | 5.6 |
| 1 | 0 | 1 | 6 | 8 |
| 1 | 1 | 0 | 7 | 11 |

TABLE 6

| DATA | | | | | APERT | | FOCAL DISTANCE | DISTANCE | |
|---|---|---|---|---|---|---|---|---|---|
| d$_4$ | d$_3$ | d$_2$ | d$_1$ | d$_0$ | FNo. | Av | mm | m | Dv |
| 0 | 0 | 0 | 0 | 0 | 1 | 0 | less than 5 | less than 0.25 | less than −4 |
| 0 | 0 | 0 | 0 | 1 | 1.2 | 0.5 | 6-10 | 0.26-0.30 | −3.9−−3.5 |
| 0 | 0 | 0 | 1 | 0 | 1.4 | 1.0 | 11-15 | 0.31-0.35 | −3.4−−3.0 |
| 0 | 0 | 0 | 1 | 1 | 1.7 | 1.5 | 16-20 | 0.37-0.42 | −2.9−−2.5 |
| 0 | 0 | 1 | 0 | 0 | 2 | 2.0 | 21-25 | 0.44-0.50 | −2.4−−2.0 |
| 0 | 0 | 1 | 0 | 1 | 2.4 | 2.5 | 26-30 | 0.52-0.59 | −1.9−−1.5 |
| 0 | 0 | 1 | 1 | 0 | 2.8 | 3.0 | 31-35 | 0.62-0.71 | −1.4−−1.0 |

TABLE 6-continued

| DATA | | | | | APERT | | FOCAL DISTANCE | DISTANCE | |
|---|---|---|---|---|---|---|---|---|---|
| d4 | d3 | d2 | d1 | d0 | FNo. | Av | mm | m | Dv |
| 0 | 0 | 1 | 1 | 1 | 3.4 | 3.5 | 36–40 | 0.73–0.84 | −0.9––0.5 |
| 0 | 1 | 0 | 0 | 0 | 4 | 4.0 | 41–45 | 0.87–1.0 | −0.4–0.0 |
| 0 | 1 | 0 | 0 | 1 | 4.7 | 4.5 | 46–50 | 1.0–1.2 | 0.1–0.5 |
| 0 | 1 | 0 | 1 | 0 | 5.6 | 5.0 | 51–55 | 1.2–1.4 | 0.6–1.0 |
| 0 | 1 | 0 | 1 | 1 | 6.7 | 5.5 | 56–60 | 1.5–1.7 | 1.1–1.5 |
| 0 | 1 | 1 | 0 | 0 | 8 | 6.0 | 61–70 | 1.7–2.0 | 1.6–2.0 |
| 0 | 1 | 1 | 0 | 1 | 9.5 | 6.5 | 71–80 | 2.1–2.4 | 2.1–2.5 |
| 0 | 1 | 1 | 1 | 0 | 11 | 7.0 | 81–90 | 2.5–2.8 | 2.6–3.0 |
| 0 | 1 | 1 | 1 | 1 | 13 | 7.5 | 91–100 | 2.9–3.4 | 3.1–3.5 |
| 1 | 0 | 0 | 0 | 0 | 16 | 8.0 | 101–110 | 3.5–4.0 | 3.6–4.0 |
| 1 | 0 | 0 | 0 | 1 | 19 | 8.5 | 111–120 | 4.1–4.8 | 4.1–4.5 |
| 1 | 0 | 0 | 1 | 0 | 22 | 9.0 | 121–140 | 4.9–5.7 | 4.6–5.0 |
| 1 | 0 | 0 | 1 | 1 | 27 | 9.5 | 141–160 | 5.9–6.7 | 5.1–5.5 |
| 1 | 0 | 1 | 0 | 0 | 32 | 10.0 | 161–180 | 7.0–8.0 | 5.6–6.0 |
| 1 | 0 | 1 | 0 | 1 | 38 | 10.5 | 181–200 | 8.3–9.5 | 6.1–6.5 |
| 1 | 0 | 1 | 1 | 0 | 45 | 11.0 | 201–250 | 9.8–11.3 | 6.6–7.0 |
| 1 | 0 | 1 | 1 | 1 | | | 251–300 | 11.7–13.5 | 7.1–7.5 |
| 1 | 1 | 0 | 0 | 0 | | | 301–350 | 13.9–16.0 | 7.6–8.0 |
| 1 | 1 | 0 | 0 | 1 | | | 351–400 | 16.6–19.0 | 8.1–8.5 |
| 1 | 1 | 0 | 1 | 0 | | | 401–500 | 19.7–23 | 8.6–9.0 |
| 1 | 1 | 0 | 1 | 1 | | | 501–600 | 23–27 | 9.1–9.5 |
| 1 | 1 | 1 | 0 | 0 | | | 601–800 | 28–32 | 9.6–10.0 |
| 1 | 1 | 1 | 0 | 1 | | | 801–1000 | 33–38 | 10.1–10.5 |
| 1 | 1 | 1 | 1 | 0 | | | more than 1001 | 39–45 | 10.6–11.0 |
| 1 | 1 | 1 | 1 | 1 | | | Fixed Focal | more than 47 | more than 11.1 |

TABLE 7

| ADDRESS DATA | | | | | | | | CONTENT OF LENS DATA |
|---|---|---|---|---|---|---|---|---|
| r7 | r6 | r5 | r4 | r3 | r2 | r1 | r0 | |
| 0 | 0 | 0 | 0 | 0 | 0 | 0 | 1 | CHECK DATA(11100) |
| 0 | 0 | 0 | 0 | 0 | 0 | 1 | 0 | RELEASED APERTURE Avo |
| 0 | 0 | 0 | 0 | 0 | 0 | 1 | 1 | MINIMUM APERTURE Avm |
| 0 | 0 | 0 | 0 | 0 | 1 | 0 | 0 | MINIMUM FOCAL DISTANCE fw |
| 0 | 0 | 0 | 0 | 0 | 1 | 0 | 1 | MAXIMUM FOCAL DISTANCE ft |
| 0 | 0 | 0 | 0 | 0 | 1 | 1 | 0 | MAXIMUM ALLOWABLE DISTANCE Dv |
| 0 | 0 | 0 | 1 | 0 | 0 | 0 | 0 | SET DISTANCE Dv |
| 0 | 0 | 0 | 1 | 1 | 1 | 1 | 1 | |
| 0 | 0 | 1 | 0 | 0 | 0 | 0 | 0 | SET FOCAL DISTANCE |
| 0 | 0 | 1 | 0 | 1 | 1 | 1 | 1 | fs |

TABLE 8

| DS OUTPUT | | | | m | DATA | Dv |
|---|---|---|---|---|---|---|
| 0 | 0 | 0 | 0 | more than 17 | 11001 | 8.5 |
| 0 | 0 | 0 | 1 | 14–16 | 11000 | 8.0 |
| 0 | 0 | 1 | 0 | 12–13 | 10111 | 7.5 |
| 0 | 0 | 1 | 1 | 9.6–11 | 10110 | 7.0 |
| 0 | 1 | 0 | 0 | 8.1–9.5 | 10101 | 6.5 |
| 0 | 1 | 0 | 1 | 6.8–8 | 10100 | 6.0 |
| 0 | 1 | 1 | 0 | 5.7–6.7 | 10011 | 5.5 |
| 0 | 1 | 1 | 1 | 4.8–5.6 | 10010 | 5.0 |
| 1 | 0 | 0 | 0 | 4.1–4.7 | 10001 | 4.5 |
| 1 | 0 | 0 | 1 | 3.5–4.0 | 10000 | 4.0 |
| 1 | 0 | 1 | 0 | 2.9–3.4 | 01111 | 3.5 |
| 1 | 0 | 1 | 1 | 2.5–2.8 | 01110 | 3.0 |
| 1 | 1 | 0 | 0 | 2.1–2.4 | 01101 | 2.5 |
| 1 | 1 | 0 | 1 | 1.8–2.0 | 01100 | 2.0 |
| 1 | 1 | 1 | 0 | 1.5–1.7 | 01011 | 1.5 |
| 1 | 1 | 1 | 1 | less than 1.4 | 01010 | 1.0 |

TABLE 9

| COUNTER CO10(CO15) | | | DECODER DE11(DE15) | | | | | | | |
|---|---|---|---|---|---|---|---|---|---|---|
| CB2 (CL2) | CB1 (CL1) | CB0 (CL0) | TB0 (TL0) | TB1 (TL1) | TB2 (TL2) | TB3 (TL3) | TB4 (TL4) | TB5 (TL5) | TB6 (TL6) | TB7 (TL7) |
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

TABLE 10

| INPUT | | | | DECODER DE12 OUTPUT | | | | | | | | | | | | | | | |
|---|---|---|---|---|---|---|---|---|---|---|---|---|---|---|---|---|---|---|---|
| CB3 | CS2 | CS1 | CS0 | S0 | S1 | S2 | S3 | S4 | S5 | S6 | S7 | S8 | S9 | S10 | S11 | S12 | S13 | S14 | |
| 0 | 0 | 0 | 0 | 1 | 0 | 0 | 0 | 0 | 0 | 0 | 0 | 0 | 0 | 0 | 0 | 0 | 0 | 0 | |
| 0 | 0 | 0 | 1 | 1 | 0 | 0 | 0 | 0 | 0 | 0 | 0 | 0 | 0 | 0 | 0 | 0 | 0 | 0 | |
| 0 | 0 | 1 | 0 | 0 | 1 | 0 | 0 | 0 | 0 | 0 | 0 | 0 | 0 | 0 | 0 | 0 | 0 | 0 | |
| 0 | 0 | 1 | 1 | 0 | 0 | 1 | 0 | 0 | 0 | 0 | 0 | 0 | 0 | 0 | 0 | 0 | 0 | 0 | |
| 0 | 1 | 0 | 0 | 0 | 0 | 0 | 1 | 0 | 0 | 0 | 0 | 0 | 0 | 0 | 0 | 0 | 0 | 0 | |
| 0 | 1 | 0 | 1 | 0 | 0 | 0 | 0 | 1 | 0 | 0 | 0 | 0 | 0 | 0 | 0 | 0 | 0 | 0 | |
| 0 | 1 | 1 | 0 | 0 | 0 | 0 | 0 | 0 | 1 | 0 | 0 | 0 | 0 | 0 | 0 | 0 | 0 | 0 | |

TABLE 10-continued

| | INPUT | | | DECODER DE$_{12}$ OUTPUT | | | | | | | | | | | | | | |
|---|---|---|---|---|---|---|---|---|---|---|---|---|---|---|---|---|---|---|
| CB$_3$ | CS$_2$ | CS$_1$ | CS$_0$ | S$_0$ | S$_1$ | S$_2$ | S$_3$ | S$_4$ | S$_5$ | S$_6$ | S$_7$ | S$_8$ | S$_9$ | S$_{10}$ | S$_{11}$ | S$_{12}$ | S$_{13}$ | S$_{14}$ |
| 0 | 1 | 1 | 1 | 0 | 0 | 0 | 0 | 0 | 0 | 1 | 0 | 0 | 0 | 0 | 0 | 0 | 0 | 0 |
| 1 | 0 | 0 | 0 | 0 | 0 | 0 | 0 | 0 | 0 | 0 | 1 | 0 | 0 | 0 | 0 | 0 | 0 | 0 |
| 1 | 0 | 0 | 1 | 0 | 0 | 0 | 0 | 0 | 0 | 0 | 0 | 1 | 0 | 0 | 0 | 0 | 0 | 0 |
| 1 | 0 | 1 | 0 | 0 | 0 | 0 | 0 | 0 | 0 | 0 | 0 | 0 | 1 | 0 | 0 | 0 | 0 | 0 |
| 1 | 0 | 1 | 1 | 0 | 0 | 0 | 0 | 0 | 0 | 0 | 0 | 0 | 0 | 1 | 0 | 0 | 0 | 0 |
| 1 | 1 | 0 | 0 | 0 | 0 | 0 | 0 | 0 | 0 | 0 | 0 | 0 | 0 | 0 | 1 | 0 | 0 | 0 |
| 1 | 1 | 0 | 1 | 0 | 0 | 0 | 0 | 0 | 0 | 0 | 0 | 0 | 0 | 0 | 0 | 1 | 0 | 0 |
| 1 | 1 | 1 | 0 | 0 | 0 | 0 | 0 | 0 | 0 | 0 | 0 | 0 | 0 | 0 | 0 | 0 | 1 | 0 |
| 1 | 1 | 1 | 1 | 0 | 0 | 0 | 0 | 0 | 0 | 0 | 0 | 0 | 0 | 0 | 0 | 0 | 0 | 1 |

What is claimed is:

1. A flash photography system, comprising:
(a) first light measuring means for measuring ambient light;
(b) film sensitivity output means for producing a signal representing the sensitivity of the photographic film used in the camera;
(c) exposure time output means for producing exposure time data for flash light photography;
(d) first aperture value output means for calculating a desired first diaphragm aperture value for flash light photograpny based on the data obtained by said first iight measuring means, said film sensitivity output means and said exposure time output means;
(e) second aperture value output means for producing a second aperture value independent of the light value of the ambient light;
(f) data selecting means for outputting said first diaphragm aperture value or said second aperture value;
(g) shutter control means for controlling the camera shutter based on the exposure data of said exposure time output means;
(h) aperture control means for controlling the actual diaphragm aperture size based on the output of said data selecting means;
(i) means for effecting flash light emission;
(j) second light measuring means for measuring the flash light emitted to, and reflected from, a photographic object;
(k) means for integrating the output of said second light measuring means; and
(l) means for producing a signal to stop the emission of the flash light when the output of said integrating means reaches a predetermined value.

2. The flash photography system according to claim 1, wherein said data selecting means comprises means for selecting between the aperture value of said first aperture value output means and the aperture value of said second aperture value output means, depending on the output of said first light measuring means.

3. The flash photography system according to claim 1, wherein said second light measuring means is provided at a position to receive light reflected from the photographic object passed through a photographing lens and a diaphragm aperture of the camera and in turn reflected by the photographic film plane.

4. The flash photography system according to claim 1, wherein said second aperture value output means comprises means for producing aperture value data corresponding to a given film sensitivity, means for producing said given film sensitivity, means for calculating the difference between said given film sensitivity and the film sensitivity signal to produce a difference output; and
aperture data output means for producing aperture data less, by said difference output, than said aperture data corresponding to said given film sensitivity.

5. The flash photography system according to claim 1, wherein said first aperture value output means produces the aperture value data for effecting an underexposure by a predetermined value with respect to the correct exposure value for ambient light photography.

6. The flash photography system according to claim 5, wherein said first aperture value output means further comprises means for producing a constant value corresponding to the sensitivity pattern of the light measurement of said first light measuring means, and means for calculating an aperture value representing a smaller aperture size by said constant value than that for the aperture value for effecting a correct exposure for ambient light photography.

7. A flash photography system, comprising:
(a) first aperture data output means for producing first aperture value data for flash light photography and corresponding to a given film sensitivity;
(b) film sensitivity output means for producing an output representing the film sensitivity of the photographic film used in the camera;
(c) second aperture data output means for producing second aperture value data modified by adding the difference between said given film sensitivity and said film sensitivity output to said first aperture value data;
(d) aperture control means for controlling the diaphragm aperture of the camera based on said second aperture value data;
(e) means for effecting emission of flash light;
(f) light measuring means for measuring the amount of flash light reflected from a photographic object;
(g) means for integrating the output of said light measuring means; and
(h) means for producing a signal for stopping the flash light emission when the integrated value of said integrating means exceeds a predetermined value.

8. The flash photography system according to claim 7 wherein said second aperture data output means comprises first signal output means for producing a first signal representative of said given film sensitivity, a subtractor for calculating the difference between said first signal and said film sensitivity output, and an adder for calculating the sum of the first aperture data and the difference calculated in the subtractor to produce a sum output as said second aperture data.

9. The flash photogaphy system according to claim 7, wherein said second aperture data output means comprises a first signal output means for producing a first signal representative of said given film sensitivity, a subtractor for calculating the difference between said first signal and the film sensitivity output, a divider for dividing said difference by a constant value, and an adder for summing said first aperture value data and the result of the division to provide the sum as an aperture control signal.

10. A flash photography system comprising:
(a) first light measuring means for measuring ambient light;
(b) film sensitivity output means for producing a signal representative of the sensitivity of the photographic film used in the camera;
(c) exposure data output means for producing exposure control data for effecting an underexposure of a predetermined amount with respect to a correct exposure value for ambient light photography in response to said first light measuring means and said film sensitivity output means;
(d) exposure control means for controlling the exposure value of the camera based on said exposure control data;
(e) means for effecting flash light emission;
(f) second light measuring means for measuring light reflected from the photographic object from said flash light emission;
(g) means for integrating tle output of said second light measuring means; and
(i) means for stopping the flash light emission when said integrating means reaches a predetermined value.

11. The flash photography, system according to claim 10, further comprising means for producing exposure time data, and said exposure data output means further comprises means for producing a desired aperture value representative of a smaller aperture size by said predetermined value than that for a correct aperture control value for ambient light photography, based on the ambient light value measured by said first light measuring means, the film sensitivity and the exposure time data.

12. The flash photography system according to claim 11, wherein said exposure time data producing means further comprises means for producing manually set exposure time data, fixed exposure data output means for producing fixed exposure time data for flash light photography, and data selecting means for outputting said set exposure time data or said fixed exposure time data.

13. The flash photography system according to claim 10, further comprising means for producing manually set aperture value data, said exposure data output means comprises means for producing exposure time data representative of a shorter exposure time by said predetermined value than that for correct exposure time for ambient light photography, based on the ambient light value measured by said first light measuring means, the film sensitivity and the aperture value data.

14. A flash photography system comprising:
(a) first light measuring means for measuring ambient light;
(b) film sensitivity output means for producing a signal representative of the sensitivity of the photographic film used in the camera;
(c) exposure time signal output means for producing manually set exposure time data;
(d) fixed exposure time output means for producing fixed exposure time data for flash light photography;
(e) data output means for outputting the longer one of said exposure times respectively corresponding to said manually set exposure time data or said fixed exposure time data;
(f) means for calculating an aperture value based on the film sensitivity, the light value of the ambient light and the output data from said data output means;
(g) shutter control means for controlling the camera shutter based on the output data of said data output means;
(h) aperture control means for controlling the actual diaphragm aperture size of the camera based on the calculation of said calculating means;
(i) means for effecting emission of flash light;
(j) second light measuring means for measuring the light reflected from the photographic object from said flash light emission;
(k) means for integrating the output of said second light measuring means;
(l) means for producing a signal to stop the emission of flash light when the output of said integrating means reaches a predetermined value;
said system further comprising:
(m) means for producing fixed data; and
wherein said calculating means includes means for producing a desired aperture value representative of a smaller aperture size by said fixed data than that for the aperture value with the correct exposure for ambient light photography, based on the ambient light value measured by said first light measuring means, the film sensitivity and the output data of said data output means.

15. The flash photography system according to claim 14 wherein said second light measuring means is positioned to receive light passed through a lens means and the diaphragm aperture and in turn reflected by a film plane.

16. The flash photography system according to claim 14, wherein said fixed data is determined by the sensitivity pattern of the light measuring characteristic of said first light measuring means.

17. A flash photography system, comprising:
(a) first light measuring means for measuring ambient light;
(b) first aperture value output means for producing a first aperture value dependent on said ambient light;
(c) second aperture value output means for producing a second aperture value independent of the ambient light value;
(d) first signal output means for outputting said first aperture value or the second aperture value depending on the output of said light measuring means;
(e) means for designating a first exposure control mode or a second exposure control mode;
(f) data selecting means for producing either the output data of said first signal output means upon receipt of said first exposure control mode signal or said first aperture value of said first aperture value output means upon receipt of said second exposure control mode signal;
(g) aperture control means for controlling the actual diaphragm aperture size of the camera corresponding to the output data of said data selecting means;
(h) means for effecting emission of flash light;
(i) second light measuring means disposed to receive the light emitted from a flash device and passed through the diaphragm aperture and reflected by the film plane;
(j) means for integrating the output of said second light measuring means; and (k) means for producing a signal to stop the emission of flash light when the output of said integrating means reaches a predetermined value.

18. The flash photographing system according to claim 17, further comprising third aperture value output means for producing a manually set third aperture value, said designating means is also capable of designating a third exposure control mode, and said data selecting means is adapted to produce the output of said third aperture value output means in said third exposure control mode.

19. The flash photography system according to claim 17, wherein said first aperture value output means produces an aperture value representative of a smaller aperture size by a predetermined value than that for the correct aperture value for ambient light photography.

20. The flash photography system according to claim 19, wherein said predetermined value is determined by the sensitivity pattern of said ambient light measuring means.

21. A flash photography system comprising:
(a) first light measuring means for measuring ambient light;
(b) first aperture value output means responsive to said first light measuring means for producing a first aperture value representative of a smaller aperture size by a predetermined value than that for the correct aperture value for ambient light photography;
(c) second aperture value output means for producing a second aperture value independent of the ambient light;
(d) first signal output means for outputting said first aperture value or said second aperture value depending on the output value of said light measuring means;
(e) means for outputting a manually set aperture value;
(f) means for designating a first exposure control mode or a second exposure control mode;
(g) data selecting means for producing either the output data of said first signal output means in said first exposure control mode or the manually set aperture value in said second exposure control mode;
(h) aperture control means for controlling the actual diaphragm size of the camera corresponding to the output data of said data selecting means;
(i) means for effecting emission of flash light;
(j) second light measuring means disposed to receive the light emitted from a flash device and passed through the diaphragm aperture and reflected by the film plane;
(k) means for integrating the output of said second light measuring means; and
(l) means for producing a signal to stop the emission of flash light when the output of said integrating means reaches a predetermined value.

22. The flash photography system according to claim 21, wherein said designating means is also capable of designating a third exposure control mode and said data selecting means produces the first aperture value in said third exposure control mode.

23. The flash photography system according to claim 21, wherein said predetermined value is determined by the sensitivity pattern of said ambient light measuring means.

24. A flash photography system comprising:
(a) first light measuring means for measuring ambient light;
(b) film sensitivity output means for producing a signal representative of the sensitivity of the photographic film used in the camera; lly set
(c) aperture value output means for producing manually set aperture value data;
(d) first exposure time output means for calculating desired exposure time data based on the outputs of said first light measuring means, said film sensitivity output means and said aperture value output means;
(e) second exposure time output means for producing fixed exposure time data;
(f) data selecting means for outputting the longer one of the exposure times respectively corresponding to said desired exposure time data and said fixed exposure time data;
(g) shutter control means for controlling the exposure time based on the output of said data selecting means;
(h) aperture control means for controlling the actual aperture size of the camera based on the output of said aperture value output means;
(i) means for effecting emission of flash light;
(j) second light measuring means for measuring the flash light emitted to, and reflected from, a photographic object;
(k) means for integrating the output of said second light measuring means; and
(l) means for producing a signal to stop the emission of flash light when the output of said integration means reaches a predetermined value.

25. The flash photography system according to claim 24, further comprising means for producing fixed data, and said first exposure time output means includes means for producing exposure time data representative of a shorter exposure time by the fixed data than that for the correct exposure time for ambient light photography, based on the outputs of said first light measuring means, said film sensitivity output means and said aperture value output means.

26. The flash photography system according to claim 25, wherein said fixed data is determined by the sensitivity pattern of the light measuring characteristic of said first light measuring means.

27. The flash photography system according to claim 26, wherein said second light measuring means is positioned to receive light passed through a lens means and the diaphragm aperture and in turn reflected by the film plane.

* * * * *